US012644050B2

(12) United States Patent
Mulcahy et al.

(10) Patent No.: US 12,644,050 B2
(45) Date of Patent: Jun. 2, 2026

(54) POLYMERIZABLE LIQUID CRYSTAL MATERIAL AND POLYMERIZED LIQUID CRYSTAL FILM

(71) Applicant: Merck Patent GmbH, Darmstadt (DE)

(72) Inventors: Stephen Mulcahy, Feltham (GB); Owain Llyr Parri, Feltham (GB); Sarabjot Kaur, Uxbridge (GB)

(73) Assignee: MERCK PATENT GMBH, Darmstadt (DE)

(*) Notice: Subject to any disclaimer, the term of this patent is extended or adjusted under 35 U.S.C. 154(b) by 0 days.

(21) Appl. No.: 18/028,014

(22) PCT Filed: Sep. 23, 2021

(86) PCT No.: PCT/EP2021/076208
§ 371 (c)(1),
(2) Date: Mar. 23, 2023

(87) PCT Pub. No.: WO2022/063902
PCT Pub. Date: Mar. 31, 2022

(65) Prior Publication Data

US 2023/0340329 A1 Oct. 26, 2023

(30) Foreign Application Priority Data

Sep. 24, 2020 (EP) .................................... 20198135

(51) Int. Cl.

| | |
|---|---|
| ***G02F 1/1333*** | (2006.01) |
| ***C09K 19/38*** | (2006.01) |
| ***C09K 19/54*** | (2006.01) |
| ***C09K 19/58*** | (2006.01) |
| *C09K 19/04* | (2006.01) |

(52) U.S. Cl.
CPC ........ *C09K 19/3852* (2013.01); *C09K 19/542* (2013.01); *C09K 19/588* (2013.01); *C09K 2019/0448* (2013.01); *C09K 2019/548* (2013.01); *G02F 1/133365* (2013.01)

(58) Field of Classification Search
CPC ................................ C09K 19/38; C09K 19/54
See application file for complete search history.

(56) References Cited

U.S. PATENT DOCUMENTS

| | | | |
|---|---|---|---|
| 5,389,698 A | 2/1995 | Chigrinov et al. | |
| 5,486,935 A | 1/1996 | Kalmanash | |
| 5,602,661 A | 2/1997 | Schadt et al. | |
| 5,989,461 A | 11/1999 | Coates et al. | |
| 6,217,792 B1 | 4/2001 | Parri et al. | |
| 6,417,902 B1 | 7/2002 | Greenfield et al. | |
| 6,511,719 B2 | 1/2003 | Farrand | |
| 6,514,578 B1 | 2/2003 | Farrand | |
| 6,717,644 B2 | 4/2004 | Schadt et al. | |
| 6,858,663 B2 | 2/2005 | Knott et al. | |
| 7,060,200 B1 | 6/2006 | Farrand et al. | |
| 7,169,448 B2 | 1/2007 | Coates et al. | |
| 7,175,890 B2 | 2/2007 | Verrall et al. | |
| 7,597,942 B2 | 10/2009 | May et al. | |
| 10,023,800 B2 | 7/2018 | Kim | |
| 2003/0072893 A1 | 4/2003 | Nakano et al. | |
| 2006/0119783 A1 | 6/2006 | Fukuoka et al. | |
| 2006/0172090 A1 | 8/2006 | Syundo | |
| 2014/0117269 A1 | 5/2014 | Brill et al. | |
| 2017/0066967 A1 | 3/2017 | Yamamoto et al. | |
| 2017/0073581 A1 | 3/2017 | Horiguchi et al. | |
| 2018/0148648 A1 | 5/2018 | Smith et al. | |
| 2022/0177782 A1* | 6/2022 | Mulcahy | C09K 19/3405 |

FOREIGN PATENT DOCUMENTS

| | | | |
|---|---|---|---|
| CN | 106029835 A | 10/2016 | |
| CN | 107690468 A | 2/2018 | |
| GB | 2538554 A | 11/2016 | |
| JP | 2013514396 A | 4/2013 | |
| TW | 201529554 A | 8/2015 | |
| WO | 2015133332 A1 | 9/2015 | |
| WO | WO-2016184543 A1 * | 11/2016 | C07C 69/80 |

OTHER PUBLICATIONS

International Search Report PCT/EP2021/076208 dated Jan. 4, 2022 (pp. 1-3).

* cited by examiner

*Primary Examiner* — Geraldina Visconti
(74) *Attorney, Agent, or Firm* — Millen, White, Zelano & Branigan, P.C.; Brion P. Heaney

(57) ABSTRACT

A polymerizable LC material containing one or more reactive mesogenic compounds, one or more chiral compounds and one or more compounds of formula I,

I

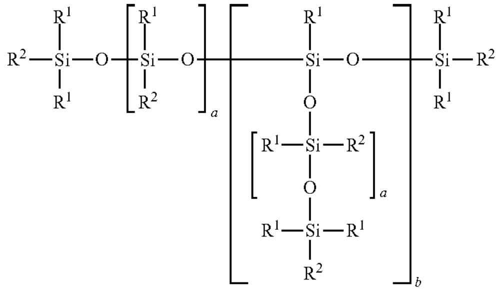

wherein the individual radicals have one of the meanings as defined herein, is suitable for use in preparing a polymer film with improved thermal and UV stability. Polymer films made from the polymerizable LC material can be used in optical, electro-optical, decorative or security devices.

30 Claims, No Drawings

POLYMERIZABLE LIQUID CRYSTAL MATERIAL AND POLYMERIZED LIQUID CRYSTAL FILM

FIELD OF INVENTION

The invention relates to a polymerizable LC material comprising one or more reactive mesogenic compounds, one or more chiral compounds and one or more compounds of formula I,

I

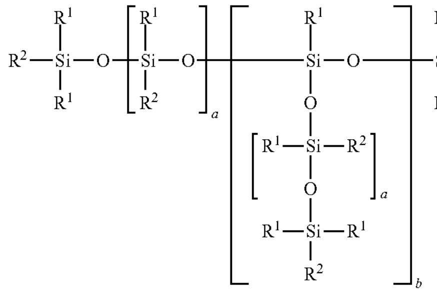

wherein the individual radicals have one of the meanings as given in the claims. Furthermore, the present invention relates also to a method for its preparation, a polymer film with improved thermal and UV stability obtainable from a corresponding polymerizable LC material, to a method of preparation of such polymer film, and to the use of such polymer film and said polymerizable LC material in optical, electro-optical, decorative or security devices.

BACKGROUND AND PRIOR ART

Reactive mesogens (RMs), mixtures or formulations comprising them, and polymers obtained thereof, can be used to make optical components, like compensation, retardation or polarisation films, or lenses. These optical components can be used in optical or electrooptical devices like LC displays. Usually the RMs or RM mixtures are polymerised through the process of in-situ polymerisation.

The manufacture of RM film products with high birefringence is of high importance for manufacturing optical components of modern display devices like LCDs. For Example, brightness enhancement films such as 3M DBEF™, are often included in displays in order to increase the brightness or reduce the number of light sources in the backlight unit.

Broadband cholesteric films can also be used for this purpose, and the optical properties are dependent upon the broadening which can be achieved during processing. Films which are better able to broaden can be processed faster on a production line, and additionally can have improved optical properties.

In this regard, it is possible to polymerise cholesteric reactive mesogen films such that a gradient in the helical pitch is obtained, thereby broadening the reflection band of the film. Thin films with good optical properties are dependent on the inclusion of at least one suitable high birefringence RM.

Broadening of cholesteric films is dictated by the structure of the high birefringence material in the reactive mesogen mixture. Compounds must be highly birefringent and allow band broadening to occur whilst also having good solubility and a broad nematic range, preferably without melting points becoming too high. High birefringence reactive mesogens made to date with these characteristics only allow cholesteric films to be broadened by a certain amount before films become hazy.

Increasing the birefringence of the RM whilst keeping them polymerisable and with good physical properties is possible, but requires the incorporation of specific chemical groups, like for example tolane groups, into the compounds.

Mesogenic tolane derivatives are known for example from U.S. Pat. No. 6,514,578 B1, GB 2 388 599 B1, U.S. Pat. No. 7,597,942 B1, US 2003-072893 A1 and US 2006-0119783 A1.

Generally tolane groups are relatively reactive and are mostly unsuited to light exposure, making them difficult to utilise in many optical applications due to yellowing or other degradation effects. Furthermore, mesogenic tolane derivatives often show a limited solubility in RM mixtures and are therefore limited in their use.

Furthermore, Cholesteric liquid crystal (CLC) materials, when formed into thin layers with planar alignment, i.e. wherein the cholesteric helix axis is oriented substantially perpendicular to the plane of the layer, exhibit the well-known effect of selective reflection of light, where the wavelength of the reflected light is dependent on the pitch of the cholesteric helix. By using polymerizable CLC materials, the aligned CLC layer can be converted to a coherent polymer film that retains the selective reflection properties of the original material.

CLC polymer films are known in prior art and have been proposed for a variety of uses, for example as broadband or notch polarizers, as colour filters in displays or projection systems, and for decorative and security purposes, like the preparation of coloured image films or cholesteric pigment flakes.

For some applications, it is desirable to form a multilayer cholesteric film, comprising two or more cholesteric layers e.g. exhibiting different reflection wavelength.

Multilayer cholesteric polymer films have been described in prior art, such as U.S. Pat. No. 6,417,902. Moreover, EP 0 634 674 suggests to prepare a multilayer cholesteric liquid crystal polymer film by bringing together a pair of chiral nematic liquid crystal polymer films, applying pressure and heating the polymers above their glass transition temperature to allow the films to adhere.

Maurer et al., SID 90 Digest, Vol. 21, pp. 110 (1990) describes a polarizing colour filter obtained by combining several polarizing films with different reflection wavelength. For the preparation of each film, a layer of a CLC side chain polysiloxane comprising chiral and achiral side groups is brought between two glass plates and oriented by shearing at high temperatures.

JP 01-133003-A (Sumitomo Chem. Ind.) and JP 08-271731-A (Nitto Denko) disclose polarizing plates that are obtained by lamination of one or more CLC polymer layers onto a quarter wave plate.

However, the methods of preparing multilayer cholesteric films as described in the above documents bear several disadvantages. Thus, it is often very difficult and requires high temperatures to achieve uniform alignment in the CLC polymer layer. For example, Maurer et al. mentions an aligning temperature of 150° C., whereas JP 01-133003-A and JP 08-271731-A mention that temperatures well above the glass temperature of the CLC polymers are required. This is especially disadvantageous when polymers with high glass temperatures, like acrylates, styrenes or methacrylates are used, and is highly unsuitable in particular for mass production.

Furthermore, according to the method of multilayer preparation as described e.g. in JP 01-133003-A, the polymers have to be selected such that the different polymer layers exhibit different glass temperatures. Thus, when laminating and aligning e.g. a second layer on top of a first layer, the aligning temperature (and thus the glass temperature) of the second layer has to be lower than the glass temperature of the first layer, so as not to affect the uniform orientation of the first layer, etc. This severely limits the choice of suitable materials and makes the production process more complicated.

Another aspect is, that polymerizable LC materials comprising a leveling agents such as a surfactant are usually required in order to achieve good alignment of the resulting CLC polymer. Typically, without utilizing a surfactant in the formulation, increased haze, bad alignment of the helix in the CLC polymer and inhomogeneous thickness across the film can be observed. On the other hand, due to the levelling agents normally used in such formulations, it can be difficult to achieve good alignment and coating qualities with the second coating of CLC material which is required for multilayer applications.

In this regard, dewetting is defined as the rupture of a thin liquid film on the substrate and the formation of droplets. In the case of an multilayer application, this can lead to inhomogeneous thickness of the second CLC material when drying. In some cases, the film can recede from the edges and in the worst case there is extreme beading of the second coated layer which leads to zero coverage of the coated area.

It is therefore an aim of the present invention to provide improved polymerizable LC materials or RM mixtures and RM formulations, which do not have the drawbacks of materials known from prior art. In particular it is an aim to provide RM mixtures and RM formulations that are suitable for preparing polymers by in situ UV photopolymerisation, and exhibit at the same time a high birefringence, exhibit a good solubility, show an improved broadening potential, have favorable transition temperatures, and show high resistance against yellowing after being exposed to UV light. Another aim is to provide an improved multilayer stack that does not show the drawbacks of materials known from prior art. Other aims of the invention are immediately evident to the expert from the following description.

Surprisingly, the inventors of the present invention have found that the polymerizable LC material in accordance with claim 1 fulfills one or more of the above defined requirements and preferably reaches all aims at the same time.

SUMMARY OF THE INVENTION

In summary, the present invention relates to a polymerizable LC material comprising one or more reactive mesogenic compounds, one or more chiral mesogenic compounds and one or more compounds of the formula I,

I

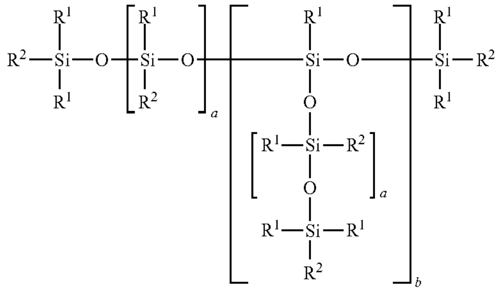

wherein $R^1$ denotes each and independently from one another, an alkyl radical, preferably having 1 to 4 carbon atoms or aryl radicals, but at least 80% of the radicals $R^1$ are methyl radicals, $R^2$ denotes each and independently from one another (a)

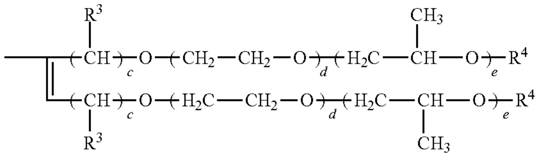

wherein $R^3$ denotes each and independently from one another a hydrogen or alkyl radical, $R^4$ denotes each and independently from one another a hydrogen, alkyl or carboxyl radical c denotes integer from 1 to 20, d denotes an integer from 0 to 50, e is a number from 0 to 50 or (b) $—(CH_2—)_fOR^5$, in which R5 denotes each and independently from one another hydrogen, an alkyl or carboxyl radical or a dimethyl propane radical containing ether groups if desired, and f denotes an integer from 2 to 20 or (c) $—(CH_2—)_g(OC_2H_4—)_h(OC_3H_8)_j(OCH_2CH(C_6H_5))_kOR_6$ in which $R^6$ is a hydrogen, alkyl or carboxyl radical, g is a number from 2 to 6, h is a number from 0 to 20, i is a number from 1 to 50, j is a number from 0 to 10, k is a number from 0 to 10 or (d) corresponds to the radical $R^1$, with the proviso that in the average molecule at least one radical $R^2$ has the definition (a), in which a is a number from 1 to 500, preferably from 1 to 200, and in particular from 1 to 50, and b is a number from 0 to 10, preferably <5, and in particular 0.

The siloxane framework can be straight-chain (b=0) or else branched (>0 to 10). The value of b and also the value of a are to be understood as average values in the polymer molecule, since the polysiloxanes for use in accordance with the invention are in the form of—generally—equilibrated mixtures.

The skilled worker is well aware that, owing to their polymeric nature, the compounds are in the form of a mixture having a distribution which is governed essentially by the laws of statistics. The values for all indices therefore represent average values.

Further, the invention also relates to a corresponding method of production for the polymerizable LC material comprising at least the step of mixing one or more reactive mesogenic compounds, one or more chiral mesogenic compounds and one or more compounds of formula I.

The invention further relates to a polymer network or polymer film obtainable, preferably obtained, from the polymerizable LC material, as described above and below and to a method of production of a polymer film, as described above and below.

The invention further relates to a method of improving the dewetting behaviour of a polymer film, obtainable, preferably obtained, from a polymerizable LC material as described above and below, by adding a compound of formula I to the polymerizable LC material before polymerization.

The invention further relates to an optical component comprising one or more optical films of which one is selected from the polymer films obtainable from a polymerizable LC materials as described above and below.

The invention further relates to the use of a optical component or a polymer film or a polymerizable LC material, as described above and below, in optical, electrooptical, information storage, decorative and security applications, like liquid crystal displays, projection systems, polarisers, compensators, alignment layers, circular polarisers, colour filters, decorative images, liquid crystal pigments, reflective films with spatially varying reflection colours, multicolour images, non-forgeable documents like identity or credit cards or banknotes.

The invention further relates to a electrooptical device, such as an LCD or an OLED comprising one or more optical components or polymer films or polymerizable LC materials, as described above and below.

The invention further relates to electrooptical device in the field of augmented or virtual reality such as head mounted devices comprising one or more optical components, a polymer film of a polymerizable material as described above and below.

Terms and Definitions

As used herein, the term "polymer" will be understood to mean a molecule that encompasses a backbone of one or more distinct types of repeating units (the smallest constitutional unit of the molecule) and is inclusive of the commonly known terms "oligomer", "copolymer", "homopolymer" and the like. Further, it will be understood that the term polymer is inclusive of, in addition to the polymer itself, residues from initiators, catalysts, and other elements attendant to the synthesis of such a polymer, where such residues are understood as not being covalently incorporated thereto. Further, such residues and other elements, while normally removed during post polymerization purification processes, are typically mixed or co-mingled with the polymer such that they generally remain with the polymer when it is transferred between vessels or between solvents or dispersion media.

The term "(meth)acrylic polymer" as used in the present invention includes a polymer obtained from acrylic monomers, a polymer obtainable from methacrylic monomers, and a corresponding co-polymer obtainable from mixtures of such monomers.

The term "polymerization" means the chemical process to form a polymer by bonding together multiple polymerizable groups or polymer precursors (polymerizable compounds) containing such polymerizable groups.

The terms "film" and "layer" include rigid or flexible, self-supporting or freestanding films with mechanical stability, as well as coatings or layers on a supporting substrate or between two substrates.

The term "liquid crystal" or "LC" relates to materials having liquid-crystalline mesophases in some temperature ranges (thermotropic LCs) or in some concentration ranges in solutions (lyotropic LCs). They obligatorily contain mesogenic compounds.

The terms "mesogenic compound" and "liquid crystal compound" mean a compound comprising one or more calamitic (rod- or board/lath-shaped) or discotic (disk-shaped) mesogenic groups. The term "mesogenic group" means a group with the ability to induce liquid-crystalline phase (or mesophase) behaviour. The compounds comprising mesogenic groups do not necessarily have to exhibit a liquid-crystalline mesophase themselves.

It is also possible that they show liquid-crystalline mesophases only in mixtures with other compounds, or when the mesogenic compounds or materials, or the mixtures thereof, are polymerized. This includes low-molecular-weight non-reactive liquid-crystalline compounds, reactive or polymerizable liquid-crystalline compounds, and liquid-crystalline polymers.

A calamitic mesogenic group is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected e.g. from carbyl or hydrocarbyl groups, polar groups like halogen, nitro, hydroxy, etc., or polymerizable groups.

The term "reactive mesogen" means a polymerizable mesogenic or liquid crystal compound, preferably a monomeric compound. These compounds can be used as pure compounds or as mixtures of reactive mesogens with other compounds functioning as photoinitiators, inhibitors, surfactants, stabilizers, chain transfer agents, non-polymerizable compounds, etc.

Polymerizable compounds with one polymerizable group are also referred to as "monoreactive" compounds, compounds with two polymerizable groups as "direactive" compounds, and compounds with more than two polymerizable groups as "multireactive" compounds. Compounds without a polymerizable group are also referred to as "non-reactive or non-polymerizable" compounds.

The term "non-mesogenic compound or material" means a compound or material that does not contain a mesogenic group as defined above.

Visible light is electromagnetic radiation that has wavelength in a range from about 400 nm to about 740 nm. Ultraviolet (UV) light is electromagnetic radiation with a wavelength in a range from about 200 nm to about 450 nm.

The Irradiance ($E_e$) or radiation power is defined as the power of electromagnetic radiation (dθ) per unit area (dA) incident on a surface:

$$E_e = d\theta/dA.$$

The radiant exposure or radiation dose ($H_e$), is as the irradiance or radiation power ($E_e$) per time (t):

$$H_e=E_e \cdot t.$$

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

The term "clearing point" means the temperature at which the transition between the mesophase with the highest temperature range and the isotropic phase occurs.

The term "director" is known in prior art and means the preferred orientation direction of the long molecular axes (in case of calamitic compounds) or short molecular axes (in case of discotic compounds) of the liquid-crystalline or RM molecules. In case of uniaxial ordering of such anisotropic molecules, the director is the axis of anisotropy.

The term "alignment" or "orientation" relates to alignment (orientational ordering) of anisotropic units of material such as small molecules or fragments of big molecules in a common direction named "alignment direction". In an aligned layer of liquid-crystalline or RM material the liquid-crystalline director coincides with the alignment direction so that the alignment direction corresponds to the direction of the anisotropy axis of the material.

The terms "uniform orientation" or "uniform alignment" of an liquid-crystalline or RM material, for example in a layer of the material, mean that the long molecular axes (in case of calamitic compounds) or the short molecular axes (in case of discotic compounds) of the liquid-crystalline or RM molecules are oriented substantially in the same direction. In other words, the lines of liquid-crystalline director are parallel.

The term "homeotropic structure" or "homeotropic orientation" refers to a film wherein the optical axis is substantially perpendicular to the film plane.

The term "planar structure" or "planar orientation" refers to a film wherein the optical axis is substantially parallel to the film plane.

The term "A plate" refers to an optical retarder utilizing a layer of uniaxially birefringent material with its extraordinary axis oriented parallel to the plane of the layer.

The term "C plate" refers to an optical retarder utilizing a layer of uniaxially birefringent material with its extraordinary axis oriented perpendicular to the plane of the layer.

In A/C-plates comprising optically uniaxial birefringent liquid crystal material with uniform orientation, the optical axis of the film is given by the direction of the extraordinary axis. An A (or C) plate comprising optically uniaxial birefringent material with positive birefringence is also referred to as "positive A (or C) plate" or "+A (or +C) plate".

An A (or C) plate comprising a film of optically uniaxial birefringent material with negative birefringence, such as discotic anisotropic materials is also referred to as "negative A (or C) plate" or "− A (or C) plate" depending on the orientation of the discotic materials. A film made from a cholesteric calamitic material with a reflection band in the UV part of the spectrum also has the optics of a negative C plate.

The birefringence Δn is defined as follows $$\Delta n=n_e-n_o$$

wherein $n_e$ is the extraordinary refractive index and $n_o$ is the ordinary refractive index, and the average effective refractive index $n_{av.}$ is given by the following equation:

$$n_{av.}=((2n_o^2+n_e^2)/3)^{1/2}$$

The average effective refractive index $n_{av.}$ and the ordinary refractive index $n_o$ can be measured using an Abbe refractometer. Δn can then be calculated from the above equations.

Unless the context clearly indicates otherwise, as used herein plural forms of the terms herein are to be construed as including the singular form and vice versa.

All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy (Δn) is determined at a wavelength of 589.3 nm In case of doubt the definitions as given in C. Tschierske, G. Pelzl and S. Diele, Angew. Chem. 2004, 116, 6340-6368 shall apply.

Unless explicitly stated otherwise in the given generic formulae, the following terms have the following meanings:

"Carbyl group" denotes a mono- or polyvalent organic group containing one or more carbon atom which either contains no further atoms (such as, for example, —C≡C—) or optionally contains one or more further atoms, such as, for example, N, O, S, P, Si, Se, As, Te or Ge (for example carbonyl, etc.). "Hydrocarbyl group" denotes a carbyl group, which additionally contains one or more H atoms and optionally one or more heteroatoms, such as, for example, N, O, S, P, Si, Se, As, Te or Ge.

A carbyl or hydrocarbyl group can be a saturated or unsaturated group. Unsaturated groups are, for example, aryl, alkenyl, or alkinyl groups. A carbyl or hydrocarbyl group having more than 3 C atoms can be straight chain, branched and/or cyclic and may contain spiro links or condensed rings.

Preferred carbyl and hydrocarbyl groups are optionally substituted alkyl, alkenyl, alkinyl, alkoxy, alkylcarbonyl, alkoxycarbonyl, alkylcarbonyloxy and alkoxycarbonyloxy having 1 to 40, preferably 1 to 25, particularly preferably 1 to 18 C atoms, optionally substituted aryl or aryloxy having 6 to 40 C atoms, preferably 6 to 25 C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40 C atoms, preferably 6 to 25 C atoms. Further preferred carbyl and hydrocarbyl groups are $C_1$-$C_{40}$ alkyl, $C_2$-$C_{40}$ alkenyl, $C_2$-$C_{40}$ alkinyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkinyl, $C_3$-$C_{22}$ allyl, $C_4$-$C_{22}$ alkyldienyl, $C_6$-$C_{12}$ aryl, $C_6$-$C_{20}$ arylalkyl, and $C_2$-$C_{20}$ heteroaryl.

Further preferred carbyl and hydrocarbyl groups are straight-chain, branched or cyclic alkyl radicals having 1 to 40, preferably 1 to 25 C atoms, more preferably 1 to 12 C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

Above, $R^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O—, and in which one or more H atoms may be replaced by fluorine, an optionally substituted aryl or aryloxy group having 6 to 40 C atoms or an optionally substituted heteroaryl or heteroaryloxy group having 2 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, n-hexyl, 2-ethylhexyl, n-heptyl, n-octyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc, in which, in addition, one or more non-adjacent $CH_2$ groups may each be replaced, independently of one another, by

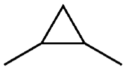,
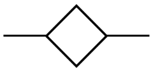,
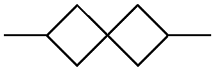,
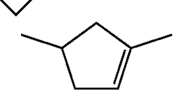
or
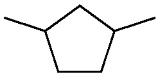.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkinyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptyloxy, n-octyloxy, n-nonyloxy, n-decyloxy, n-undecyloxy, n-dodecyloxy, etc, in which, in addition, one or more non-adjacent $CH_2$ groups may each be replaced, independently of one another, by

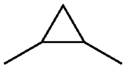,
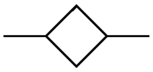,
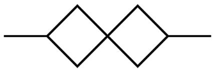,
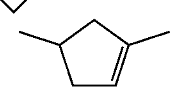
or
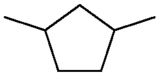.

Preferred amino groups are, for example, dimethylamino, methylamino, methylphenylamino, phenylamino, etc.

Aryl and heteroaryl groups can be monocyclic or polycyclic, i.e. they can have one ring (such as, for example, phenyl) or two or more rings, which may also be fused (such as, for example, naphthyl) or covalently linked (such as, for example, biphenyl), or contain a combination of fused and linked rings. Heteroaryl groups contain one or more heteroatoms, preferably selected from O, N, S, and Se.

Preference is given to mono-, bi-, or tricyclic aryl groups having 6 to 25 C atoms and mono-, bi- or tricyclic heteroaryl groups having 2 to 25 C atoms, which optionally contain fused rings, and which are optionally substituted. Preference is furthermore given to 5-, 6-, or 7-membered aryl and heteroaryl groups, in which, in addition, one or more CH groups may be replaced by N, S, or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, perylene, tetracene, pentacene, benzo-pyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, iso-indole, indolizine, indazole, benzimidazole, benzotriazole, purine, naphth-imidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those that contain exclusively single bonds, and partially unsaturated rings, i.e. those that may also contain multiple bonds. Heterocyclic rings contain one or more heteroatoms, preferably selected from Si, O, N, S, and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi-, or tricyclic groups having 3 to 25 C atoms, which optionally contain fused rings and which are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

The aryl, heteroaryl, (non-aromatic) alicyclic and heterocyclic groups optionally have one or more substituents, which are preferably selected from the group comprising silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" below, are, for example, F, Cl, Br, I, —OH, —CN, —$NO_2$, —NCO, —NCS, —OCN, —SCN, —C(═O)N($R^x$)$_2$, —C(═O)$Y^x$, —C(═O)$R^x$, —C(═O)O$R^x$, —N($R^x$)$_2$, in which $R^x$ has the above-mentioned meaning, and above $Y^x$ denotes halogen, optionally substituted silyl, optionally substituted aryl or heteroaryl having 4 to 40 ring atoms, preferably 4 to 20 ring atoms, and straight-chain or branched alkyl, alkenyl, alkinyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, $R^y$, —O$R^y$, —CO—$R^y$, —CO—O—$R^y$, —O—CO—$R^y$ or —O—CO—O—$R^y$, in which $R^y$ denotes H, a straight-chain, branched or cyclic alkyl chain having 1 to 12 C atoms.

In the formula shown above and below, a substituted phenylene ring

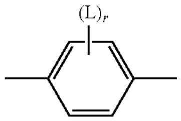

is preferably

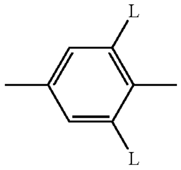, 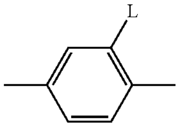,

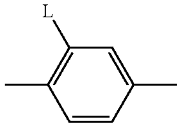, 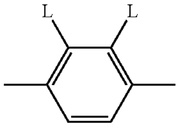,

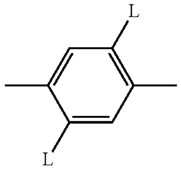 or 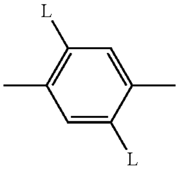, in which L has, on each occurrence identically or differently, one of the meanings given above and below, and is preferably F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, $OCH_3$, $COCH_3$, $OCF_3$ or P-Sp-, most preferably F, Cl, $CH_3$, $OCH_3$, $COCH_3$ or $OCF_3$.

"Halogen" denotes F, Cl, Br or I, preferably F or Cl, more preferably F.

"Polymerizable groups" (P) are preferably selected from groups containing a C═C double bond or C≡C triple bond, and groups which are suitable for polymerization with ring opening, such as, for example, oxetane or epoxide groups.

Preferably, polymerizable groups (P) are selected from the group consisting of $CH_2$═$CW^1$—COO—, $CH_2$═$CW^1$—CO—,

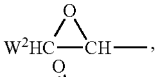, 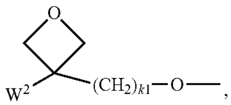,

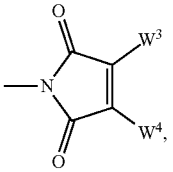, 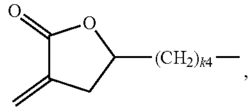, $CH_2$═$CW^2$—(O)$_{k3}$—, $CW^1$═CH—CO—(O)$_{k3}$—, $CW^1$═CH—CO—NH—, $CH_2$═$CW^1$—CO—NH—, $CH_3$—CH═CH—O—, ($CH_2$═CH)$_2$CH—OCO—, ($CH_2$═CH—$CH_2$)$_2$CH—OCO—, ($CH_2$═CH)$_2$CH—O—, ($CH_2$═CH—$CH_2$)$_2$N—, ($CH_2$═CH—$CH_2$)$_2$N—CO—, $CH_2$═$CW^1$—CO—NH—, $CH_2$═CH—(COO)$_{k1}$-Phe-(O)$_{k2}$—, $CH_2$═CH—(CO)$_{k1}$-Phe-(O)$_{k2}$—, Phe-CH═CH—, in which $W^1$ denotes H, F, Cl, CN, $CF_3$, phenyl or alkyl having 1 to 5 C atoms, in particular H, F, Cl or $CH_3$, $W^2$ denotes H or alkyl having 1 to 5 C atoms, in particular H, methyl, ethyl or n-propyl, $W^3$ and $W^4$ each, independently of one another, denote H, Cl or alkyl having 1 to 5 C atoms, Phe denotes 1,4-phenylene, which is optionally substituted by one or more radicals L as being defined above but being different from P-Sp, preferably preferred substituents L are F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl, and $k_1$, $k_2$ and $k_3$ each, independently of one another, denote 0 or 1, $k_3$ preferably denotes 1, and $k_4$ is an integer from 1 to 10.

Particularly preferred polymerizable groups P are $CH_2$═CH—COO—, $CH_2$═C($CH_3$)—COO—, $CH_2$═CF—COO—, $CH_2$═CH—, $CH_2$═CH—O—, ($CH_2$═CH)$_2$CH—OCO—, ($CH_2$═CH)$_2$CH—O—,

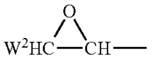 and 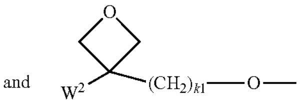, in which $W^2$ denotes H or alkyl having 1 to 5 C atoms, in particular H, methyl, ethyl or n-propyl, Further preferred polymerizable groups (P) are vinyloxy, acrylate, methacrylate, fluoroacrylate, chloroacrylate, oxetane and epoxide, most preferably acrylate or methacrylate, in particular acrylate.

Preferably, all multireactive polymerizable compounds and subformulae thereof contain instead of one or more radicals P-Sp-, one or more branched radicals containing two or more polymerizable groups P (multireactive polymerizable radicals).

Suitable radicals of this type, and polymerizable compounds containing them, are described, for example, in U.S. Pat. No. 7,060,200 B1 or US 2006/0172090 A1.

Particular preference is given to multireactive polymerizable radicals selected from the following formulae:

—X-alkyl-CH$P^x$—$CH_2$—$CH_2P^y$ I*a

—X-alkyl-C($CH_2P^x$)($CH_2P^y$)—$CH_2P^z$ I*b $-X\text{-alkyl-}CHP^{x}CHP^{y}-CH_2P^{z}$ I*c $-X\text{-alkyl-}C(CH_2P^{x})(CH_2P^{y})-C_{aa}H_{2aa+1}$ I*d $-X\text{-alkyl-}CHP^{x}-CH_2P^{y}$ I*e $-X\text{-alkyl-}CHP^{x}P^{y}$ I*f $-X\text{-alkyl-}CP^{x}P^{y}-C_{aa}H_{2aa+1}$ I*g $-X\text{-alkyl-}C(CH_2P^{v})(CH_2P^{w})-CH_2OCH_2-C(CH_2P^{x})(CH_2P^{y})CH_2P^{z}$ I*h $-X\text{-alkyl-}CH((CH_2)_{aa}P^{x})((CH_2)_{bb}P^{y})$ I*i $-X\text{-alkyl-}CHP^{x}CHP^{y}-C_{aa}H_{2aa+1}$ I*k in which alkyl denotes a single bond or straight-chain or branched alkylene having 1 to 12 C atoms, in which one or more non-adjacent $CH_2$ groups may each be replaced, independently of one another, by $-C(R^{x})=C(R^{x})-$, $-C\equiv C-$, $-N(R^{x})-$, —O—, —S—, —CO—, —CO—O—, —O—CO—, —O—CO—O— in such a way that O and/or S atoms are not linked directly to one another, and in which, in addition, one or more H atoms may be replaced by F, Cl or CN, where $R^{x}$ has one the above-mentioned meaning, $_{aa}$ and $_{bb}$ each, independently of one another, denote 0, 1, 2, 3, 4, 5 or 6, X has one of the meanings indicated for X', and $P^{v}$ to $P^{z}$ each, independently of one another, have one of the meanings indicated above for P.

Preferred spacer groups Sp are selected from alkylene having 1 to 20, preferably 1 to 12 C atoms, which is optionally mono- or polysubstituted by F, Cl, Br, I or CN and in which, in addition, one or more non-adjacent $CH_2$ groups may each be replaced, independently of one another, by —O—, —S—, —NH—, $-NR^{xx}-$, $-SiR^{xx}R^{yy}-$, —CO—, —COO—, —OCO—, —OCO—O—, —S—CO—, —CO—S—, $-NR^{xx}-CO-O-$, $-O-CO-NR^{0xx}-$, $-NR^{xx}-CO-NR^{yy}-$, —CH═CH— or $-C\equiv C-$ in such a way that O and/or S atoms are not linked directly to one another, and wherein $R^{xx}$ and $R^{yy}$ each, independently of one another, denote H or alkyl having 1 to 12 C atoms.

Further preferred spacer groups Sp are selected from the formula Sp'-X', so that the radical “P-Sp-” conforms to the formula “P-Sp'-X'—”, where Sp' denotes alkylene having 1 to 20, preferably 1 to 12 C atoms, which is optionally mono- or polysubstituted by F, Cl, Br, I or CN and in which, in addition, one or more non-adjacent $CH_2$ groups may each be replaced, independently of one another, by —O—, —S—, —NH—, $-NR^{xx}-$, $-SiR^{xx}R^{yy}-$, —CO—, —COO—, —OCO—, —OCO—O—, —S—CO—, —CO—S—, $-NR^{xx}-CO-O-$, $-O-CO-NR^{0xx}-$, $-NR^{xx}-CO-NR^{yy}-$, —CH═CH— or $-C\equiv C-$ in such a way that O and/or S atoms are not linked directly to one another, X' denotes —O—, —S—, —CO—, —COO—, —OCO—, —O—COO—, $-CO-NR^{xx}-$, $-NR^{xx}-CO-$, $-NR^{xx}-CO-NR^{yy}-$, $-OCH_2-$, $-CH_2O-$, $-SCH_2-$, $-CH_2S-$, $-CF_2O-$, $-OCF_2-$, $-CF_2S-$, $-SCF_2-$, $-CF_2CH_2-$, $-CH_2CF_2-$, $-CF_2CF_2-$, —CH═N—, —N═CH—, —N═N—, $-CH=CR^{xx}-$, $-CY^{xx}=CY^{xx}-$, $-C\equiv C-$, —CH═CH—COO—, —OCO—CH═CH— or a single bond, $R^{xx}$ and $R^{yy}$ each, independently of one another, denote H or alkyl having 1 to 12 C atoms, and $Y^{xx}$ and $Y^{yy}$ each, independently of one another, denote H, F, Cl or CN.

X' is preferably —O—, —S— —CO—, —COO—, —OCO—, —O—COO—, $-CO-NR^{xx}-$, $-NR^{xx}-CO-$, $-NR^{xx}-CO-NR^{yy}-$ or a single bond.

Typical and preferred spacer groups Sp and/or Sp' are, for example, $-(CH_2)_{p1}-$, $-(CH_2CH_2O)_{q1}-CH_2CH_2-$, $-CH_2CH_2-S-CH_2CH_2-$, $-CH_2CH_2-NH-CH_2CH_2-$ or $-(SiR^{xx}R^{yy}-O)_{p1}-$, in which p1 is an integer from 1 to 12, q1 is an integer from 1 to 3, and $R^{xx}$ and $R^{yy}$ have the above-mentioned meanings.

Particularly preferred groups —X'-Sp'- are $-(CH_2)_{p1}-$, $-O-(CH_2)_{p1}-$, $-OCO-(CH_2)_{p1}-$, $-OCOO-(CH_2)_{p1}-$, in which p1 is an integer from 1 to 12.

Particularly preferred groups Sp and/or Sp' are, for example, in each case straight-chain, methylene, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

The term “chiral” in general is used to describe an object that is non-superimposable on its mirror image.

“Achiral” (non-chiral) objects are objects that are identical to their mirror image.

The terms “chiral nematic” and “cholesteric” are used synonymously in this application, unless explicitly stated otherwise.

Chiral nematic textures or cholesteric liquid crystals (CLC) exhibit selective reflection of circular-polarised light, with the direction of rotation of the light vector corresponding to the direction of rotation of the cholesteric helix.

The reflection wavelength λ is given by the pitch p of the cholesteric helix and the mean birefringence n of the cholesteric liquid crystal in accordance with the following equation:

$$\lambda = n \cdot p$$

A CLC medium can be prepared, for example, by doping a nematic LC medium with a chiral dopant having a high twisting power. The pitch p of the induced cholesteric helix is then given by the concentration c and the helical twisting power HTP of the chiral dopant in accordance with the following equation:

$$p = (\mathrm{HTP}\ c)^{-1}$$

It is also possible to use two or more dopants, for example in order to compensate for the temperature dependence of the HTP of the individual dopants and thus to achieve low temperature dependence of the helix pitch and the reflection wavelength of the CLC medium. For the total HTP ($HTP_{total}$) holds then approximately the following equation:

$$\mathrm{HTP}_{total} = \Sigma_i c_i\ \mathrm{HTP}_i$$

wherein $c_i$ is the concentration of each individual dopant and $HTP_i$ is the helical twisting power of each individual dopant.

For the present invention,

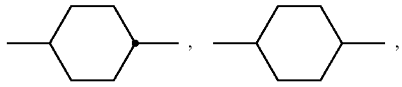

-continued

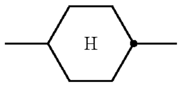 and 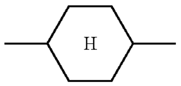

denote trans-1,4-cyclohexylene, and

 and 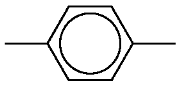

denote 1,4-phenylene.

For the present invention the groups —COO— or —$CO_2$— denote an ester group of formula

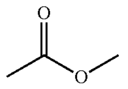 , and the groups —OCO—, —$O_2C$— or —OOC— denote an ester group of formula

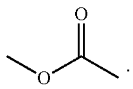 .

A "polymer network" is a network in which all polymer chains are interconnected to form a single macroscopic entity by many crosslinks.

The polymer network can occur in the following types:

- A graft polymer molecule is a branched polymer molecule in which one or more the side chains are different, structurally or configurationally, from the main chain.
- A star polymer molecule is a branched polymer molecule in which a single branch point gives rise to multiple linear chains or arms. If the arms are identical, the star polymer molecule is said to be regular. If adjacent arms are composed of different repeating subunits, the star polymer molecule is said to be variegated.
- A comb polymer molecule consists of a main chain with two or more three-way branch points and linear side chains. If the arms are identical the comb polymer molecule is said to be regular.
- A brush polymer molecule consists of a main chain with linear, unbranched side chains and where one or more of the branch points has four-way functionality or larger.

Throughout the description and claims of this specification, the words "comprise" and "contain" and variations of the words, for example "comprising" and "comprises", mean "including but not limited to", and are not intended to (and do not) exclude other components. On the other hand, the word "comprise" also encompasses the term "consisting of" but is not limited to it.

Throughout the description and claims of this specification, the words "obtainable" and "obtained" and variations of the words, mean "including but not limited to", and are not intended to (and do not) exclude other components. On the other hand, the word "obtainable" also encompasses the term "obtained" but is not limited to it.

All concentrations are quoted in percent by weight and relate to the respective mixture as a whole, all temperatures are quoted in degrees Celsius and all temperature differences are quoted in differential degrees.

DETAILED DESCRIPTION

Preferred are LC polymerizable materials according to the present invention comprising compounds of formula I wherein the radicals $R^1$ denote alkyl radicals, preferably having 1 to 4 carbon atoms, such as methyl, ethyl, propyl or butyl radicals, or aryl radicals, in which case the phenyl radicals are preferred. For reasons of preparation and price the methyl radicals are preferred, and so at least 80% of the radicals $R^1$ are methyl radicals. Particular preference is given to those polysiloxanes in which all of the radicals $R^1$ are methyl radicals.

$R^2$ in the molecule can be identical or different with the proviso that in the average molecule at least one radical $R^2$ has the definition (a).

Preferred radicals $R^2$ are detailed below.

In the radical (a)

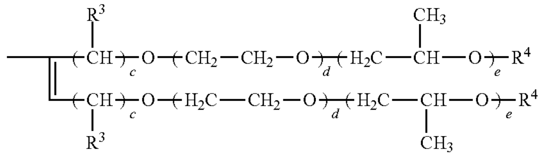

$R^3$ preferably denotes hydrogen or alkyl radical, in particular a lower alkyl radical having 1 to 4 carbon atoms. Preference is given to hydrogen.

Preferably $R^4$ is a hydrogen, alkyl or carboxyl radical, in particular an acyl radical. In one particular embodiment $R^4$ is a hydrogen.

The index c is a number from 1 to 20, preferably 1.

The indices d and e are independently of one another integers from 0 to 50.

Preference is given to a radical (a) in which $R^3$ and $R^4$ are hydrogens, the index c is 1, and the indices d and e independently of one another are each from 0 to 10.

These indices are, as the skilled worker is aware, average numbers, since it is known that the addition reaction of alkylene oxides such as ethylene oxide and propylene oxide onto alcohols produces a mixture of compounds with different chain lengths.

In the radical (b) $—(CH_2—)_f OR^5$, preferably $R^5$ is a hydrogen, alkyl or carboxyl radical or a dimethylolpropane radical with or without ether groups. More preferably $R^5$ is a hydrogen radical or a dimethylolpropane derivative. The index f is an integer from 2 to 20, the numerical values from 3 to 6 being preferred.

In the radical (c) $—(CH_2—)_g(OC_2H_4—)_h(OC_3H_6—)_i(OC_4H_8)_j(OCH_2CH(C_6H_5))_k OR_6$, $R^6$ is preferably a hydrogen, alkyl or carboxyl radical. More preferably $R^6$ is a hydrogen or methyl radical. Preferably the index g is a number from 2 to 6, the index h is a number from 0 to 20, the index i is a number from 1 to 50, the index j is a number from 0 to 10, and the index k is a number from 0 to 10.

Preferably the index g has a value of 3, the index h a value from 0 to 12, and the index i a value from 8 to 30, and the indices j and k are preferably <5, in particular 0.

Alternatively (d) the radical $R^2$ may also correspond to the radical $R^1$, in which case, again the methyl radical is particularly preferred.

Including a compound of formula I in a polymerizable LC material allows easy formation of an aligned CLC phase with no visible haze while also allowing another layer to be coated on top which gives good alignment without the need for a second alignment layer.

Choosing this compound type also does not have any problems with dewetting of the upper layer in a layer stack, which is common when using surfactant additives.

The concentration of compounds of formula I and its subformulae, in the polymerizable LC material is preferably from 0.01% to 1%, more preferably from 0.03% to 0.5%, especially from 0.05% to 0.1%.

The compounds of the formula I can advantageously and preferably be prepared in accordance with the disclosure given in U.S. Pat. No. 6,858,663 or are commercially available as Tego® Twin4000.

In a preferred embodiment, the polymerizable LC material comprises one or more reactive mesogens selected from formula RMT,

RMT

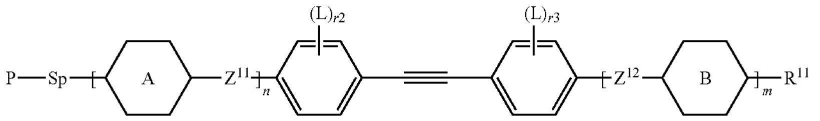

P is a polymerisable group,

Sp is a spacer group or a single bond, r2 and r3 are independently of each other 0, 1, 2, 3 or 4, $R^{11}$ is P-Sp-, alkyl, alkoxy, thioalkyl, alkylcarbonyl, alkoxycarbonyl, alkylcarbonyloxy or alkoxycarbonyloxy preferably with 1 to 15 C atoms which is more preferably optionally fluorinated.

ring A and B denote, in case of multiple occurrence independently of one another, an aromatic or alicyclic group, which optionally contains one or more heteroatoms selected from N, O and S, and is optionally mono- or polysubstituted by L, preferably 1,4-phenylene, pyridine-2,5-diyl, pyrimidine-2,5-diyl, thiophene-2,5-diyl, naphthalene-2,6-diyl, 1,2,3,4-tetrahydro-naphthalene-2,6-diyl, indane-2,5-diyl, bicyclooctylene or 1,4-cyclohexylene wherein one or two non-adjacent $CH_2$ groups are optionally replaced by O and/or S, wherein these groups are unsubstituted or substituted by 1, 2, 3 or 4 groups L L is P-Sp-, F, Cl, Br, I, —CN, $—NO_2$, —NCO, —NCS, —OCN, —SCN, —C(=O)$NR^xR^y$, —C(=O)$OR^x$, —C(=O)$R^x$, —$NR^xR^y$, —OH, $—SF_5$, or straight chain or branched alkyl, alkoxy, alkylcarbonyl, alkoxycarbonyl, alkylcarbonyloxy or alkoxycarbonyloxy with 1 to 12 C atoms, wherein one or more H atoms are optionally replaced by F or Cl, preferably F, —CN or straight chain or branched alkyl, alkoxy, alkylcarbonyl, alkoxycarbonyl, alkylcarbonyloxy or alkoxycarbonyloxy 1 to 6 C atoms, $R^x$ and $R^y$ independently of each other denote H or alkyl with 1 to 12 C-atoms, $Z^{11}$ and $Z^{12}$ denotes, in case of multiple occurrence independently of one another, —O—, —S—, —CO—, —COO—, —OCO—, —S—CO—, —CO—S—, —O—COO—, —CO—$NR^{00}$—, —$NR^{00}$—CO—, —$NR^{00}$—CO—$NR^{00}$, —$NR^{00}$—CO—O—, —O—CO—$NR^{00}$—, $—OCH_2—$, $—CH_2O—$, $—SCH_2—$, $—CH_2S—$, $—CF_2O—$, $—OCF_2—$, $—CF_2S—$, $—SCF_2—$, $—CH_2CH_2—$, $—(CH_2)_{n1}$, $—CF_2CH_2—$, $—CH_2CF_2—$, $—CF_2CF_2—$, —CH=N—, —N=CH—, —N=N—, —CH=$CR^{00}$—, —$CY^1$=$CY^2$—, —C≡C—, —CH=CH—COO—, —OCO—CH=CH— or a single bond, preferably —COO—, —OCO—, —C≡C—, or a single bond, $Y^1$ and $Y^2$ independently of each other denote H, F, Cl or CN, n is 1, 2, 3 or 4, preferably 1 or 2, most preferably 1, m is 0, 1, 2, 3 or 4, preferably 0 or 1, most preferably 0, n1 is an integer from 1 to 10, preferably 1, 2, 3 or 4.

Preferred compounds of formula I are those selected of formula RMTa or RMTb,

RMTa

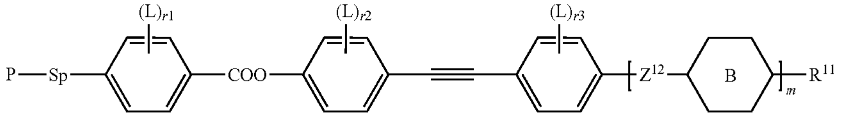

RMTb

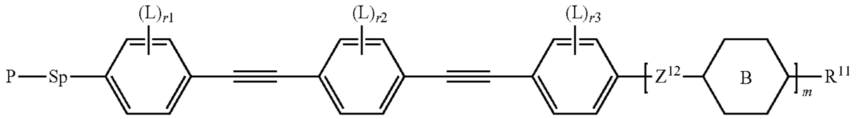

wherein

P is a polymerisable group,

Sp is a spacer group or a single bond, r1, r2, r3 are independently of each other 0, 1, 2, 3 or 4, preferably 0, 1 or 2 and L, $R^{11}$, $Z^{12}$, ring B and m have one of the meanings as given above under formula RMT.

Preferred compounds of formula RMTa are those selected of formula RMTa0 to RMTa6

RMTa0

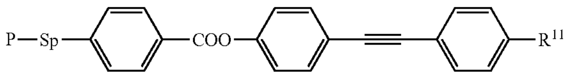

RMTa1

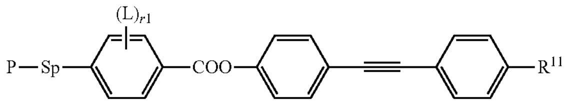

RMTa2

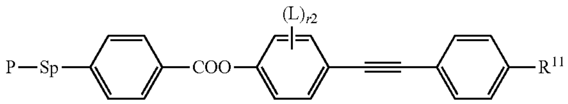

RMTa3

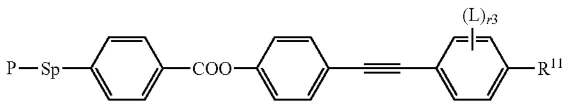

RMTa4

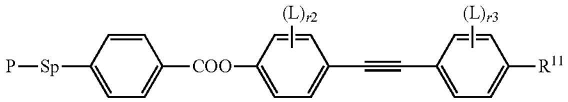

RMTa5

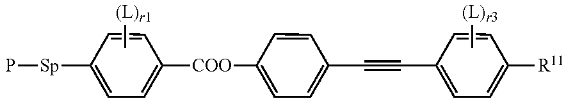

RMTa6

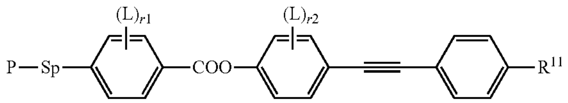

wherein L, P, Sp, and $R^{11}$ are as defined in formula RMT, r1 to r3 denotes 1, 2, 3, or 4, preferably 1 or 2.

Preferred compounds of formula RMTa0 to RMTa6 are selected of the following formulae RMTa0-A

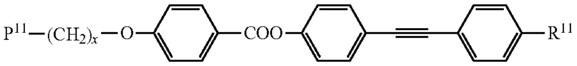

RMTa1-A

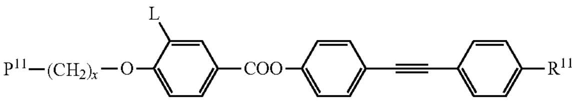

RMTa1-B

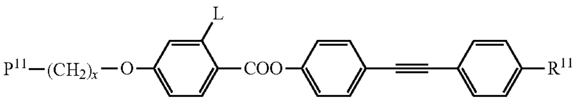

RMTa1-C

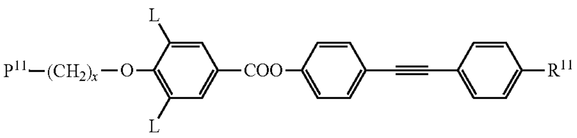

-continued

RMTa1-D

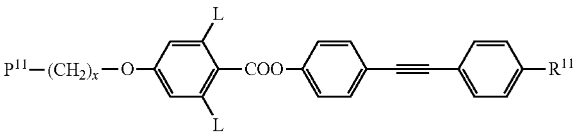

RMTa2-A

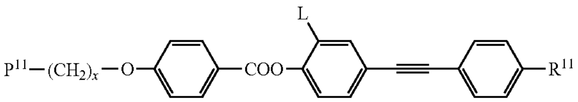

RMTa2-B

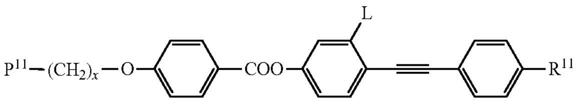

RMTa2-C

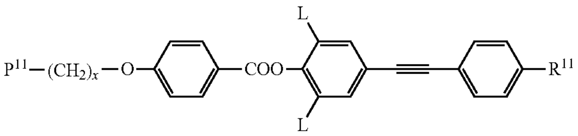

RMTa2-D

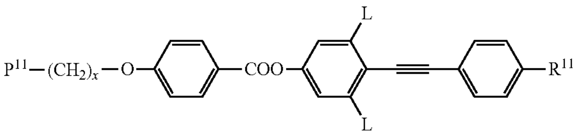

RMTa3-A

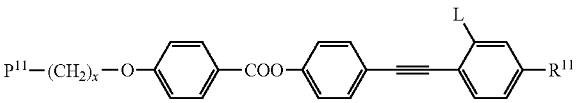

RMTa3-B

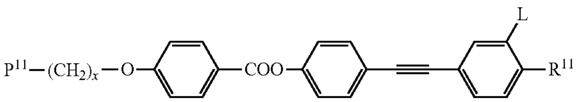

RMTa3-C

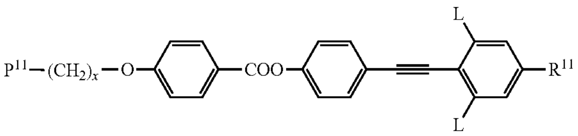

RMTa3-D

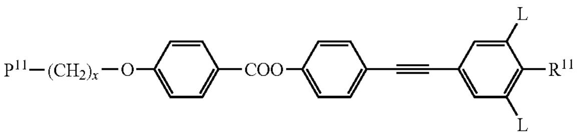

wherein $P^{11}$ is selected from the group consisting of heptadiene, vinyloxy, acrylate, methacrylate, fluoroacrylate, chloroacrylate, oxetane and epoxide groups, and very preferably denotes an acrylate, methacrylate or oxetane group, especially an acrylate or methacrylate group, in particular an acrylate group, and x is an integer from 0 to 12, preferably from 1 to 8, more preferably 3, 4, 5 or 6, in particular x denotes 3 or 6, especially 6 and $R^{11}$ denotes alkyl, alkoxy, alkylcarbonyl, alkoxycarbonyl, alkylcarbonyloxy or alkoxycarbonyloxy preferably with 1 to 15 C atoms which is more preferably optionally fluorinated and L has on each occurrence one of the meanings as given above under formula RMT.
Especially preferred are the compounds of formula RMTa2, which are preferably selected from the following formulae:
RMTa2-A1
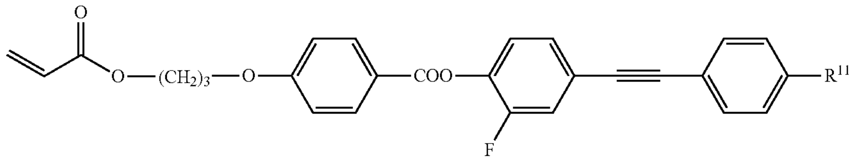
RMTa2-A2
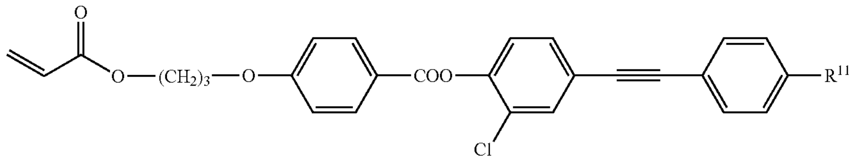
RMTa2-A3
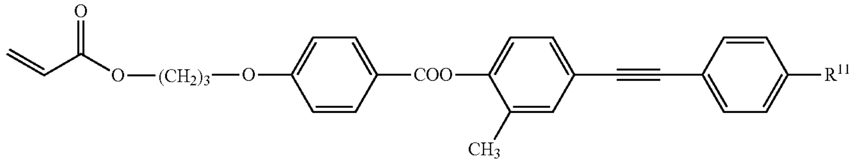
RMTa2-A4
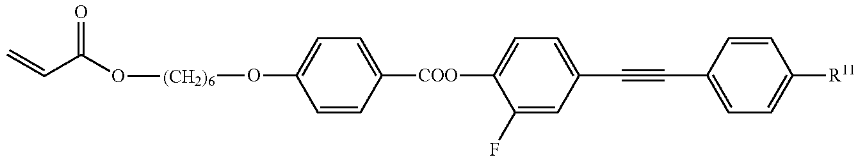
RMTa2-A5
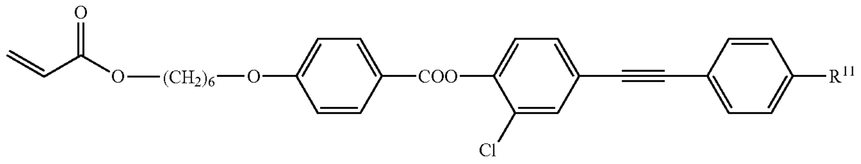
RMTa2-A6
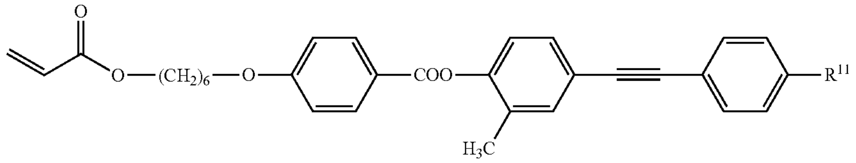
RMTa2-B1
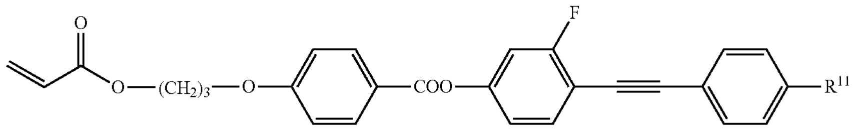
RMTa2-B2
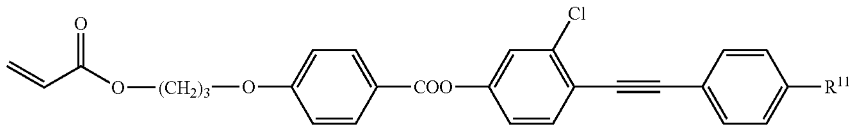
RMTa2-B3
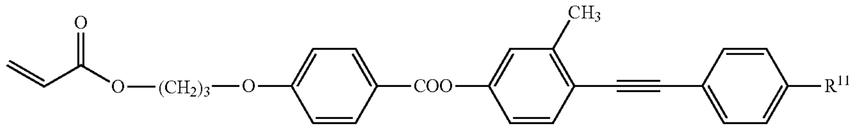

-continued
RMTa2-B4
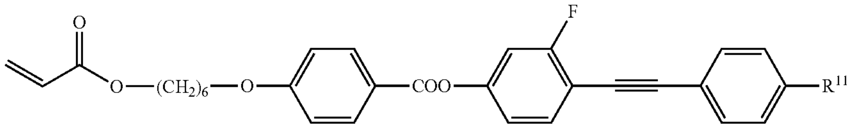
RMTa2-B5
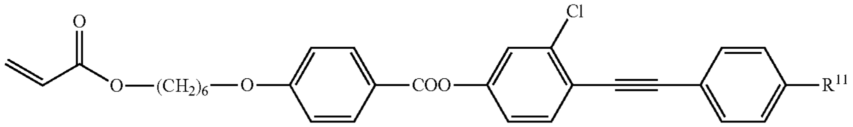
RMTa2-B6
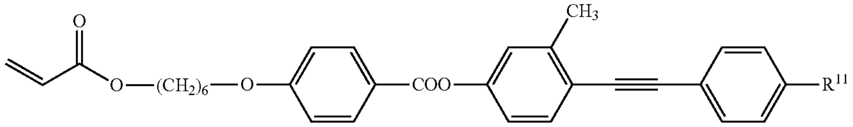
RMTa2-C1
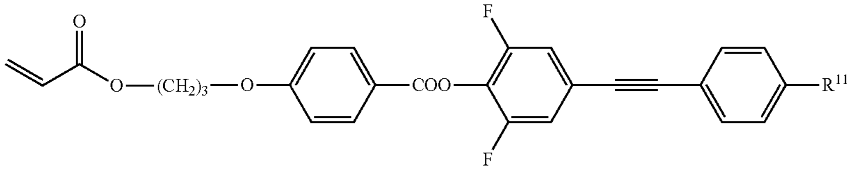
RMTa2-C2
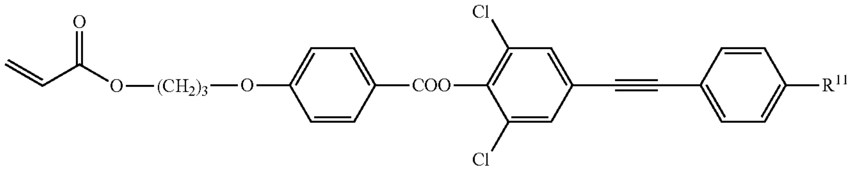
RMTa2-C3
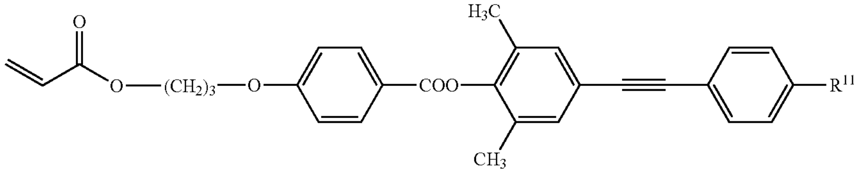
RMTa2-C4
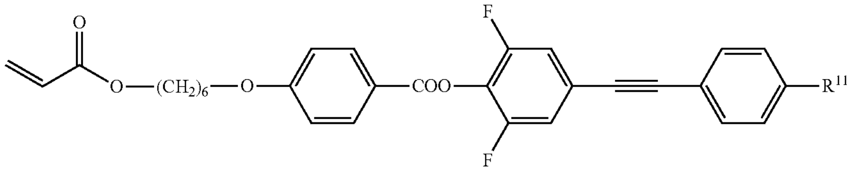
RMTa2-C5
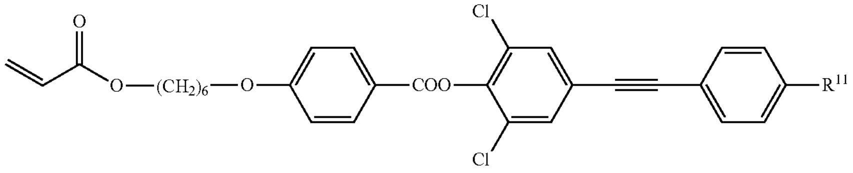
RMTa2-C6
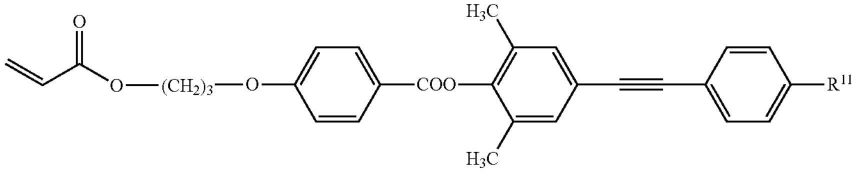

-continued

RMTa2-D1

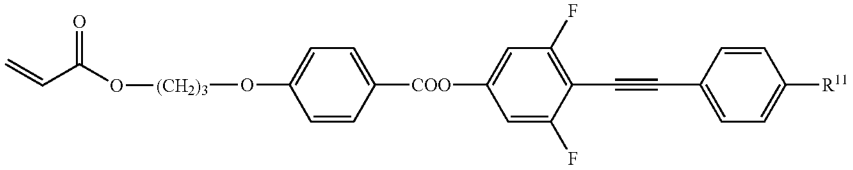

RMTa2-D2

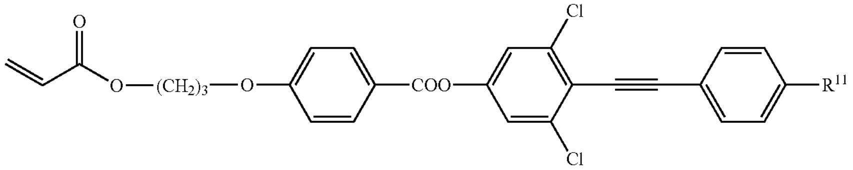

RMTa2-D3

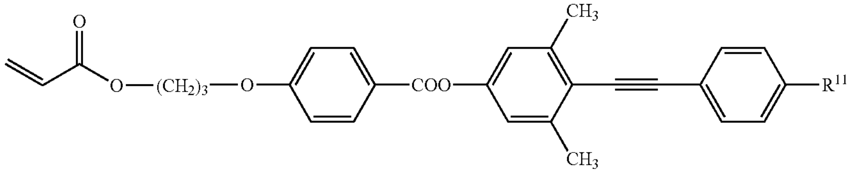

RMTa2-D4

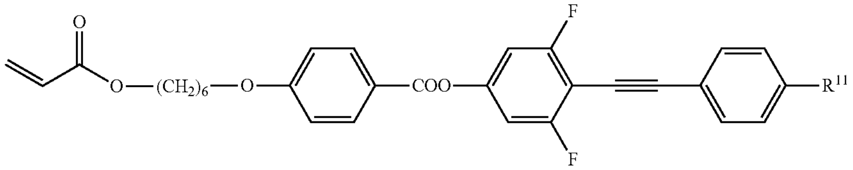

RMTa2-D5

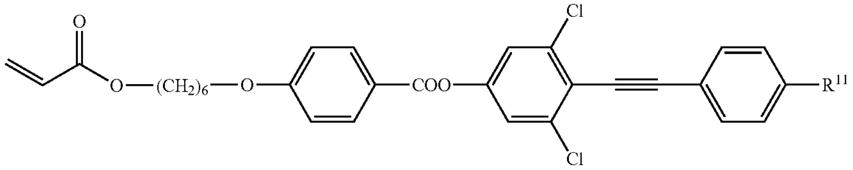

RMTa2-D6

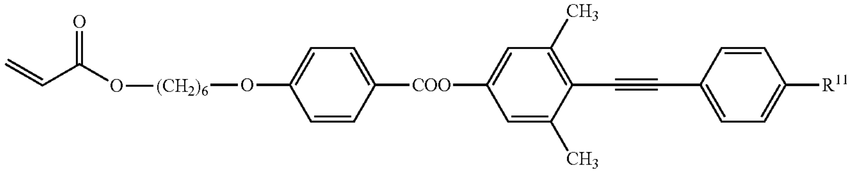

wherein $R^{11}$ has one of the meanings as given above under formula RMT, preferably $R^{11}$ denotes alkyl or alkoxy, more preferably, methoxy, ethoxy, propoxy, methyl, ethyl, propyl, butyl, pentyl, isopropyl or isobutyl, in particular methoxy.

Preferred compounds of formula RMTb are those selected of formula RMTb0 to RMTb6

RMTb0

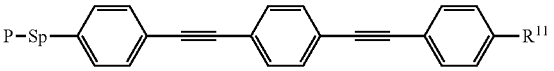

RMTb1

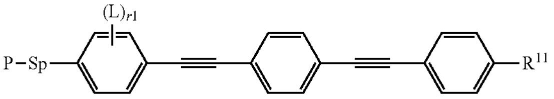

-continued

RMTb2

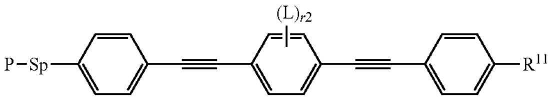

RMTb3

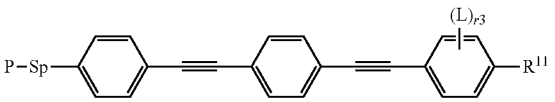

RMTb4

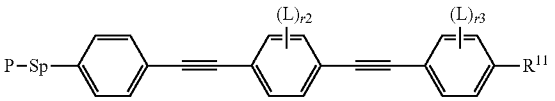

-continued

RMTb5

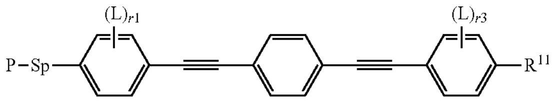

RMTb6

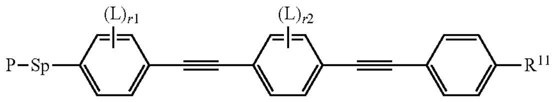

wherein L, P, Sp, and $R^{11}$ are as defined in formula RMT, r1 to r3 denotes 1, 2, 3, or 4, preferably 1 or 2.

Preferred compounds of formula RMTb0 to RMTb6 are selected of the following formulae RMTb0-A

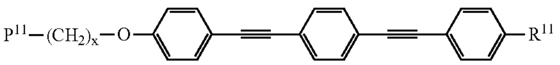

RMTb1-A

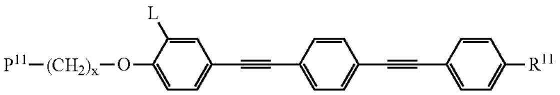

RMTb1-B

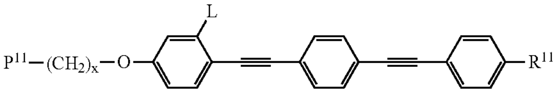

RMTb1-C

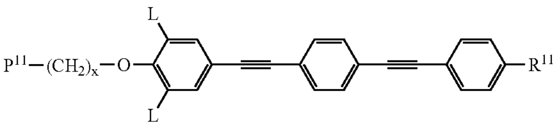

RMTb1-D

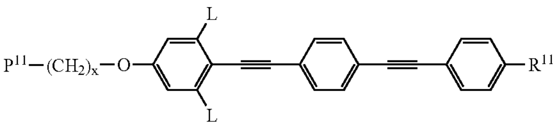

RMTb2-A

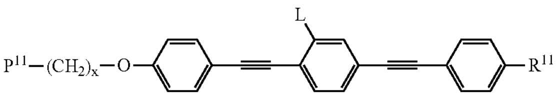

RMTb2-B

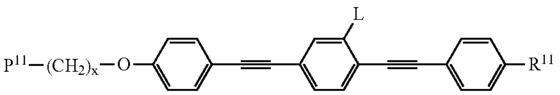

-continued

RMTb2-C

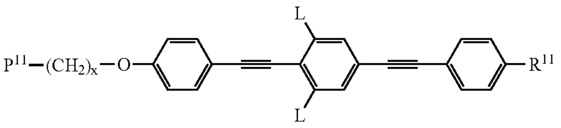

RMTb2-D

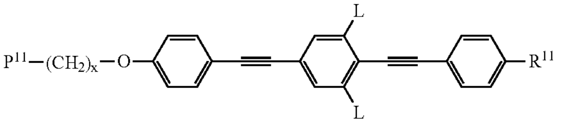

RMTb3-A

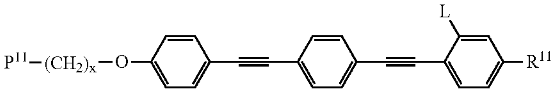

RMTb3-B

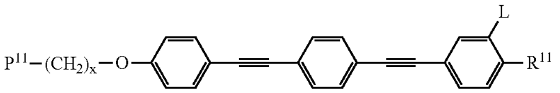

RMTb3-C

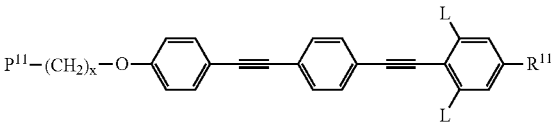

RMTb3-D

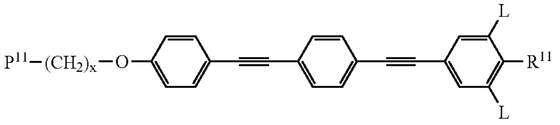

wherein $P^{11}$ is selected from the group consisting of heptadiene, vinyloxy, acrylate, methacrylate, fluoroacrylate, chloroacrylate, oxetane and epoxide groups, and very preferably denotes an acrylate, methacrylate or oxetane group, especially an acrylate or methacrylate group, in particular an acrylate group, and x is an integer from 0 to 12, preferably from 1 to 8, more preferably 3, 4, 5 or 6, in particular x denotes 3 or 6, especially 6 and $R^{11}$ denotes alkyl, alkoxy, alkylcarbonyl, alkoxycarbonyl, alkylcarbonyloxy or alkoxycarbonyloxy preferably with 1 to 15 C atoms which is more preferably optionally fluorinated and L has on each occurrence one of the meanings as given above under formula RMT.

Especially preferred are the compounds of formula RMTb2, which are preferably selected from the following formulae:

RMTb2-A1

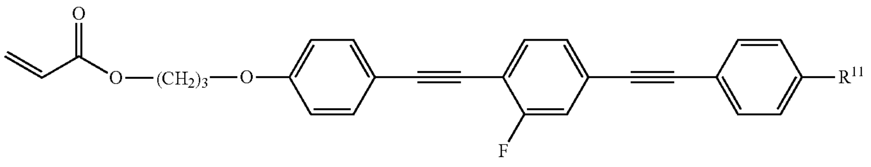

-continued
RMTb2-A2
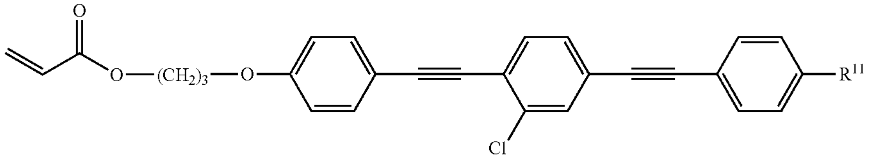
RMTb2-A3
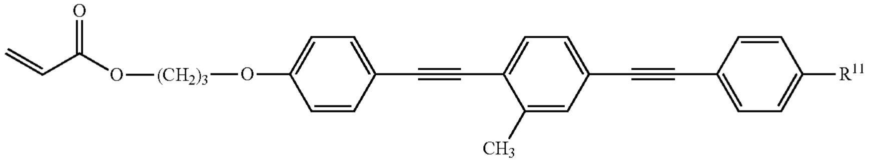
RMTb2-A4
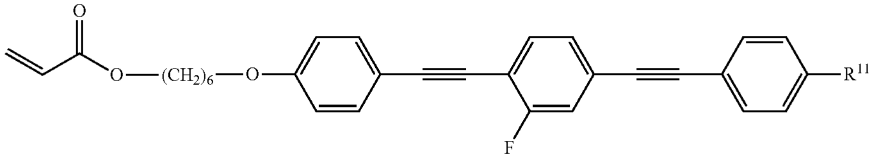
RMTb2-A5
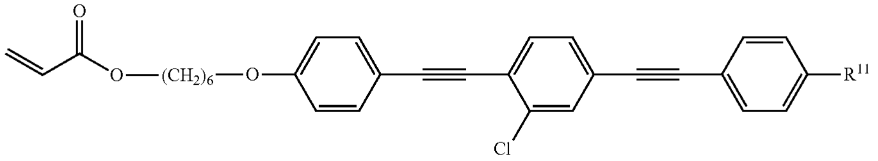
RMTb2-A6
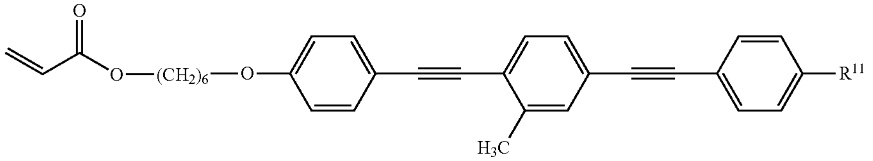
RMTb2-B1
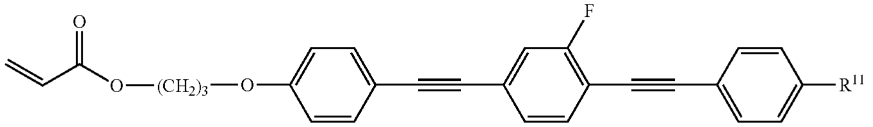
RMTb2-B2
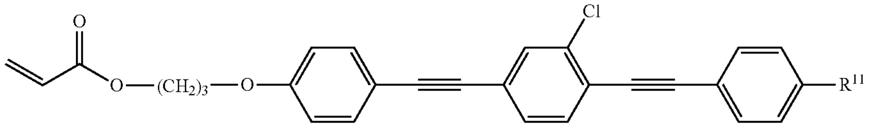
RMTb2-B3
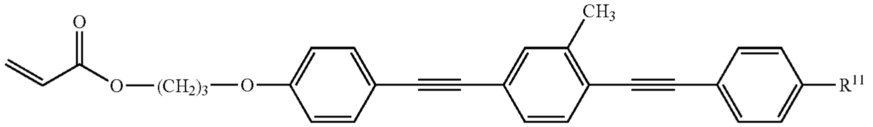
RMTb2-B4
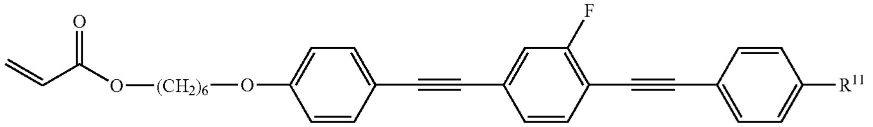
RMTb2-B5
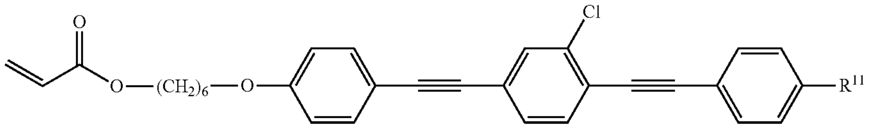

-continued
RMTb2-B6
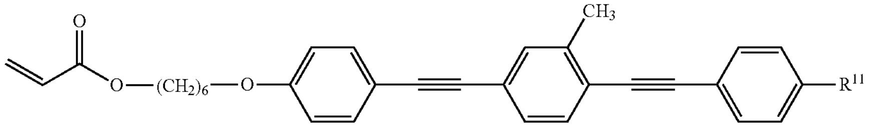
RMTb2-C1
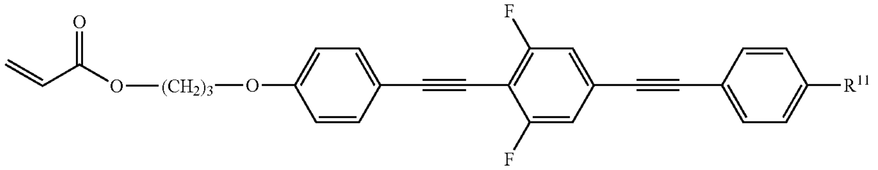
RMTb2-C2
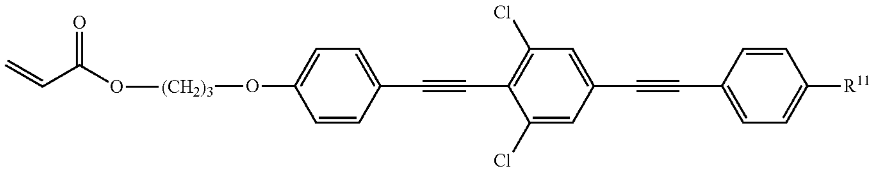
RMTb2-C3
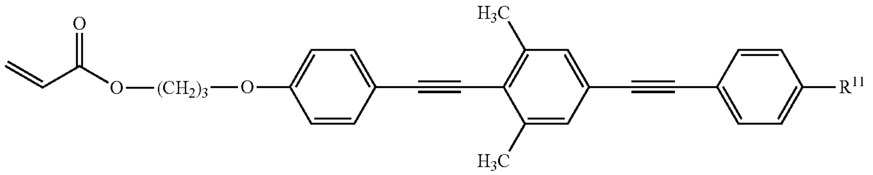
RMTb2-C4
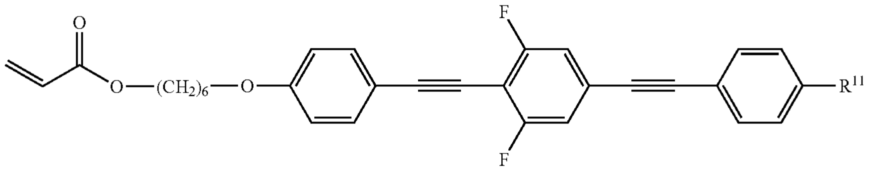
RMTb2-C5
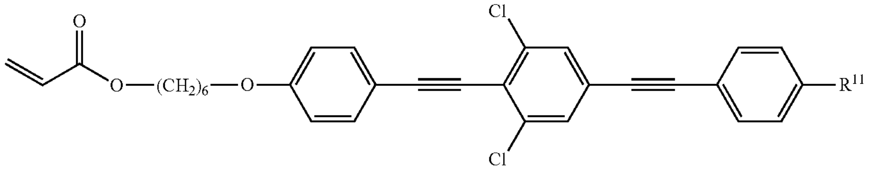
RMTb2-C6
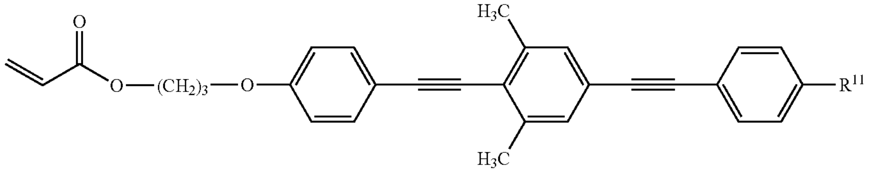
RMTb2-D1
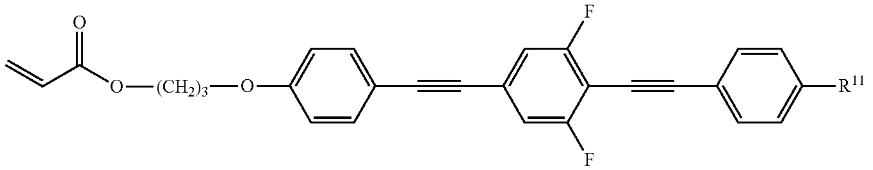
RMTb2-D2
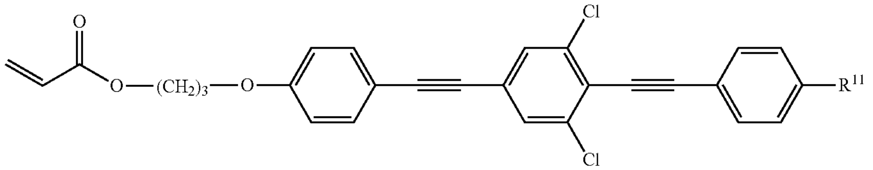

-continued
RMTb2-D3
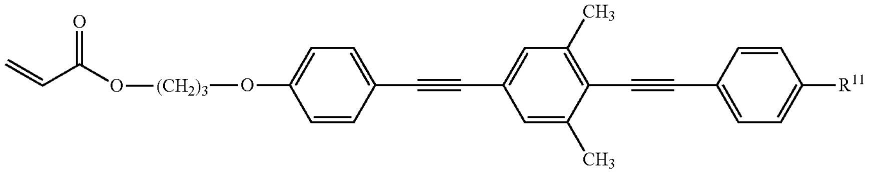
RMTb2-D4
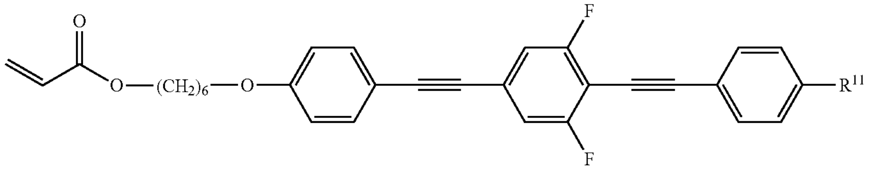
RMTb2-D5
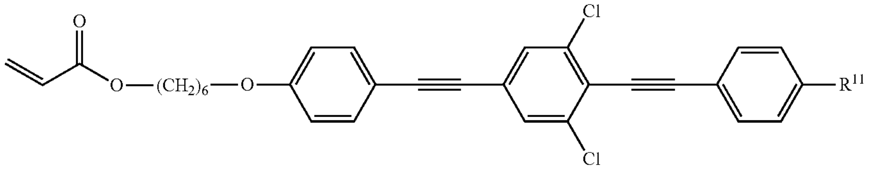
RMTb2-D6
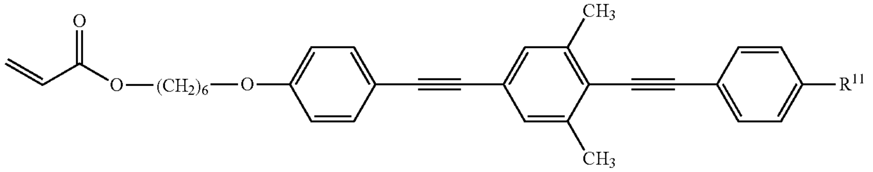
Wherein $R^{11}$ has one of the meanings as given above under formula RMT. preferably $R^{11}$ denotes alkyl or alkoxy.
Further preferred are compounds of formula RMTb2-A1, which are selected from compounds of the following formulae,
RMTb2-A1
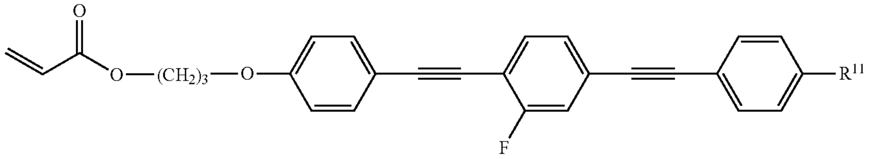
RMTb2-A2
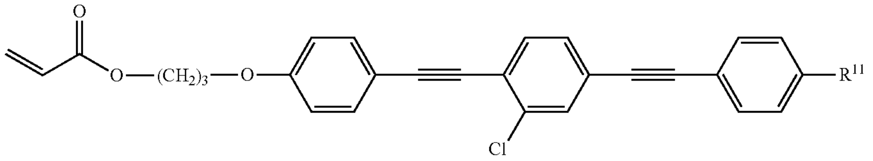
RMTb2-A3
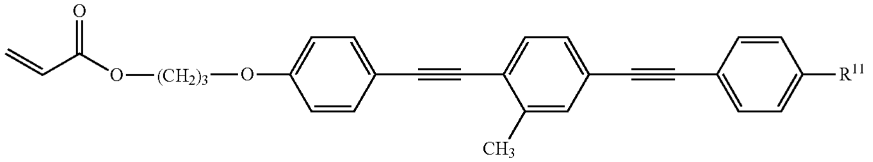
RMTb2-A4
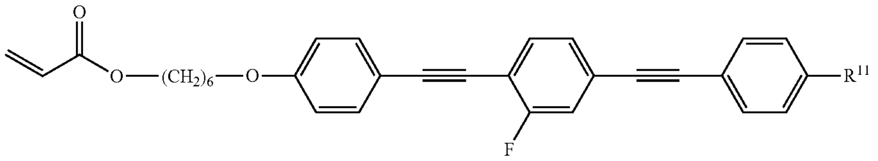

-continued
RMTb2-A5
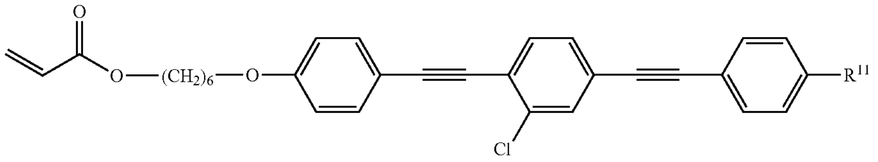
RMTb2-A6
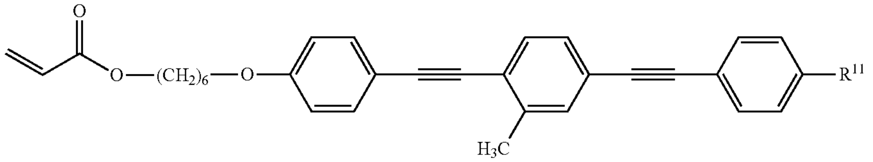
RMTb2-B1
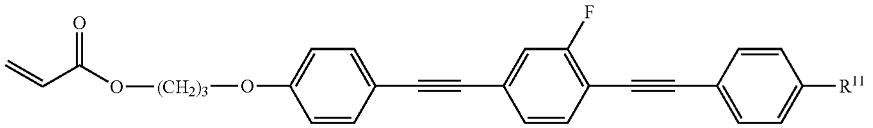
RMTb2-B2
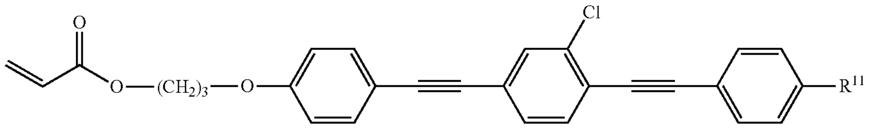
RMTb2-B3
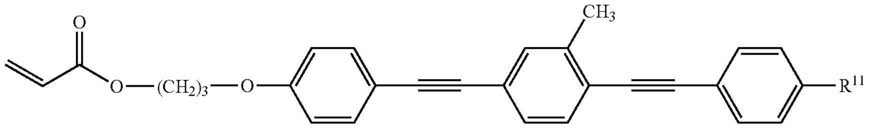
RMTb2-B4
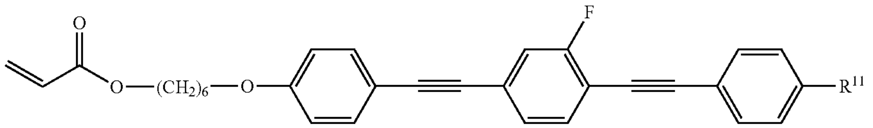
RMTb2-B5
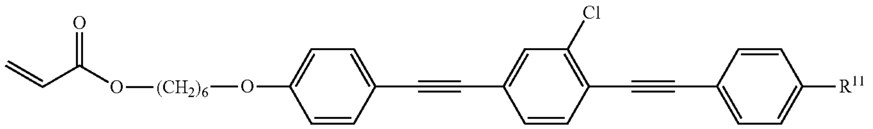
RMTb2-B6
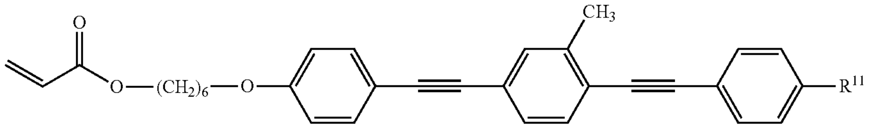
RMTb2-C1
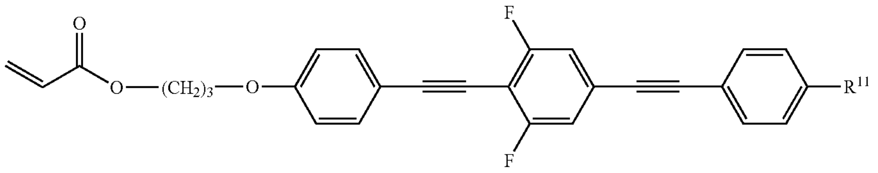
RMTb2-C2
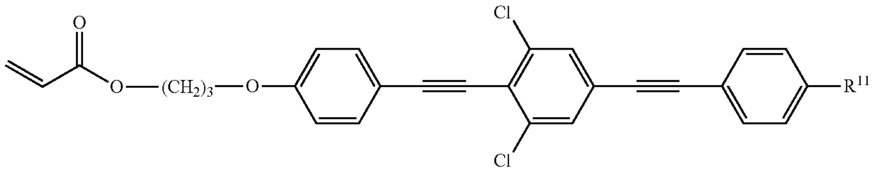

-continued
RMTb2-C3
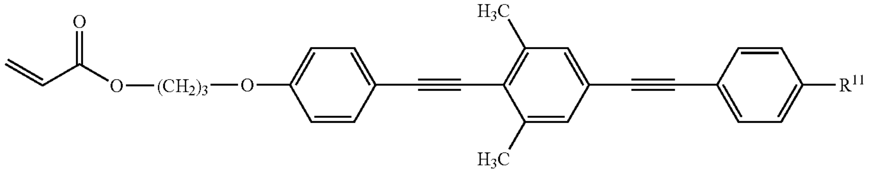
RMTb2-C4
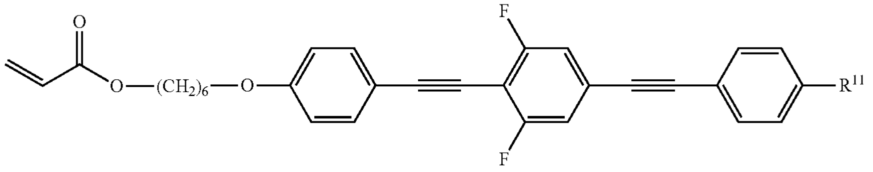
RMTb2-C5
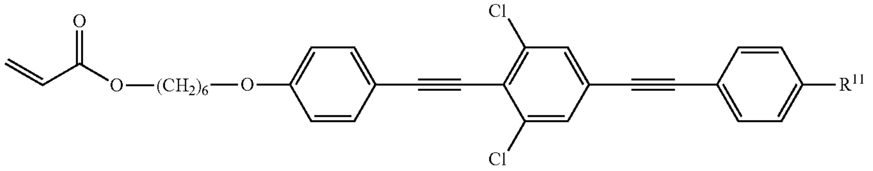
RMTb2-C6
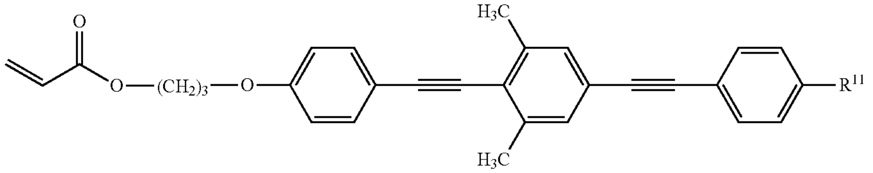
RMTb2-D1
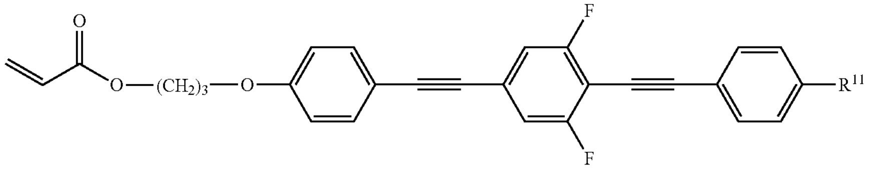
RMTb2-D2
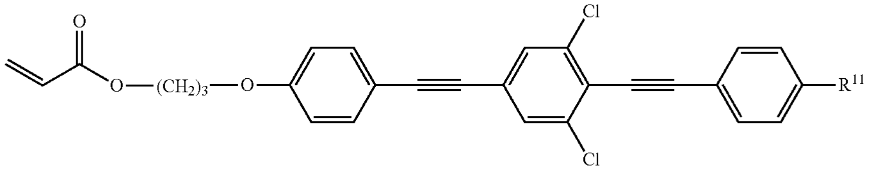
RMTb2-D3
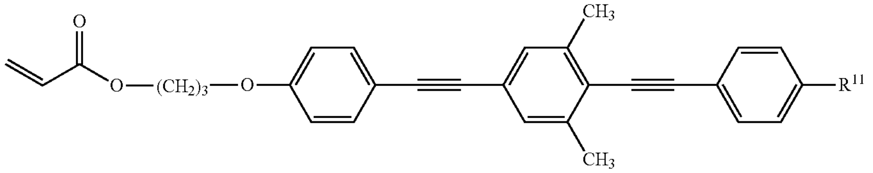
RMTb2-D4
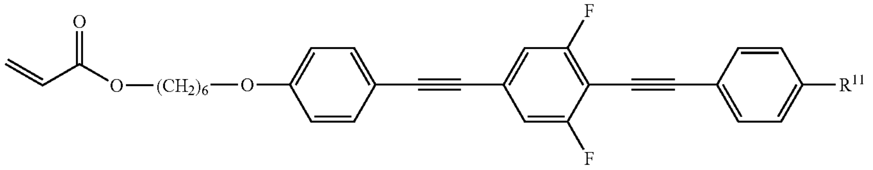
RMTb2-D5
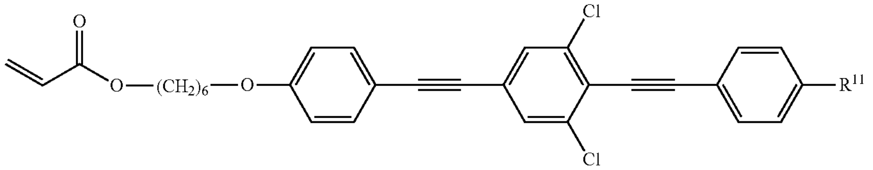

-continued

RMTb2-D6

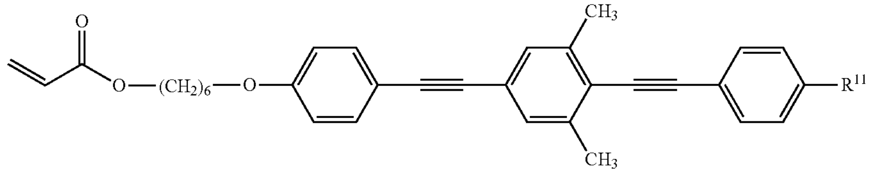

Wherein $R^{11}$ has one of the meanings as given above under formula RMT, preferably $R^{11}$ denotes alkyl or alkoxy, more preferably, methoxy, ethoxy, propoxy, methyl, ethyl, propyl, butyl, pentyl, isopropyl or isobutyl, in particular methoxy.

Preferably the polymerizable LC material comprises one or more, preferably two or more compounds selected from formulae RMTa2-A3 to RMTa2-A6 or RMTb2-A3, especially the polymerizable LC material comprises one or more compounds of formula RMTb2-A3, in particular the polymerizable LC material comprises a combination of compounds of formulae RMTa2-A4 and/or RMTa2-A5 with RMTb2-A3.

By utilizing one or more compounds of formula RMT in the polymerisable LC materials the birefringence of a polymer film can be beneficially increased. The corresponding reflection bandwidth is related to birefringence by the following formula:

$$\text{Bandwidth}=\Delta n*\text{pitch},$$

it can be seen that by increasing the birefringence of the cholesteric polymer film, it is possible to achieve a wider bandwidth of reflection. By utilizing compounds of formula I together with compounds of formula RMT in a polymerizable LC material, it is possible to widen the reflection bandwidth significantly of a corresponding polymer film while also not negatively affecting film properties such as wet film crystallization or dewetting.

The concentration of compounds of formula RMT and its subformulae, in the polymerizable LC material is preferably from 40% to 99%, more preferably from 45 to 95%, especially from 50 to 90%.

The compounds of formula RMT are either commercially available from Merck KGaA, Darmstadt or can be synthesized in accordance with the procedures given for example in U.S. Pat. No. 6,514,578 or U.S. Ser. No. 15/575,415.

In a preferred embodiment, the polymerizable LC material comprises one or more di- or multireactive reactive mesogens that are preferably selected of formula DRM $$P^1\text{-}Sp^1\text{-}MG\text{-}Sp^2\text{-}P^2 \qquad \text{DRM}$$

wherein $P^1$ and $P^2$ independently of each other denote a polymerisable group, $Sp^1$ and $Sp^2$ independently of each other are a spacer group or a single bond, and MG is a rod-shaped mesogenic group, which is preferably selected of formula MG $$\text{-}(A^1\text{-}Z^1)_n\text{-}A^2\text{-} \qquad \text{MG}$$

wherein $A^1$ and $A^2$ denote, in case of multiple occurrence independently of one another, an aromatic or alicyclic group, which optionally contains one or more heteroatoms selected from N, O and S, and is optionally mono- or polysubstituted by L, L is P-Sp-, F, Cl, Br, I, —CN, —$NO_2$, —NCO, —NCS, —OCN, —SCN, —C(═O)$NR^xR^y$, —C(═O)$OR^x$, —C(═O)$R^x$, —$NR^xR^y$, —OH, —$SF_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, $R^x$ and $R^y$ independently of each other denote H or alkyl with 1 to 12 C-atoms, $Z^1$ denotes, in case of multiple occurrence independently of one another, —O—, —S—, —CO—, —COO—, —OCO—, —S—CO—, —CO—S—, —O—COO—, —CO—$NR^x$—, —$NR^x$—CO—, —$NR^x$—CO—$NR^y$, —$NR^x$—CO—O—, —O—CO—$NR^x$—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$, —$CF_2CH_2$—, —$CH_2CF_2$—, —$CF_2CF_2$—, —CH═N—, —N═CH—, —N═N—, —CH═$CR^x$—, —$CY^1$═$CY^2$—, —C≡C—, —CH═CH—COO—, —OCO—CH═CH— or a single bond, preferably —COO—, —OCO— or a single bond, $Y^1$ and $Y^2$ independently of each other denote H, F, C or CN, n is 1, 2, 3 or 4, preferably 1 or 2, most preferably 2, n1 is an integer from 1 to 10, preferably 1, 2, 3 or 4, however, under the condition that compounds of formula RMT are excluded from the compounds of formula DRM.

Preferred groups $A^1$ and $A^2$ include, without limitation, furan, pyrrol, thiophene, oxazole, thiazole, thiadiazole, imidazole, phenylene, cyclohexylene, bicyclooctylene, cyclohexenylene, pyridine, pyrimidine, pyrazine, azulene, indane, fluorene, naphthalene, tetrahydronaphthalene, anthracene, phenanthrene and dithienothiophene, all of which are unsubstituted or substituted by 1, 2, 3 or 4 groups L as defined above.

Particular preferred groups $A^1$ and $A^2$ are selected from 1,4-phenylene, pyridine-2,5-diyl, pyrimidine-2,5-diyl, thiophene-2,5-diyl, naphthalene-2,6-diyl, 1,2,3,4-tetrahydronaphthalene-2,6-diyl, indane-2,5-diyl, bicyclooctylene or 1,4-cyclohexylene wherein one or two non-adjacent $CH_2$ groups are optionally replaced by 0 and/or S, wherein these groups are unsubstituted or substituted by 1, 2, 3 or 4 groups L as defined above.

Preferred RMs of formula DRM are selected of formula DRMa

DRMa

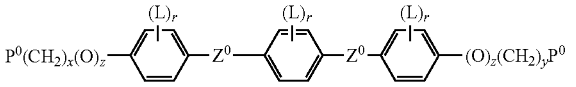

wherein $P^0$ is, in case of multiple occurrence independently of one another, a polymerisable group, preferably an acryl, methacryl, oxetane, epoxy, vinyl, heptadiene, vinyloxy, propenyl ether or styrene group, x and y are independently of each other 0 or identical or different integers from 1 to 12, z is 0 or 1, with z being 0 if the adjacent x or y is 0.

Very preferred RMs of formula DRM are selected from the following formulae:

DRMa1

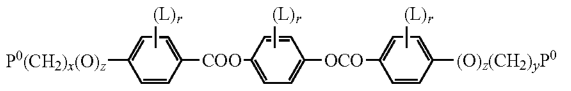

DRMa2

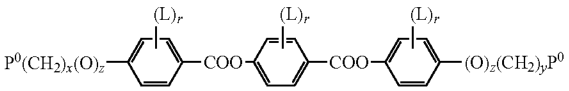

DRMa3

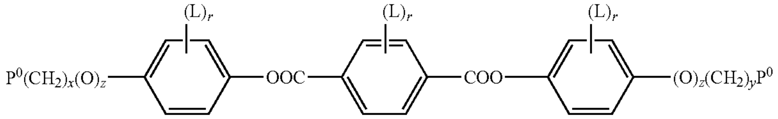

DRMa4

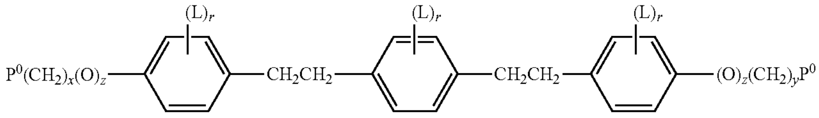

DRMa5

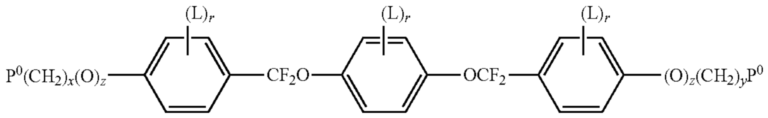

DRMa6

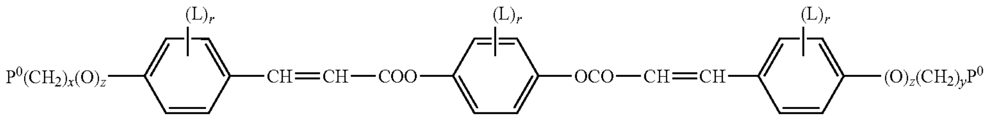

DRMa7

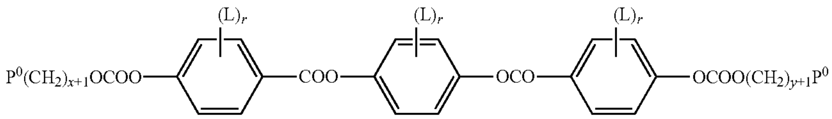

DRMb

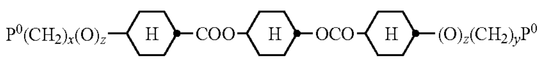

DRMc

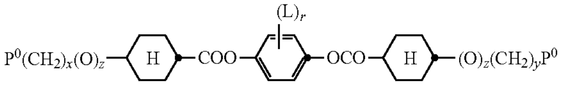

DRMd

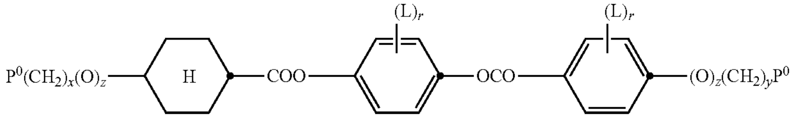

DRMe

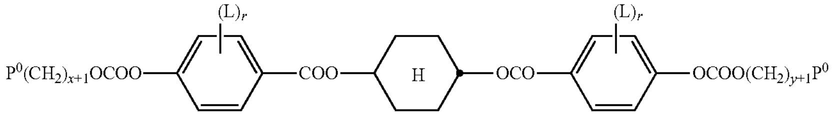

$Z^0$ is —COO—, —OCO—, —$CH_2CH_2$—, —$CF_2O$—, —$OCF_2$—, —C≡C—, —CH═CH—, —OCO—CH═CH—, —CH═CH—COO—, or a single bond, L has on each occurrence identically or differently one of the meanings given for $L^1$ in formula I, and is preferably, in case of multiple occurrence independently of one another, selected from F, Cl, CN or optionally halogenated alkyl, alkoxy, alkylcarbonyl, alkoxycarbonyl, alkylcarbonyloxy or alkoxycarbonyloxy with 1 to 5 C atoms, r is 0, 1, 2, 3 or 4, wherein $P^0$, L, r, x, y and z are as defined in formula DRMa.

Especially preferred are compounds of formula DRMa1, DRMa2 and DRMa3, in particular those of formula DRMa1.

The concentration of di- or multireactive RMs, preferably those of formula DRM and its subformulae, in the RM mixture is preferably from 1% to 60%, very preferably from 5 to 40%.

In another preferred embodiment the RM mixture comprises one or more monoreactive RMs. These additional monoreactive RMs are preferably selected from formula MRM:

$P^1$—$Sp^1$-MG-R MRM wherein $P^1$, $Sp^1$ and MG have the meanings given in formula DRM, R denotes P-Sp-, F, Cl, Br, I, —CN, —$NO_2$, —NCO, —NCS, —OCN, —SCN, —C(═O)$NR^xR^y$, —C(═O)X, —C(═O)$OR^x$, —C(═O)$R^y$, —$NR^xR^y$, —OH, —$SF_5$, optionally substituted silyl, straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, X is halogen, preferably F or Cl, and $R^x$ and $R^y$ are independently of each other H or alkyl with 1 to 12 C-atoms, however, under the condition that compounds of formula RMT are excluded from the compound of formula MRM.

Preferably the compounds of formula MRM are selected from the following formulae.

MRM1

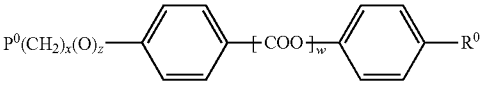

MRM2

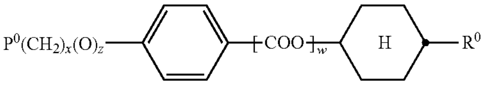

MRM3

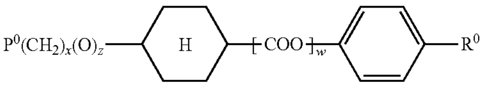

MRM4

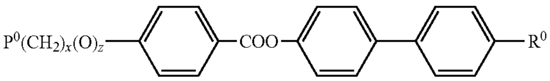

MRM5

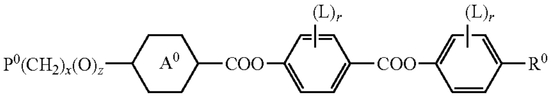

MRM6

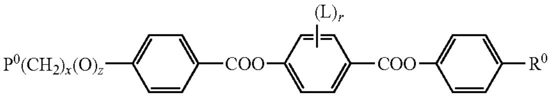

MRM7

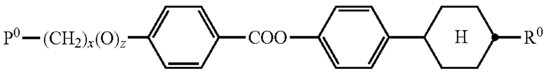

MRM8

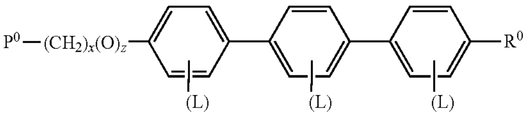

MRM9

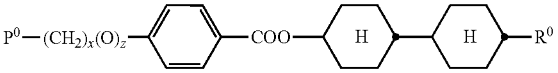

MRM10

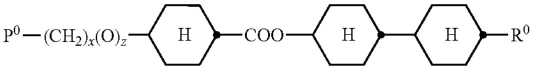

MRM11

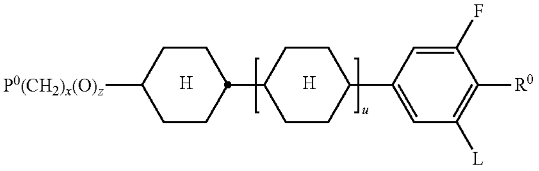

MRM12

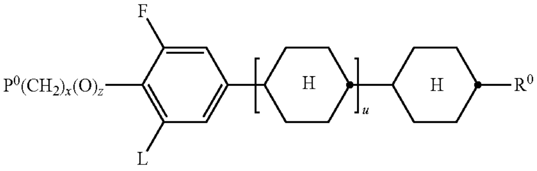

MRM13

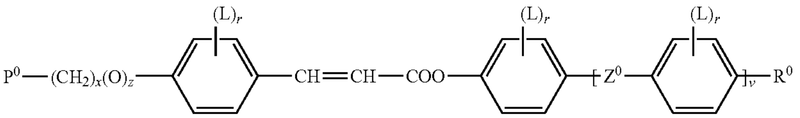

MRM14

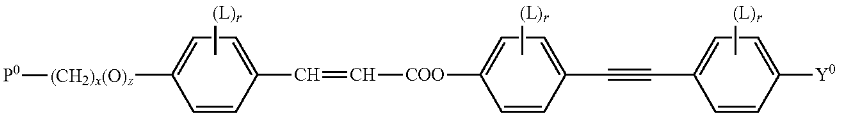

MRM15

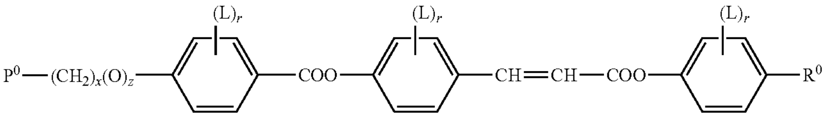

MRM16

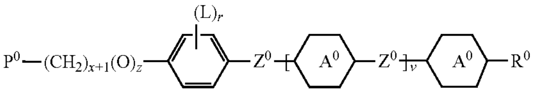

MRM17

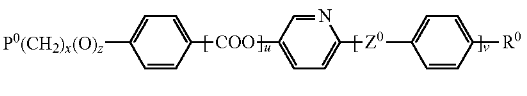

-continued

MRM18

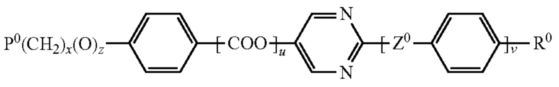

MRM19

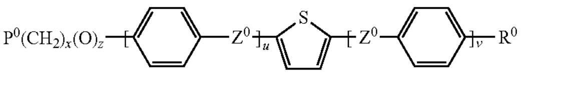

MRM20

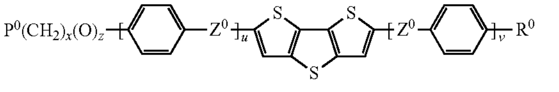

MRM21

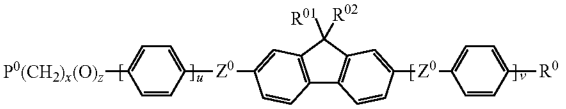

MRM22

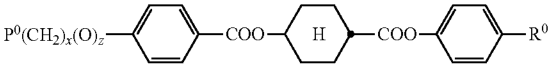

MRM23

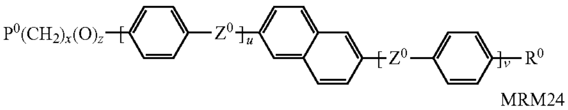

MRM24

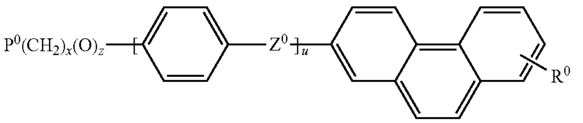

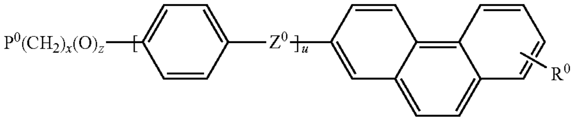

wherein $P^0$, L, r, x, y and z are as defined in formula DRMa, $R^0$ is alkyl, alkoxy, thioalkyl, alkylcarbonyl, alkoxycarbonyl, alkylcarbonyloxy or alkoxycarbonyloxy with 1 or more, preferably 1 to 15 C atoms or denotes $Y^0$ or $P—(CH_2)_y—(O)_z—$, $X^0$ is —O—, —S—, —CO—, —COO—, —OCO—, —O—COO—, —CO—$NR^{01}$—, —$NR^{01}$—CO—, —$NR^{01}$—CO—$NR^{01}$—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH═N—, —N═CH—, —N═N—, —CH═$CR^{01}$—, —CF═CF—, —C≡C—, —CH═CH—COO—, —OCO—CH═CH— or a single bond $Y^0$ is F, Cl, CN, $NO_2$, $OCH_3$, OCN, SCN, $SF_5$, or mono-oligo- or polyfluorinated alkyl or alkoxy with 1 to 4 C atoms, $Z^0$ is —COO—, —OCO—, —$CH_2CH_2$—, —$CF_2O$—, —$OCF_2$—, —CH═CH—, —OCO—CH═CH—, —CH═CH—COO—, or a single bond, $A^0$ is, in case of multiple occurrence independently of one another, 1,4-phenylene that is unsubstituted or substituted with 1, 2, 3 or 4 groups L, or trans-1,4-cyclohexylene, $R^{01,02}$ are independently of each other H, $R^0$ or $Y^0$, u and v are independently of each other 0, 1 or 2, w is 0 or 1, and wherein the benzene and naphthalene rings can additionally be substituted with one or more identical or different groups L.

Especially preferred are compounds of formula MRM1, MRM2, MRM3, MRM4, MRM5, MRM6, MRM7, in particular those of formula MRM1, MRM4, MRM6, and MRM7.

The concentration of all monoreactive RMs, including those of formula RMT, in the polymerizable LC material is preferably from 1 to 80%, very preferably from 5 to 20%.

In formulae DRM, MRM and their preferred subformulae, L is preferably selected from F, Cl, CN, $NO_2$ or straight chain or branched alkyl, alkoxy, alkylcarbonyl, alkoxycarbonyl, alkylcarbonlyoxy or alkoxycarbonyloxy with 1 to 12 C atoms, wherein the alkyl groups are optionally perfluorinated, or P-Sp-.

Very preferably L is selected from F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, in particular F, Cl, CN, $CH_3$, $C_2H_5$, $C(CH_3)_3$, $CH(CH_3)_2$, $OCH_3$, $COCH_3$ or $OCF_3$, most preferably F, Cl, $CH_3$, $C(CH_3)_3$, $OCH_3$ or $COCH_3$, or P-Sp-.

Preferably the polymerizable LC material according to the present invention comprises one or more chiral compounds. These chiral compounds may be non-mesogenic compounds or mesogenic compounds. Additionally, these chiral compounds, whether mesogenic or non-mesogenic, may be non-reactive, monoreactive or multireactive.

Preferably the utilized chiral compounds have each alone or in combination with each other an absolute value of the helical twisting power ($|HTP_{total}|$) of 20 $\mu m^{-1}$ or more, preferably of 40 $\mu m^{-1}$ or more, more preferably in the range of 60 $\mu m^{-1}$ or more, most preferably in the range of 80 $\mu m^{-1}$ or more to 260 $\mu m^{-1}$, in particular those disclosed in WO 98/00428.

Preferably, non-polymerisable chiral compounds are selected from the group of compounds of formulae C-I to C-III,

C-I

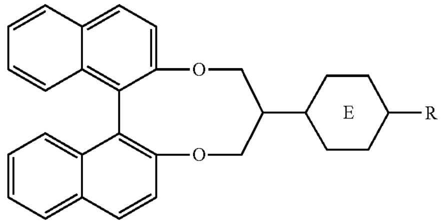

C-II

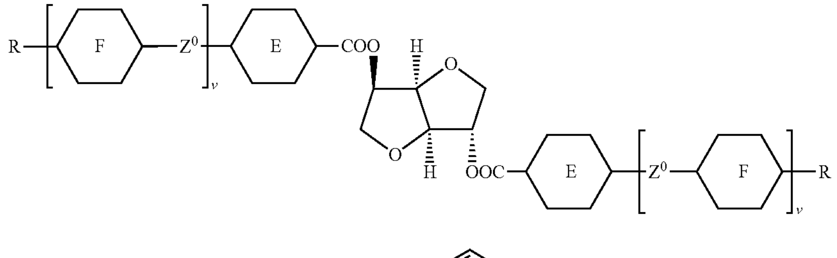

C-III

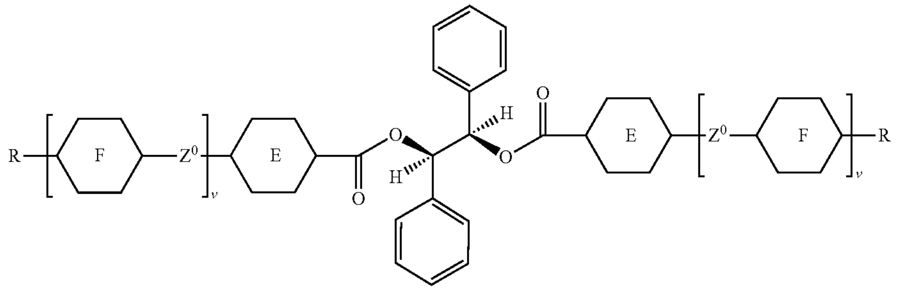

the latter ones including the respective (S,S) enantiomers, wherein E and F are each independently 1,4-phenylene or trans-1,4-cyclohexylene, v is 0 or 1, $Z^0$ is —COO—, —OCO—, —$CH_2CH_2$— or a single bond, and R is alkyl, alkoxy or alkanoyl with 1 to 12 C atoms.

Particularly preferred polymerizable LC materials that comprise one or more chiral compounds, which do not necessarily have to show a liquid crystalline phase.

The compounds of formula C-II and their synthesis are described in WO 98/00428. Especially preferred is the compound CD-1, as shown in table D below. The compounds of formula C-III and their synthesis are described in GB 2 328 207.

Further, typically used chiral compounds are e.g. the commercially available R/S-5011, CD-1, R/S-811 and CB-15 (from Merck KGaA, Darmstadt, Germany).

The above mentioned chiral compounds R/S-5011 and CD-1 and the (other) compounds of formulae C-I, C-II and C-III exhibit a very high helical twisting power (HTP), and are therefore particularly useful for the purpose of the present invention.

The polymerizable LC material preferably comprises 1 to 5, in particular 1 to 3, very preferably 1 or 2 chiral compounds, preferably selected from the above formula C-II, in particular CD-1, and/or formula C-III and/or R-5011 or S-5011, very preferably, the chiral compound is R-5011, S-5011 or CD-1.

Preferably the polymerizable LC material comprise one or more non-reactive chiral compound and/or one or more reactive chiral compounds, which are preferably selected from mono- and/or multireactive chiral compounds.

Suitable mesogenic reactive chiral compounds preferably comprise one or more ring elements, linked together by a direct bond or via a linking group and, where two of these ring elements optionally may be linked to each other, either directly or via a linking group, which may be identical to or different from the linking group mentioned. The ring elements are preferably selected from the group of four-, five-, six- or seven-, preferably of five- or six-, membered rings.

Preferred mono-reactive chiral compounds are selected from compounds of formula CRMa to CRMc, CRMa

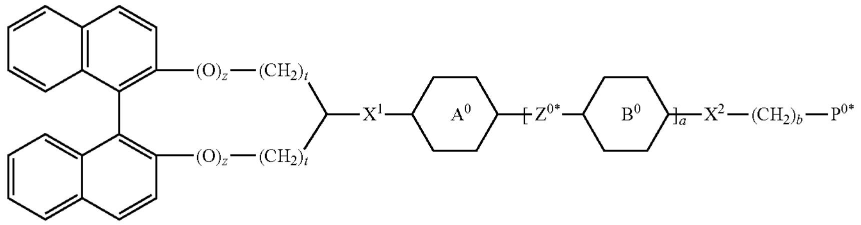

-continued

CRMb

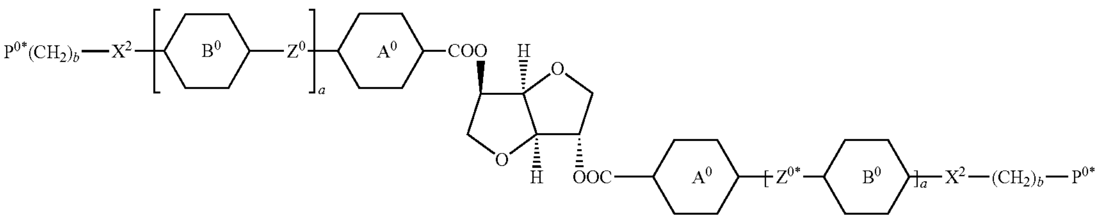

CRMc

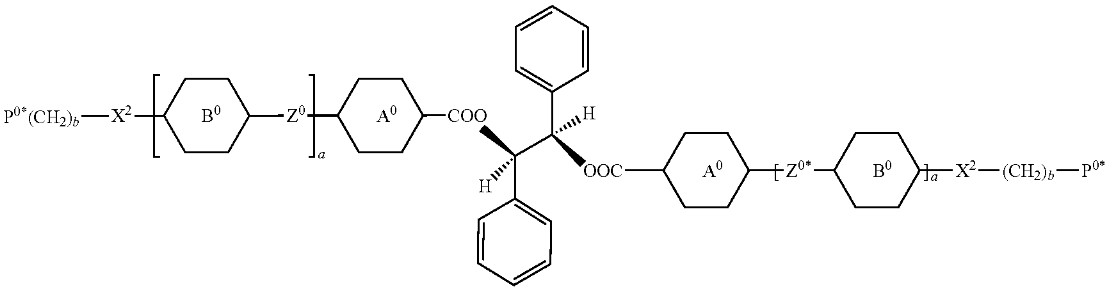

wherein $P^{0*}$ denotes a polymerisable group P

Sp* denotes a spacer Sp $A^0$ and $B^0$ are, in case of multiple occurrence independently of one another, 1,4-phenylene that is unsubstituted or substituted with 1, 2, 3 or 4 groups L as defined above, or trans-1,4-cyclohexylene, $X^1$ and $X^2$ are independently of each other —O—, —COO—, —OCO—, —O—CO—O— or a single bond, z is 0 or 1, and wherein the naphthalene rings in formula CRMa can additionally be substituted with one or more identical or different groups L wherein L is, independently of each other F, Cl, CN, halogenated alkyl, alkoxy, alkylcarbonyl, alkoxycarbonyl, alkylcarbonyloxy or alkoxycarbonyloxy with 1 to 5 C atoms.

The compounds of formula CRMa are preferably selected from the group of compounds of formulae CRMa-1.

CRMa-1

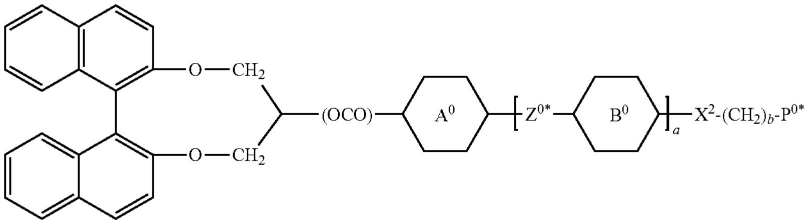

$Z^{0*}$ is, in case of multiple occurrence independently of one another, —COO—, —OCO—, —O—CO—O—, —$OCH_2$—, —$CH_2O$—, —$CF_2O$—, —$OCF_2$—, —$CH_2CH_2$—, —$(CH_2)_4$—, —$CF_2CH_2$—, —$CH_2CF_2$—, —$CF_2CF_2$—, —C≡C—, —CH═CH—, —CH═CH—COO—, —OCO—CH═CH— or a single bond, t is, independently of each other 0, 1, 2 or 3, a is 0, 1 or 2, b is 0 or an integer from 1 to 12, wherein $X^2$, $A^0$, $B^0$, $Z^{0*}$, $P^{0*}$ and b have the meanings given in formula CRMa or one of the preferred meanings given above and below, and (OCO) denotes —O—CO— or a single bond.

Especially preferred compounds of formula CRM are selected from the group consisting of the following subformulae:

CRMa-1a
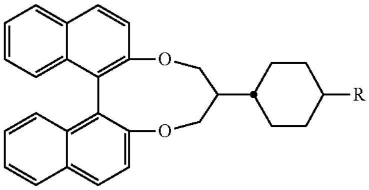
CRMa-1b
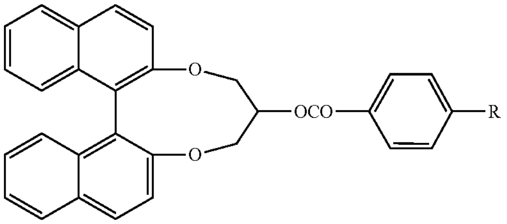
CRMa-1c
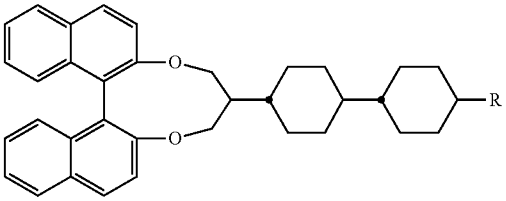
CRMa-1d
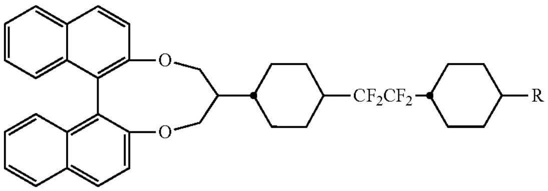
CRMa-1e
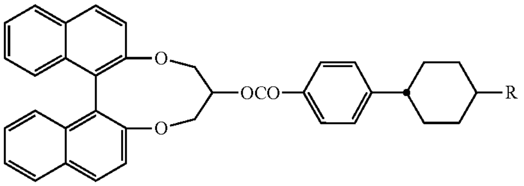
CRMa-1f
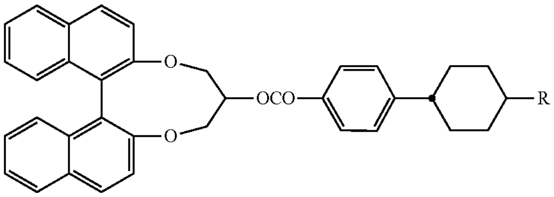
CRMa-1g
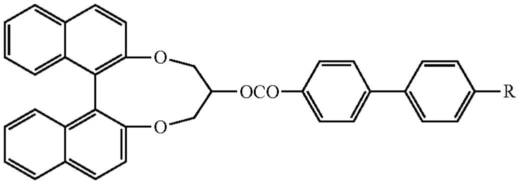
CRMa-1h
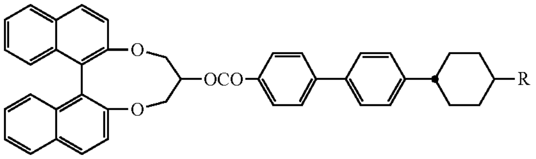
CRMa-1i
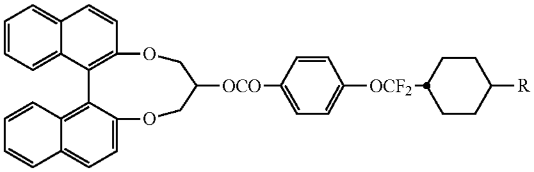
CRMa-1j
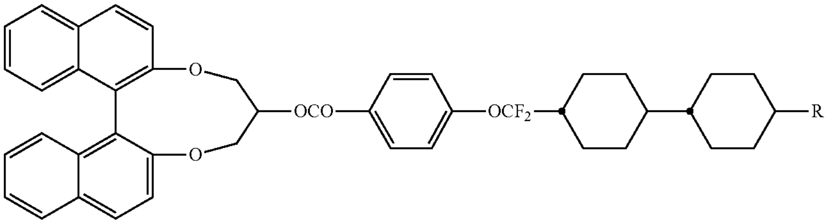
wherein R is $-X^2-(CH_2)_x-P^{0*}$ as defined in formula CRM-a, and the benzene and naphthalene rings are unsubstituted or substituted with 1, 2, 3 or 4 groups L as defined above and below.
The compounds of formula CRMb are preferably selected from the group of compounds of formulae CRMb-1 to CRMb-3, CRMb-1

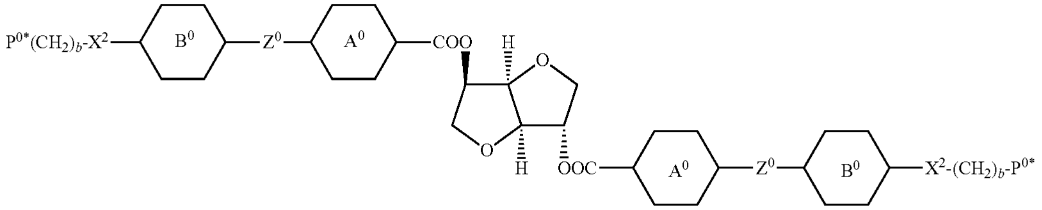

CRMb-2

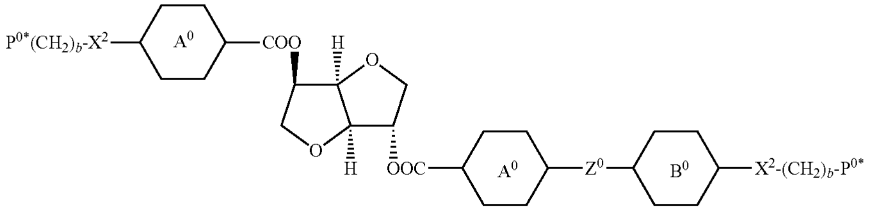

CRMb-3

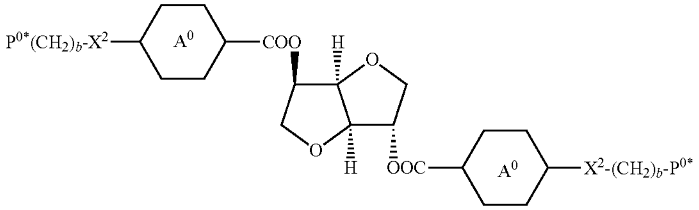

wherein $X^2$, $A^0$, $B^0$, $Z^{0*}$, $P^{0*}$ and b have the meanings given in formula CRMa or one of the preferred meanings given above and below.

Preferred compounds of formula CRMb-1 are preferably selected from the group of compounds of formulae CRMb-1a and CRMb-1b, CRMb-1a

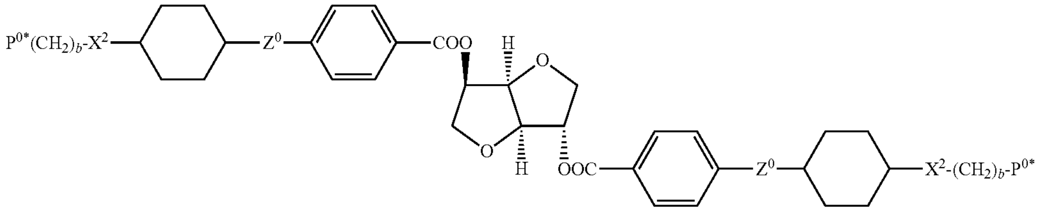

CRMb-1b

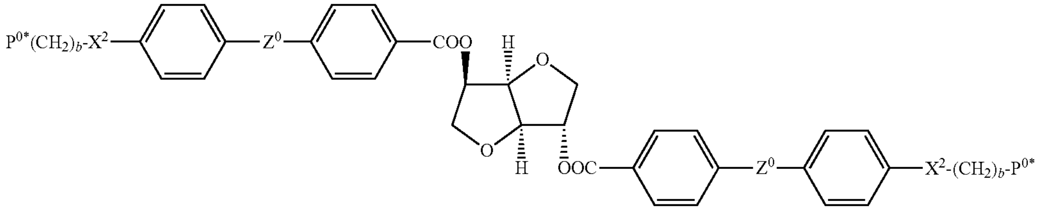

wherein $X^2$, $Z^{0*}$, $P^{0*}$ and b have the meanings given in formula CRMa or one of the preferred meanings given above and below. Preferably in the compounds of formulae CRMb-1a and CRMb-1 b, $Z^0$ denotes OCOO, COO, OCO or a single bond. Preferably in the compounds of formulae CRMb-1a and CRMb-1 b, $X^2$ denotes OCOO, OCO, COO or a single bond. Preferred are compounds of formula and CRMb-1 b that are selected from the following compounds, CRMb-1bl

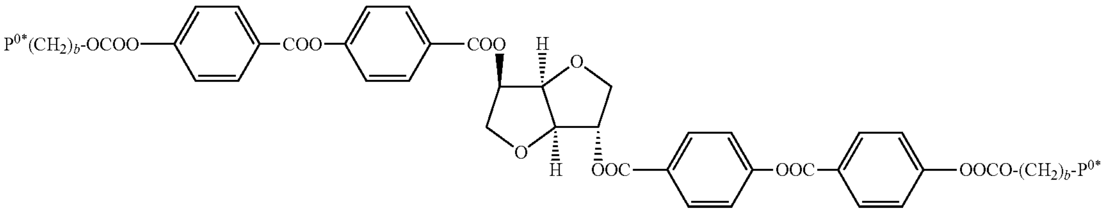

wherein $P^{0*}$ and b have the meanings given in formula CRMa or one of the preferred meanings given above and below.

The compound CRMb-1 bl wherein $P^{0*}$ denotes in each occurrence an acrylate group and b denotes in each occurrence 4, is especially preferred and commercially available from BASF, Germany under tradename LC756.

The compounds of formula CRMc are preferably selected from the group of compounds of formulae CRMc-1, CRMc-1

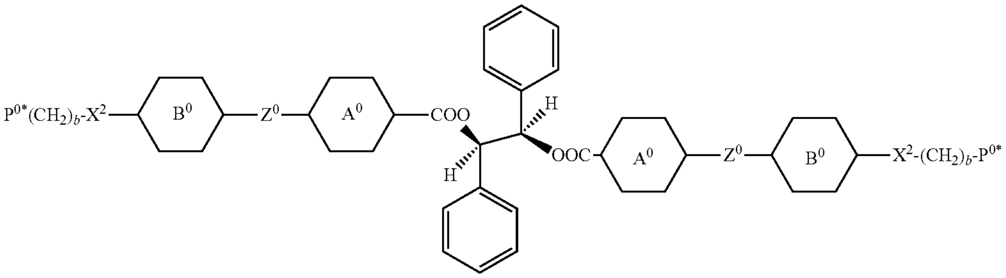

wherein $X^2$, $A^0$, $B^0$, $Z^{0*}$, $P^{0*}$ and b have the meanings given in formula CRMa or one of the preferred meanings given above and below.

Preferred compounds of formula CRMc-1 are preferably selected from the group of compounds of formulae CRMc-1a and CRMc-1 b, CRMc-1a

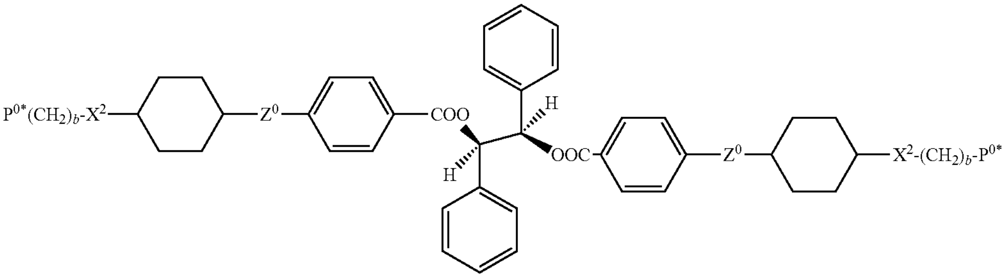

CRMc-1b

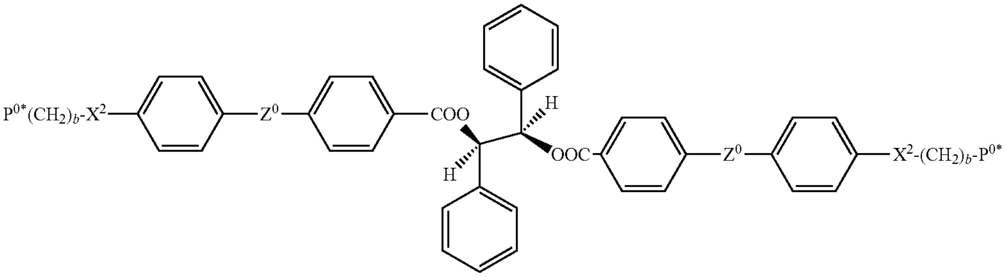

wherein $X^2$, $Z^{0*}$, $P^{0*}$ and b have the meanings given in formula CRMa or one of the preferred meanings given above and below. Preferably in the compounds of formulae CRMc-1a and CRMc-1 b, $Z^0$ denotes OCOO, COO, OCO or a single bond. Preferably in the compounds of formulae CRMc-1a and CRMc-1 b, $X^2$ denotes O, OCOO, OCO, COO or a single bond. Preferred are compounds of formula and CRMc-1a that are selected from the following compounds, erizable liquid-crystalline material according to the present invention as a whole is, if present, preferably in the range from 1 to 30% by weight, more preferably in the range from 2 to 20% by weight and even more preferably in the range from 3 to 10% by weight.

In another preferred embodiment the polymerizable LC material does not contain polymerizable mesogenic compounds having more than two polymerizable groups.

CRMc-1al

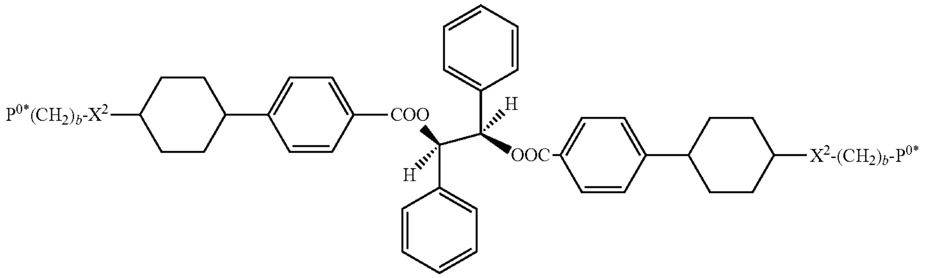

wherein $P^{0*}$ and b have the meanings given in formula CRMa or one of the preferred meanings given above and below.

The compound CRMc-1 al wherein $P^{0*}$ denotes in each occurrence an acrylate group and b denotes in each occurrence 3 or 6, and $X^2$ denotes in each occurrence O or a single bond is especially preferred.

The amount of chiral compounds in the liquid-crystalline medium is preferably from 1 to 20%, more preferably from 1 to 15%, even more preferably 1 to 10%, and most preferably 3 to 7%, by weight of the total mixture.

In a preferred embodiment, the proportion of polymerizable mesogenic compounds in the polymerizable liquid-crystalline material according to the present invention as a whole, is in the range from 30 to 99% by weight, more preferably in the range from 40 to 97% by weight and even more preferably in the range from 50 to 95% by weight.

Preferably, the proportion of said mono-, di- or multireactive liquid-crystalline compounds, preferably selected from the compounds of the formulae DRM, MRM as given above and below in the polymerizable liquid-crystalline material according to the present invention as a whole, is preferably in the range from 30 to 99.9% by weight, more preferably in the range from 40 to 99.9% by weight and even more preferably in the range from 50 to 99.9% by weight.

In a preferred embodiment, the proportion of di- or multireactive polymerizable mesogenic compounds in the polymerizable liquid-crystalline material according to the present invention as a whole, is preferably in the range from 1 to 70% by weight, more preferably in the range from 2 to 60% by weight and even more preferably in the range from 3 to 50% by weight.

In another preferred embodiment, the proportion of monoreactive polymerizable mesogenic compounds of formula MRM excluding compounds of formula RMT in a polymerizable liquid-crystalline material according to the present invention as a whole, is, if present, preferably in the range from 1 to 50% by weight, more preferably in the range from 2 to 45% by weight and even more preferably in the range from 5 to 40% by weight.

In another preferred embodiment, the proportion of multireactive polymerizable mesogenic compounds in a polym- In a further preferred embodiment, the polymerizable LC material comprises one or more monoreactive mesogenic compounds, preferably selected from formulae MRM-1, MRM-4, MRM-6, and/or MRM-7, one or more direactive mesogenic compounds, preferably selected from formula DRMa-1.

The polymerizable LC material should in addition be of such a nature that different reflection wavelengths, in particular in the VIS light region, can be achieved by simple and targeted variation. Preferably the cholesteric pitch of the polymerizable LC material is selected such, that their wavelength of reflection is in the in the range in the infrared range of the electromagnetic spectrum i.e. in the range from of 300 nm to 900 nm, more preferably form 350 to 850 nm. In particular, the reflection wavelength of the liquid crystalline medium is in the range of 400 nm to 800 nm.

The polymerizable LC material according to the present invention are prepared in a manner conventional per se, for example by mixing one or more of the above-mentioned polymerisable compounds with one or more compounds of formula I and one or more chiral compounds, both as defined above, and optionally with further liquid-crystalline compounds and/or additives, and/or solvents.

In a further preferred embodiment the polymerizable LC material optionally comprises one or more additives selected from the group consisting of further polymerization initiators, antioxidants, surfactants, stabilisers, catalysts, sensitizers, inhibitors, chain-transfer agents, co-reacting monomers, reactive thinners, surface-active compounds, lubricating agents, wetting agents, dispersing agents, hydrophobing agents, adhesive agents, flow improvers, degassing or defoaming agents, deaerators, diluents, reactive diluents, auxiliaries, colourants, dyes, pigments and nanoparticles.

In another preferred embodiment, the polymerizable LC material optionally comprises one or more additives selected from polymerizable non-mesogenic compounds (reactive thinners). The amount of these additives in the polymerizable LC material is preferably from 0 to 30%, very preferably from 0 to 25%.

The reactive thinners used are not only substances which are referred to in the actual sense as reactive thinners, but also auxiliary compounds already mentioned above which contain one or more complementary reactive units or polymerizable groups P, for example hydroxyl, thiol-, or amino groups, via which a reaction with the polymerizable units of the liquid-crystalline compounds can take place.

The substances, which are usually capable of photopolymerization, include, for example, mono-, bi- and polyfunctional compounds containing at least one olefinic double bond. Examples thereof are vinyl esters of carboxylic acids, for example of lauric, myristic, palmitic and stearic acid, and of dicarboxylic acids, for example of succinic acid, adipic acid, allyl and vinyl ethers and methacrylic and acrylic esters of monofunctional alcohols, for example of lauryl, myristyl, palmityl and stearyl alcohol, and diallyl and divinyl ethers of bifunctional alcohols, for example ethylene glycol and 1,4-butanediol.

Also suitable are, for example, methacrylic and acrylic esters of polyfunctional alcohols, in particular those which contain no further functional groups, or at most ether groups, besides the hydroxyl groups. Examples of such alcohols are bifunctional alcohols, such as ethylene glycol, propylene glycol and their more highly condensed representatives, for example diethylene glycol, triethylene glycol, dipropylene glycol, tripropylene glycol etc., butanediol, pentanediol, hexanediol, neopentyl glycol, alkoxylated phenolic compounds, such as ethoxylated and propoxylated bisphenols, cyclohexanedimethanol, trifunctional and polyfunctional alcohols, such as glycerol, trimethylolpropane, butanetriol, trimethylolethane, pentaerythritol, ditrimethylolpropane, dipentaerythritol, sorbitol, mannitol, and the corresponding alkoxylated, in particular ethoxylated and propoxylated alcohols.

Other suitable reactive thinners are polyester (meth)acrylates, which are the (meth)acrylic ester of polyesterols.

Examples of suitable polyesterols are those which can be prepared by esterification of polycarboxylic acids, preferably dicarboxylic acids, using polyols, preferably diols. The starting materials for such hydroxyl-containing polyesters are known to the person skilled in the art. Dicarboxylic acids which can be employed are succinic, glutaric acid, adipic acid, sebacic acid, o-phthalic acid and isomers and hydrogenation products thereof, and esterifiable and transesterifiable derivatives of said acids, for example anhydrides and dialkyl esters. Suitable polyols are the abovementioned alcohols, preferably ethyleneglycol, 1,2- and 1,3-propylene glycol, 1,4-butanediol, 1,6-hexanediol, neopentyl glycol, cyclohexanedimethanol and polyglycols of the ethylene glycol and propylene glycol type.

Suitable reactive thinners are furthermore 1,4-divinylbenzene, triallyl cyanurate, acrylic esters of tricyclodecenyl alcohol of the following formula

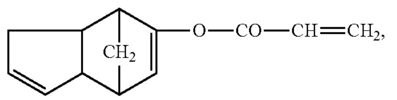

also known under the name dihydrodicyclopentadienyl acrylate, and the allyl esters of acrylic acid, methacrylic acid and cyanoacrylic acid.

Of the reactive thinners, which are mentioned by way of example, those containing photopolymerizable groups are used in particular and in view of the abovementioned preferred compositions.

This group includes, for example, dihydric and polyhydric alcohols, for example ethylene glycol, propylene glycol and more highly condensed representatives thereof, for example diethylene glycol, triethylene glycol, dipropylene glycol, tripropylene glycol etc., butanediol, pentanediol, hexanediol, neopentyl glycol, cyclohexanedimethanol, glycerol, trimethylolpropane, butanetriol, trimethylolethane, pentaerythritol, ditrimethylolpropane, dipentaerythritol, sorbitol, mannitol and the corresponding alkoxylated, in particular ethoxylated and propoxylated alcohols.

The group furthermore also includes, for example, alkoxylated phenolic compounds, for example ethoxylated and propoxylated bisphenols.

These reactive thinners may furthermore be, for example, epoxide or urethane (meth)acrylates.

Epoxide (meth)acrylates are, for example, those as obtainable by the reaction, known to the person skilled in the art, of epoxidized olefins or poly- or diglycidyl ether, such as bisphenol A diglycidyl ether, with (meth)acrylic acid.

Urethane (meth)acrylates are, in particular, the products of a reaction, likewise known to the person skilled in the art, of hydroxylalkyl (meth)acrylates with poly- or diisocyanates.

Such epoxide and urethane (meth)acrylates are included amongst the compounds listed above as "mixed forms".

If reactive thinners are used, their amount and properties must be matched to the respective conditions in such a way that, on the one hand, a satisfactory desired effect, for example the desired colour of the composition according to the invention, is achieved, but, on the other hand, the phase behaviour of the liquid-crystalline composition is not excessively impaired. The low-crosslinking (high-crosslinking) liquid-crystalline compositions can be prepared, for example, using corresponding reactive thinners, which have a relatively low (high) number of reactive units per molecule.

The group of diluents include, for example:

C1-C4-alcohols, for example methanol, ethanol, n-propanol, isopropanol, butanol, isobutanol, sec-butanol and, in particular, the C5-C12-alcohols n-pentanol, n-hexanol, n-heptanol, n-octanol, n-nonanol, n-decanol, n-undecanol and n-dodecanol, and isomers thereof, glycols, for example 1,2-ethylene glycol, 1,2- and 1,3-propylene glycol, 1,2-, 2,3- and 1,4-butylene glycol, di- and triethylene glycol and di- and tripropylene glycol, ethers, for example methyl tert-butyl ether, 1,2-ethylene glycol mono- and dimethyl ether, 1,2-ethylene glycol mono- and -diethylether, 3-methoxypropanol, 3-isopropoxypropanol, tetrahydrofuran and dioxane, ketones, for example acetone, methyl ethyl ketone, methyl isobutyl ketone and diacetone alcohol (4-hydroxy-4-methyl-2-pentanone), $C_1$-$C_5$-alkyl esters, for example methyl acetate, ethyl acetate, propyl acetate, butyl acetate and amyl acetate, aliphatic and aromatic hydrocarbons, for example pentane, hexane, heptane, octane, isooctane, petroleum ether, toluene, xylene, ethylbenzene, tetralin, decalin, dimethylnaphthalene, white spirit, Shellsol® and Solvesso® mineral oils, for example gasoline, kerosine, diesel oil and heating oil, but also natural oils, for example olive oil, soya oil, rapeseed oil, linseed oil and sunflower oil.

It is of course also possible to use mixtures of these diluents in the compositions according to the invention.

So long as there is at least partial miscibility, these diluents can also be mixed with water. Examples of suitable diluents here are C1-C4-alcohols, for example methanol, ethanol, n-propanol, isopropanol, butanol, isobutanol and sec-butanol, glycols, for example 1,2-ethylene glycol, 1,2- and 1,3-propylene glycol, 1,2-, 2,3- and 1,4-butylene glycol, di- and triethylene glycol, and di- and tripropylene glycol, ethers, for example tetrahydrofuran and dioxane, ketones, for example acetone, methyl ethyl ketone and diacetone alcohol (4-hydroxy-4-methyl-2-pentanone), and C1-C4-alkyl esters, for example methyl, ethyl, propyl and butyl acetate.

The diluents are optionally employed in a proportion of from about 0 to 10.0% by weight, preferably from about 0 to 5.0% by weight, based on the total weight of the polymerizable LC material.

The antifoams and deaerators (c1)), lubricants and flow auxiliaries (c2)), thermally curing or radiation-curing auxiliaries (c3)), substrate wetting auxiliaries (c4)), wetting and dispersion auxiliaries (c5)), hydrophobicizing agents (c6)), adhesion promoters (c7)) and auxiliaries for promoting scratch resistance (c8)) cannot strictly be delimited from one another in their action.

For example, lubricants and flow auxiliaries often also act as antifoams and/or deaerators and/or as auxiliaries for improving scratch resistance. Radiation-curing auxiliaries can also act as lubricants and flow auxiliaries and/or deaerators and/or as substrate wetting auxiliaries. In individual cases, some of these auxiliaries can also fulfil the function of an adhesion promoter (c8)).

Corresponding to the above-said, a certain additive can therefore be classified in a number of the groups c1) to c8) described below.

The antifoams in group c1) include silicon-free and silicon-containing polymers. The silicon-containing polymers are, for example, unmodified or modified polydialkylsiloxanes or branched copolymers, comb or block copolymers comprising polydialkylsiloxane and polyether units, the latter being obtainable from ethylene oxide or propylene oxide.

The deaerators in group c1) include, for example, organic polymers, for example polyethers and polyacrylates, dialkylpolysiloxanes, in particular dimethylpolysiloxanes, organically modified polysiloxanes, for example arylalkyl-modified polysiloxanes, and fluorosilicones.

The action of the antifoams is essentially based on preventing foam formation or destroying foam that has already formed. Antifoams essentially work by promoting coalescence of finely divided gas or air bubbles to give larger bubbles in the medium to be deaerated, for example the compositions according to the invention, and thus accelerate escape of the gas (of the air). Since antifoams can frequently also be employed as deaerators and vice versa, these additives have been included together under group c1).

Such auxiliaries are, for example, commercially available from Tego as TEGO® Foamex 800, TEGO® Foamex 805, TEGO® Foamex 810, TEGO® Foamex 815, TEGO® Foamex 825, TEGO® Foamex 835, TEGO® Foamex 840, TEGO® Foamex 842, TEGO® Foamex 1435, TEGO® Foamex 1488, TEGO® Foamex 1495, TEGO® Foamex 3062, TEGO® Foamex 7447, TEGO® Foamex 8020, Tego® Foamex N, TEGO® Foamex K 3, TEGO® Antifoam 2-18, TEGO® Antifoam 2-18, TEGO® Antifoam 2-57, TEGO® Antifoam 2-80, TEGO® Antifoam 2-82, TEGO® Antifoam 2-89, TEGO® Antifoam 2-92, TEGO® Antifoam 14, TEGO® Antifoam 28, TEGO® Antifoam 81, TEGO® Antifoam D 90, TEGO® Antifoam 93, TEGO® Antifoam 200, TEGO® Antifoam 201, TEGO® Antifoam 202, TEGO® Antifoam 793, TEGO® Antifoam 1488, TEGO® Antifoam 3062, TEGOPREN® 5803, TEGOPREN® 5852, TEGOPREN® 5863, TEGOPREN® 7008, TEGO® Antifoam 1-60, TEGO® Antifoam 1-62, TEGO® Antifoam 1-85, TEGO® Antifoam 2-67, TEGO® Antifoam WM 20, TEGO® Antifoam 50, TEGO® Antifoam 105, TEGO® Antifoam 730, TEGO® Antifoam MR 1015, TEGO® Antifoam MR 1016, TEGO® Antifoam 1435, TEGO® Antifoam N, TEGO® Antifoam KS 6, TEGO® Antifoam KS 10, TEGO® Antifoam KS 53, TEGO® Antifoam KS 95, TEGO® Antifoam KS 100, TEGO® Antifoam KE 600, TEGO® Antifoam KS 911, TEGO® Antifoam MR 1000, TEGO® Antifoam KS 1100, Tego® Airex 900, Tego® Airex 910, Tego® Airex 931, Tego® Airex 935, Tego® Airex 936, Tego® Airex 960, Tego® Airex 970, Tego® Airex 980 and Tego® Airex 985 and from BYK as BYK®-011, BYK®-019, BYK®-020, BYK®-021, BYK®-022, BYK®-023, BYK®-024, BYK®-025, BYK®-027, BYK®-031, BYK®-032, BYK®-033, BYK®-034, BYK®-035, BYK®-036, BYK®-037, BYK®-045, BYK®-051, BYK®-052, BYK®-053, BYK®-055, BYK®-057, BYK®-065, BYK®-066, BYK®-070, BYK®-080, BYK®-088, BYK®-141 and BYK®-A 530.

The auxiliaries in group c1) are optionally employed in a proportion of from about 0 to 3.0% by weight, preferably from about 0 to 2.0% by weight, based on the total weight of the polymerizable LC material.

In group c2), the lubricants and flow auxiliaries typically include silicon-free, but also silicon-containing polymers, for example polyacrylates or modifiers, low-molecular-weight polydialkylsiloxanes. The modification consists in some of the alkyl groups having been replaced by a wide variety of organic radicals. These organic radicals are, for example, polyethers, polyesters or even long-chain (fluorinated)alkyl radicals, the former being used the most frequently.

The polyether radicals in the correspondingly modified polysiloxanes are usually built up from ethylene oxide and/or propylene oxide units. Generally, the higher the proportion of these alkylene oxide units in the modified polysiloxane, the more hydrophilic is the resultant product.

Such auxiliaries are, for example, commercially available from Tego as TEGO® Glide 100, TEGO® Glide ZG 400, TEGO® Glide 406, TEGO® Glide 410, TEGO® Glide 411, TEGO® Glide 415, TEGO® Glide 420, TEGO® Glide 435, TEGO® Glide 440, TEGO® Glide 450, TEGO® Glide A 115, TEGO® Glide B 1484 (can also be used as antifoam and deaerator), TEGO® Flow ATF, TEGO® Flow 300, TEGO® Flow 460, TEGO® Flow 425 and TEGO® Flow ZFS 460. Suitable radiation-curable lubricants and flow auxiliaries, which can also be used to improve the scratch resistance, are the products TEGO® Rad 2100, TEGO® Rad 2200, TEGO® Rad 2500, TEGO® Rad 2600 and TEGO® Rad 2700, which are likewise obtainable from TEGO.

Such-auxiliaries are also available, for example, from BYK as BYK®-300 BYK®-306, BYK®-307, BYK®-310, BYK®-320, BYK®-333, BYK®-341, Byk® 354, Byk®361, Byk®361N, BYK®388.

Such-auxiliaries are also available, for example, from 3M as FC4430®.

Such-auxiliaries are also available, for example, from Cytonix as FluorN®561 or FluorN®562.

Such-auxiliaries are also available, for example, from Merck KGaA as Tivida® FL 2300 and Tivida® FL 2500

The auxiliaries in group c2) are optionally employed in a proportion of from about 0 to 3.0% by weight, preferably from about 0 to 2.0% by weight, based on the total weight of the polymerizable LC material.

In group c3), the radiation-curing auxiliaries include, in particular, polysiloxanes having terminal double bonds which are, for example, a constituent of an acrylate group. Such auxiliaries can be crosslinked by actinic or, for example, electron radiation. These auxiliaries generally combine a number of properties together. In the uncrosslinked state, they can act as antifoams, deaerators, lubricants and flow auxiliaries and/or substrate wetting auxiliaries, while, in the crosslinked state, they increase, in particular, the scratch resistance, for example of coatings or films which can be produced using the compositions according to the invention. The improvement in the gloss properties, for example of precisely those coatings or films, is regarded essentially as a consequence of the action of these auxiliaries as antifoams, deaerators and/or lubricants and flow auxiliaries (in the uncrosslinked state).

Examples of suitable radiation-curing auxiliaries are the products TEGO® Rad 2100, TEGO® Rad 2200, TEGO® Rad 2500, TEGO® Rad 2600 and TEGO® Rad 2700 available from TEGO and the product BYK®-371 available from BYK.

Thermally curing auxiliaries in group c3) contain, for example, primary OH groups, which are able to react with isocyanate groups, for example of the binder.

Examples of thermally curing auxiliaries, which can be used, are the products BYK®-370, BYK®-373 and BYK®-375 available from BYK.

The auxiliaries in group c3) are optionally employed in a proportion of from about 0 to 5.0% by weight, preferably from about 0 to 3.0% by weight, based on the total weight of the polymerizable LC material.

The substrate wetting auxiliaries in group c4) serve, in particular, to increase the wettability of the substrate to be printed or coated, for example, by printing inks or coating compositions, for example compositions according to the invention. The generally attendant improvement in the lubricant and flow behaviour of such printing inks or coating compositions has an effect on the appearance of the finished (for example crosslinked) print or coating.

A wide variety of such auxiliaries are commercially available, for example from Tego as TEGO® Wet KL 245, TEGO® Wet 250, TEGO® Wet 260 and TEGO® Wet ZFS 453 and from BYK as BYK®-306, BYK®-307, BYK®-310, BYK®-333, BYK®-344, BYK®-345, BYK®-346 and Byk®-348.

The auxiliaries in group c4) are optionally employed in a proportion of from about 0 to 3.0% by weight, preferably from about 0 to 1.5% by weight, based on the total weight of the liquid-crystalline composition.

The wetting and dispersion auxiliaries in group c5) serve, in particular, to prevent the flooding and floating and the sedimentation of pigments and are therefore, if necessary, suitable in particular in pigmented compositions.

These auxiliaries stabilize pigment dispersions essentially through electrostatic repulsion and/or steric hindrance of the pigment particles containing these additives, where, in the latter case, the interaction of the auxiliary with the ambient medium (for example binder) plays a major role.

Since the use of such wetting and dispersion auxiliaries is common practice, for example in the technical area of printing inks and paints, the selection of a suitable auxiliary of this type generally does not present the person skilled in the art with any difficulties, if they are used.

Such wetting and dispersion auxiliaries are commercially available, for example from Tego, as TEGO® Dispers 610, TEGO® Dispers 610 S, TEGO® Dispers 630, TEGO® Dispers 700, TEGO® Dispers 705, TEGO® Dispers 710, TEGO® Dispers 720 W, TEGO® Dispers 725 W, TEGO® Dispers 730 W, TEGO® Dispers 735 W and TEGO® Dispers 740 W and from BYK as Disperbyk®, Disperbyk®-107, Disperbyk®-108, Disperbyk®-110, Disperbyk®-111, Disperbyk®-115, Disperbyk®-130, Disperbyk®-160, Disperbyk®-161, Disperbyk®-162, Disperbyk®-163, Disperbyk®-164, Disperbyk®-165, Disperbyk®-166, Disperbyk®-167, Disperbyk®-170, Disperbyk®-174, Disperbyk®-180, Disperbyk®-181, Disperbyk®-182, Disperbyk®-183, Disperbyk®-184, Disperbyk®-185, Disperbyk®-190, Anti-Terra®-U, Anti-Terra®-U 80, Anti-Terra®-P, Anti-Terra®-203, Anti-Terra®-204, Anti-Terra®-206, BYK®-151, BYK®-154, BYK®-155, BYK®-P 104 S, BYK®-P 105, Lactimon®, Lactimon®-WS and Bykumen®.

The amount of the auxiliaries in group c5) used on the mean molecular weight of the auxiliary. In any case, a preliminary experiment is therefore advisable, but this can be accomplished simply by the person skilled in the art.

The hydrophobicizing agents in group c6) can be used to give water-repellent properties to prints or coatings produced, for example, using compositions according to the invention. This prevents or at least greatly suppresses swelling due to water absorption and thus a change in, for example, the optical properties of such prints or coatings. In addition, when the composition is used, for example, as a printing ink in offset printing, water absorption can thereby be prevented or at least greatly reduced.

Such hydrophobicizing agents are commercially available, for example, from Tego as Tego® Phobe WF, Tego® Phobe 1000, Tego® Phobe 1000 S, Tego® Phobe 1010, Tego® Phobe 1030, Tego® Phobe 1010, Tego® Phobe 1010, Tego® Phobe 1030, Tego® Phobe 1040, Tego® Phobe 1050, Tego® Phobe 1200, Tego® Phobe 1300, Tego® Phobe 1310 and Tego® Phobe 1400.

The auxiliaries in group c6) are optionally employed in a proportion of from about 0 to 5.0% by weight, preferably from about 0 to 3.0% by weight, based on the total weight of the polymerizable LC material.

Further adhesion promoters from group c7) serve to improve the adhesion of two interfaces in contact. It is directly evident from this that essentially the only fraction of the adhesion promoter that is effective is that located at one or the other or at both interfaces. If, for example, it is desired to apply liquid or pasty printing inks, coating compositions or paints to a solid substrate, this generally means that the adhesion promoter must be added directly to the latter or the substrate must be pre-treated with the adhesion promoters (also known as priming), i.e. this substrate is given modified chemical and/or physical surface properties.

If the substrate has previously been primed with a primer, this means that the interfaces in contact are that of the primer on the one hand and of the printing ink or coating composition or paint on the other hand. In this case, not only the adhesion properties between the substrate and the primer, but also between the substrate and the printing ink or coating composition or paint play a part in adhesion of the overall multilayer structure on the substrate.

Adhesion promoters in the broader sense which may be mentioned are also the substrate wetting auxiliaries already listed under group c4), but these generally do not have the same adhesion promotion capacity.

In view of the widely varying physical and chemical natures of substrates and of printing inks, coating compositions and paints intended, for example, for their printing or coating, the multiplicity of adhesion promoter systems is not surprising.

Adhesion promoters based on silanes are, for example, 3-aminopropyltrimethoxysilane, 3-aminopropyltriethoxysilane, 3-aminopropylmethyldiethoxysilane, N-aminoethyl-3-aminopropyltrimethoxysilane, N-aminoethyl-3-aminopropylmethyldimethoxysilane, N-methyl-3-aminopropyltrimethoxysilane, 3-ureidopropyltriethoxysilane, 3-methacryloyloxypropyltrimethoxysilane, 3-glycidyloxypropyltrimethoxysilane, 3-mercaptopropyltrimethoxysilane, 3-chloropropyltrimethoxysilane and vinyltrimethoxysilane. These and other silanes are commercially available from Hüls, for example under the tradename DYNASILAN®.

Corresponding technical information from the manufacturers of such additives should generally be used or the person skilled in the art can obtain this information in a simple manner through corresponding preliminary experiments.

However, if these additives are to be added as auxiliaries from group c7) to the polymerizable LC materials according to the invention, their proportion optionally corresponds to from about 0 to 5.0% by weight, based on the total weight of the polymerizable LC material. These concentration data serve merely as guidance, since the amount and identity of the additive are determined in each individual case by the nature of the substrate and of the printing/coating composition. Corresponding technical information is usually available from the manufacturers of such additives for this case or can be determined in a simple manner by the person skilled in the art through corresponding preliminary experiments.

The auxiliaries for improving the scratch resistance in group c8) include, for example, the abovementioned products TEGO® Rad 2100, TEGO® Rad 2200, TEGO® Rad 2500, TEGO® Rad 2600 and TEGO® Rad 2700, which are available from Tego.

For these auxiliaries, the amount data given for group c3) are likewise suitable, i.e. these additives are optionally employed in a proportion of from about 0 to 5.0% by weight, preferably from about 0 to 3.0% by weight, based on the total weight of the liquid-crystalline composition.

Examples that may be mentioned of further light, heat and/or oxidation stabilizers are the following:

alkylated monophenols, such as 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which have a linear or branched side chain, for example 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures of these compounds, alkylthiomethylphenols, such as 2,4-dioctylthiomethyl-6-tert-butylphenol, 2,4-dioctylthiomethyl-6-methylphenol, 2,4-dioctylthiomethyl-6-ethylphenol and 2,6-didodecylthiomethyl-4-nonylphenol, Hydroquinones and alkylated hydroquinones, such as 2,6-di-tert-butyl-4-methoxyphenol, 2,5-di-tert-butylhydroquinone, 2,5-di-tert-amylhydrocrainone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate and bis(3,5-di-tert-butyl-4-hydroxyphenyl)adipate, Tocopherols, such as α-tocopherol, β-tocopherol, γ-tocopherol, δ-tocopherol and mixtures of these compounds, and tocopherol derivatives, such as tocopheryl acetate, succinate, nicotinate and polyoxyethylenesuccinate ("tocofersolate"), hydroxylated diphenyl thioethers, such as 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol) and 4,4'-bis(2,6-dimethyl-4-hydroxyphenyl)disulfide, Alkylidenebisphenols, such as 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecyl-mercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl] terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecyl-mercaptobutane and 1,1,5,5-tetrakis(5-tert-butyl-4-hydroxy-2-methylphenyl)pentane, O-, N- and S-benzyl compounds, such as 3,5,3',5'-tetra-tert-butyl-4,4'-dihydroxydibenzyl ether, octadecyl 4-hydroxy-3,5-dimethylbenzylmercaptoacetate, tridecyl 4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl)sulfide and isooctyl-3,5-di-tert-butyl-4-hydroxybenzylmercaptoacetate, aromatic hydroxybenzyl compounds, such as 1,3,5-tris(3,5-di-tert-butyl-4-hydroxybenzyl)-2,4,6-trimethyl-benzene, 1,4-bis(3,5-di-tert-butyl-4-hydroxybenzyl)-2,3,5,6-tetramethyl-benzene and 2,4,6-tris(3,5-di-tert-butyl-4-hydroxybenzyl)phenol, Triazine compounds, such as 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris-(3,5-di-tert-butyl-4-hydroxyphenylpropionyl)hexahydro-1,3,5-triazine, 1,3,5-tris(3,5-dicyclohexyl-4-hydroxybenzyl)isocyanurate and 1,3,5-tris(2-hydroxyethyl)isocyanurate, Benzylphosphonates, such as dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate and dioctadecyl 5-tert-butyl-4-hydroxy-3-methylbenzylphosphonate, Acylaminophenols, such as 4-hydroxylauroylanilide, 4-hydroxystearoylanilide and octyl N-(3,5-di-tert-butyl-4-hydroxyphenyl)carbamate, Propionic and acetic esters, for example of monohydric or polyhydric alcohols, such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane and 4-hydroxymethyl-1-phospha-2,6,7-trioxabicyclo[2.2.2]-octane, Propionamides based on amine derivatives, such as N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine and N,N'-bis(3,5-di-tert-butyl-4-hydroxyphenylpropionyl) hydrazine, Ascorbic acid (Vitamin C) and ascorbic acid derivatives, such as ascorbyl palmitate, laurate and stearate, and ascorbyl sulfate and phosphate, Antioxidants based on amine compounds, such as N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl) diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octyl-substituted diphenylamine, such as p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis[4-methoxyphenyl)amine, 2,6-di-tert-butyl-4-dimethylaminomethylphenol, 2,4-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, bis[4-(1',3'-dimethylbutyl) phenyl]amine, tert-octyl-substituted N-phenyl-1-naphthylamine, a mixture of mono- and dialkylated tert-butyl/tert-octyldiphenylamine, a mixture of mono- and dialkylated nonyldiphenylamine, a mixture of mono- and dialkylated dodecyldiphenylamine, a mixture of mono- and dialkylated isopropyl/isohexyldiphenylamine, a mixture of mono- and dialkylated tert-butyldiphenylamine, 2,3-dihydro-3,3-dimethyl-4H-1,4-benzothiazine, phenothiazine, a mixture of mono- and dialkylated tert-butyl/tert-octylphenothiazine, a mixture of mono- and dialkylated tert-octylphenothiazine, N-allylphenothiazine, N,N,N',N'-tetraphenyl-1,4-diaminobut-2-ene, N,N-bis(2,2,6,6-tetramethylpiperidin-4-yl)hexamethylenediamine, bis(2,2,6,6-tetramethylpiperidin-4-yl)sebacate, 2,2,6,6-tetramethylpiperidin-4-one and 2,2,6,6-tetramethylpiperidin-4-ol, Phosphines, Phosphites and phosphonites, such as triphenylphosnine triphenylphosphite, diphenyl alkyl phosphite, phenyl dialkyl phosphite, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)pentaerythritol diphosphite, diisodecyloxy pentaerythritol diphosphite, bis(2,4-di-tert-butyl-6-methylphenyl)pentaerythritol diphosphite, bis(2,4,6-tris(tert-butylphenyl))pentaerythritol diphosphite, tristearyl sorbitol triphosphite, tetrakis(2,4-di-tert-butylphenyl)4,4'-biphenylenediphosphonite, 6-isooctyloxy-2,4,8,10-tetra-tert-butyl-12H-dibenz[d,g]-1,3,2-dioxaphosphocine, 6-fluoro-2,4,8,10-tetra-tert-butyl-12-methyl-dibenz[d,g]-1,3,2-dioxaphosphocine, bis(2,4-di-tert-butyl-6-methylphenyl)methyl phosphite and bis(2,4-di-tert-butyl-6-methylphenyl)ethyl phosphite, 2-(2'-Hydroxyphenyl)benzotriazoles, such as 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3,5'-bis-(α,α-dimethylbenzyl)-2'-hydroxyphenyl)benzotriazole, a mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxy phenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl) phenyl)benzotriazole, 2-(3'-tert-butyl-5'-[2-(2-ethylhexyloxy)carbonylethyl]-2'-hydroxy phenyl) benzotriazole, 2-(3'-dodecyl-2'-hydroxy-5'-methylphenyl)benzotriazole and 2-(3'-tert-butyl-2'-hydroxy-5'-(2-isooctyloxycarbonylethyl)phenyl benzotriazole, 2,2'-methylenebis[4-(1,1,3,3-tetramethylbutyl)-6-benzotriazol-2-ylphenol]; the product of complete esterification of 2-[3'-tert-butyl-5'-(2-methoxycarbonylethyl)-2'-hydroxyphenyl]-2H-benzotriazole with polyethylene glycol 300;

sulfur-containing peroxide scavengers and sulfur-containing antioxidants, such as esters of 3,3'-thiodipropionic acid, for example the lauryl, stearyl, myristyl and tridecyl esters, mercaptobenzimidazole and the zinc salt of 2-mercaptobenzimidazole, dibutylzinc dithiocarbamates, dioctadecyl disulfide and pentaerythritol tetrakis(β-dodecylmercapto)propionate, 2-hydroxybenzophenones, such as the 4-hydroxy, 4-methoxy, 4-octyloxy, 4-decycloxy, 4-dodecyloxy, 4-benzyloxy, 4,2',4'-trihydroxy and 2'-hydroxy-4,4'-dimethoxy derivatives, Esters of unsubstituted and substituted benzoic acids, such as 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl-3,5-di-tert-butyl-4-hydroxybenzoate, octadecyl-3,5-di-tert-butyl-4-hydroxybenzoate and 2-methyl-4,6-di-tert-butylphenyl-3,5-di-tert-butyl-4-hydroxybenzoate, Acrylates, such as ethyl α-cyano-β,β-diphenylacrylate, isooctyl α-cyano-β,β-diphenylacrylate, methyl α-methoxycarbonylcinnamate, methyl α-cyano-β-methyl-p-methoxycinnamate, butyl-α-cyano-β-methyl-p-methoxycinnamate and methyl-α-methoxycarbonyl-p-methoxycinnamate, sterically hindered amines, such as bis(2,2,6,6-tetramethylpiperidin-4-yl) sebacate, bis(2,2,6,6-tetramethylpiperidin-4-yl)succinate, bis(1,2,2,6,6-pentamethylpiperidin-4-yl)sebacate, bis(1-octyloxy-2,2,6,6-tetramethylpiperidin-4-yl)sebacate, bis(1,2,2,6,6-pentamethylpiperidin-4-yl)-n-butyl-3,5-di-tert-butyl-4-hydroxybenzylmalonate, the condensation product of 1-(2-hydroxyethyl)-2,2,6,6-tetramethyl-4-hydroxypiperidine and succinic acid, the condensation product of N,N'-bis(2,2,6,6-tetramethylpiperidin-4-yl)hexamethylenediamine and 4-tert-octylamino-2,6-dichloro-1,3,5-triazine, tris(2,2,6,6-tetramethylpiperidin-4-yl)nitrilotriacetate, tetrakis(2,2,6,6-tetramethylpiperidin-4-yl)1,2,3,4-butanetetracarboxylate, 1,1'-(1,2-ethylene)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidin-4-yl)2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidin-4-yl) sebacate, bis(1-octyloxy-2,2,6,6-tetramethylpiperidin-4-yl)succinate, the condensation product of N,N'-bis(2,2,6,6-tetramethylpiperidin-4-yl) hexamethylenediamine and 4-morpholino-2,6-dichloro-1,3,5-triazine, the condensation product of 2-chloro-4,6-bis(4-n-butylamino-2,2,6,6-tetramethylpiperidin-4-yl)-1,3,5-triazine and 1,2-bis(3-aminopropylamino)ethane, the condensation product of 2-chloro-4,6-di(4-n-butylamino-1,2,2,6,6-pentamethylpiperidin-4-yl)-1,3,5-triazine and 1,2-bis(3-aminopropylamino)ethane, 8-acetyl-3-dodecyl-7,7,9,9-tetramethyl-1,3,8-triazaspiro[4.5]-decane-2,4-dione, 3-dodecyl-1-(2,2,6,6-tetramethylpiperidin-4-yl)pyrrolidine-2,5-dione, 3-dodecyl-1-(1,2,2,6,6-pentamethylpiperidin-4-yl)pyrrolidine-2,5-dione, a mixture of 4-hexadecyloxy- and 4-stearyloxy-2,2,6,6-tetramethylpiperidine, the condensation product of N,N'-bis(2,2,6,6-tetramethylpiperidin-4-yl)hexamethylenediamine and 4-cyclohexylamino-2,6-dichloro-1,3,5-triazine, the condensation product of 1,2-bis(3-aminopropylamino) ethane and 2,4,6-trichloro-1,3,5-triazine, 4-butylamino-2,2,6,6-tetramethylpiperidine, N-(2,2,6,6-tetramethylpiperidin-4-yl)-n-dodecylsuccinimide, N-(1,2,2,6,6-pentamethylpiperidin-4-yl)-n-dodecylsuccinimide, 2-undecyl-7,7,9,9-tetramethyl-1-oxa-3,8-diaza-4-oxospiro[4.5]-decane, the condensation product of 7,7,9,9-tetramethyl-2-cycloundecyl-1-oxa-3,8-diaza-4-oxospiro-[4.5]decane and epichlorohydrin, the condensation products of 4-amino-2,2,6,6-tetramethylpiperidine with tetramethylolacetylenediureas and poly(methoxypropyl-3-oxy)-[4(2,2,6,6-tetramethyl)piperidinyl]-siloxane, Oxalamides, such as 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxalamide, 2-ethoxy-5-tert-butyl-2'-ethoxanilide and its mixture with 2-ethoxy-2'-ethyl-5,4'-di-tert-butoxanilide, and mixtures of ortho-, para-methoxy-disubstituted oxanilides and mixtures of ortho- and para-ethoxy-disubstituted oxanilides, and 2-(2-hydroxyphenyl)-1,3,5-triazines, such as 2,4,6-tris-(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropoxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis-(2,4-dimethylphenyl)-1,3,5-triazine, 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine and 2-(2-hydroxyphenyl)-4-(4-methoxyphenyl)-6-phenyl-1,3,5-triazine.

In another preferred embodiment the polymerizable LC material comprises one or more specific antioxidant additives, preferably selected from the Irganox® series, e.g. the commercially available antioxidants Irganox®1076 and Irganox®1010, from Ciba, Switzerland.

In another preferred embodiment, the polymerizable LC material comprises a combination of one or more, more preferably of two or more photoinitiators, for example, selected from the commercially available Irgacure® or Darocure® (Ciba AG) series, in particular, Irgacure 127, Irgacure 184, Irgacure 369, Irgacure 651, Irgacure 817, Irgacure 907, Irgacure 1300, Irgacure, Irgacure 2022, Irgacure 2100, Irgacure 2959, or Darcure TPO, further selected from the commercially available OXE02 (Ciba AG), NCI 930, N1919T (Adeka), SPI-03 or SPI-04 (Samyang).

The concentration of the polymerization initiator(s) as a whole in the polymerizable LC material is preferably from 0.5 to 10%, very preferably from 0.8 to 8%, more preferably 1 to 6%.

In a preferred embodiment the polymerizable LC material is dissolved in a suitable solvent, which are preferably selected from organic solvents.

The solvents are preferably selected from ketones such as acetone, methyl ethyl ketone, methyl propyl ketone, methyl isobutyl ketone, 2-pentanone, 3-pentanone, cyclopentanone or cyclohexanone; acetates such as methyl, ethyl or butyl acetate or methyl acetoacetate; alcohols such as methanol, ethanol or isopropyl alcohol; aromatic solvents such as toluene, anisole, 3-phenoxytoluene, cyclohexyl benzene, phenyl naphthalene or xylene; alicyclic hydrocarbons such as cyclopentane or cyclohexane; halogenated hydrocarbons such as di- or trichloromethane; glycols or their esters such as PGMEA (propyl glycol monomethyl ether acetate), γ-butyrolactone, PGME (propyl glycol methyl ether), EGBE (ethylene glycol butyl ether). It is also possible to use binary, ternary or higher mixtures of the above solvents. In particular, for multilayer applications, methyl iso butyl ketone, 3-pentanone, toluene, anisole or EGBE are preferred utilized solvent system, either as a blend or separately.

In case the polymerizable LC material contains one or more solvents, the total concentration of all solids, including the RMs, in the solvent(s) is preferably from 10 to 60%, more preferably from 20 to 50%, in particular from 30 to 45%

Preferably, the polymerizable LC material comprises besides one or more compounds of formula I or its corresponding preferred subformulae, a) one or more polymerizable mesogenic compounds of formula RMT and corresponding subformulae,
b) optionally one or more multi- or direactive polymerizable mesogenic compounds, preferably selected from compounds of formula DRM and corresponding subformulae,
c) one or more chiral mesogenic compounds, preferably selected from compounds of formula CRMa to CRMc, more preferably of CRMb, and its subformulae,
d) optionally one or more monoreactive mesogens, preferably selected from compounds of formula MRM and corresponding subformulae,
e) optionally one or more photoinitiators,
f) optionally one or more antioxidative additives,
g) optionally one or more adhesion promotors,
h) optionally one or more surfactants,
i) optionally one or more mono-, di- or multireactive polymerizable non-mesogenic compounds,
j) optionally one or more dyes showing an absorption maximum at the wavelength used to initiate photo polymerization,
k) optionally one or more chain transfer agents,
l) optionally one or more further stabilizers,
m) optionally one or more lubricants and flow auxiliaries, and
n) optionally one or more diluents,
o) optionally a non-polymerizable nematic component,
p) optionally one or more organic solvents.

More preferably, the polymerizable LC material comprises, a) one or more compounds of formula I, or its corresponding preferred subformulae,
b) one or more, preferably two or more polymerizable mesogenic compounds of formula RMT and corresponding subformulae, preferably selected from compounds of subformulae RMTa2-A4, and/or RMTa2-A5 and/or RMTb-A3
c) one or more, preferably two or more, direactive polymerizable mesogenic compounds, preferably selected from the compounds of formula DRMa-1,
d) optionally one or more, preferably two or more, monoreactive polymerizable mesogenic compounds, preferably selected from compounds of formulae MRM-1, and/or MRM-4, and/or MRM-6, and/or MRM-7,
e) optionally one or more chiral mesogenic compounds of formula CRMb, in particular of formula CRMb-1 bl,
f) optionally one or more antioxidative additives, preferably selected from esters of unsubstituted and substituted benzoic acids, in particular Irganox®1076, and if present, preferably in an amount of 0.01 to 2% by weight, very preferably 0.05 to 1% by weight,
g) optionally one or more photoinitiators, preferably Irgacure®907, and/or SPI-3
h) optionally one or more organic solvents, preferably methyl isobutyl ketone.

The invention further relates to a method of preparing a polymer film by providing a layer of a polymerizable LC material as described above and below onto a substrate,
polymerizing the polymerizable components of the polymerizable LC material by photopolymerization, and
optionally removing the polymerized LC material from the substrate and/or optionally providing it onto another substrate.

This polymerizable LC material can be coated or printed onto the substrate, for example by spin-coating, printing, or other known techniques, and the solvent is evaporated off before polymerization. In most cases, it is suitable to heat the mixture in order to facilitate the evaporation of the solvent.

The polymerizable LC material can be applied onto a substrate by conventional coating techniques like spin coating, bar coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

Suitable substrate materials and substrates are known to the expert and described in the literature, as for example conventional substrates used in the optical films industry, such as glass or plastic. Especially suitable and preferred substrates for polymerization are polyester such as polyethyleneterephthalate (PET) or polyethylenenaphthalate (PEN), polyvinylalcohol (PVA), polycarbonate (PC) triacetylcellulose (TAC), or cyclo olefin polymers (COP), or commonly known color filter materials, in particular triacetylcellulose (TAC), cyclo olefin polymers (COP), or commonly known colour filter materials. Suitable substrates can be plain substrates without any surface modification or even structured substrates like gratings, etc.

The polymerizable LC material preferably exhibits a uniform alignment throughout the whole layer if provided on plain substrates. However it is likewise preferred, that the polymerizable LC material exhibits a patterned or structured or in general a non-uniform alignment. In a preferred embodiment, the polymerizable LC material exhibits a uniform planar or a uniform homeotropic alignment.

The Friedel-Creagh-Kmetz rule can be used to predict whether a mixture will adopt planar or homeotropic alignment, by comparing the surface energies of the RM layer ($\gamma_{RM}$) and the substrate ($\gamma_s$):

If $\gamma_{RM}>\gamma_s$ the reactive mesogenic compounds will display homeotropic alignment, If $\gamma_{RM}<\gamma_s$ the reactive mesogenic compounds will display homogeneous alignment.

Without to be bound by theory, when the surface energy of a substrate is relatively low, the intermolecular forces between the reactive mesogens are stronger than the forces across the RM-substrate interface and consequently, reactive mesogens align perpendicular to the substrate (homeotropic alignment) in order to maximise the intermolecular forces.

Homeotropic alignment can also be achieved by using amphiphilic materials; they can be added directly to the polymerizable LC material, or the substrate can be treated with these materials in the form of a homeotropic alignment layer. The polar head of the amphiphilic material chemically bonds to the substrate, and the hydrocarbon tail points perpendicular to the substrate. Intermolecular interactions between the amphiphilic material and the RMs promote homeotropic alignment. Commonly used amphiphilic surfactants are described above.

Another method used to promote homeotropic alignment is to apply corona discharge treatment to plastic substrates, generating alcohol or ketone functional groups on the substrate surface. These polar groups can interact with the polar groups present in RMs or surfactants to promote homeotropic alignment.

When the surface tension of the substrate is greater than the surface tension of the RMs, the force across the interface dominates. The interface energy is minimised if the reactive mesogens align parallel with the substrate, so the long axis of the RM can interact with the substrate. One way planar alignment can be promoted is by coating the substrate with a polyimide layer, and then rubbing the alignment layer with a velvet cloth.

Other suitable planar alignment layers are known in the art, like for example rubbed polyimide or alignment layers prepared by photoalignment as described in U.S. Pat. No. 5,602,661, 5,389,698 or 6,717,644.

In general, reviews of alignment techniques are given for example by I. Sage in "Thermotropic Liquid Crystals", edited by G. W. Gray, John Wiley & Sons, 1987, pages 75-77; and by T. Uchida and H. Seki in "Liquid Crystals—Applications and Uses Vol. 3", edited by B. Bahadur, World Scientific Publishing, Singapore 1992, pages 1-63. A further review of alignment materials and techniques is given by J. Cognard, Mol. Cryst. Liq. Cryst. 78, Supplement 1 (1981), pages 1-77.

For the production of the polymer films according to the invention, the polymerizable compounds in the polymerizable LC material are polymerized or crosslinked (if one compound contains two or more polymerizable groups) by in-situ photopolymerization.

The photopolymerization can be carried out in one step. It is also possible to photopolymerize or crosslink the compounds in a second step, which have not reacted in the first step ("end curing").

In a preferred method of preparation the polymerizable LC material is coated onto a substrate and subsequently photopolymerized for example by exposure to actinic radiation as described for example in WO 01/20394, GB 2,315, 072 or WO 98/04651.

Photopolymerization of the LC material is preferably achieved by exposing it to actinic radiation. Actinic radiation means irradiation with light, like UV light, IR light or visible light, irradiation with X-rays or gamma rays, or irradiation with high-energy particles, such as ions or electrons. Preferably, polymerization is carried out by photo irradiation, in particular with UV light. As a source for actinic radiation, for example a single UV lamp or a set of UV lamps can be used. When using a high lamp power the curing time can be reduced. Another possible source for photo radiation is a laser, like e.g. a UV laser, an IR laser, or a visible laser. Another possible source for photo radiation is a LED lamp.

The curing time is dependent, inter alia, on the reactivity of the polymerizable LC material, the thickness of the coated layer, the type of polymerization initiator and the power of the UV lamp. The curing time is preferably ≤5 minutes, very preferably ≤3 minutes, most preferably ≤1 minute. For mass production, short curing times of ≤30 seconds are preferred.

A suitable UV radiation power is preferably in the range from 5 to 200 mWcm−2, more preferably in the range from 50 to 175 $mWcm^{-2}$ and most preferably in the range from 100 to 150 $mWcm^{-2}$.

In connection with the applied UV radiation and as a function of time, a suitable UV dose is preferably in the range from 25 to 7200 $mJcm^{-2}$ more preferably in the range from 100 to 7200 $mJcm^{-2}$ and most preferably in the range from 200 to 7200 $mJcm^{-2}$.

Photopolymerization is preferably performed under an inert gas atmosphere, preferably in a heated nitrogen atmosphere, but also polymerization in air is possible.

Photopolymerization is preferably performed at a temperature from 1 to 70° C., more preferably 5 to 50° C., even more preferably 15 to 30° C.

The polymerized LC film according to the present invention has good adhesion to plastic substrates, in particular to TAC, COP, and colour filters. Accordingly, it can be used as adhesive or base coating for subsequent LC layers which otherwise would not well adhere to the substrates.

For optical applications of the polymer film, it preferably has a thickness of from 0.5 to 10 μm, very preferably from 0.5 to 5 μm, in particular from 0.5 to 3 μm.

The optical retardation (δ(λ)) of a polymer film as a function of the wavelength of the incident beam (λ) is given by the following equation (7):

$$\delta(\lambda)=(2\pi\Delta n\cdot d)/\lambda \quad (7)$$

wherein (Δn) is the birefringence of the film, (d) is the thickness of the film and λ is the wavelength of the incident beam.

According to Snellius law, the birefringence as a function of the direction of the incident beam is defined as $$\Delta n=\sin\Theta/\sin\Psi \quad (8)$$

wherein sin Θ is the incidence angle or the tilt angle of the optical axis in the film and sin Ψ is the corresponding reflection angle.

Based on these laws, the birefringence and accordingly optical retardation depends on the thickness of a film and the tilt angle of optical axis in the film (cf. Berek's compensator). Therefore, the skilled expert is aware that different optical retardations or different birefringence can be induced by adjusting the orientation of the liquid-crystalline molecules in the polymer film.

The birefringence (Δn) of the polymer film according to the present invention is preferably in the range from 0.01 to 0.4, more preferable in the range from 0.01 to 0.3 and even more preferable in the range from 0.01 to 0.25.

The optical retardation as a function of the thickness of the polymer film according to the present invention is less than 200 nm, preferable less than 180 nm and even more preferable less than 150 nm.

The polymer film of the present invention can also be used as alignment film or substrate for other liquid-crystalline or RM materials. The inventors have found that the polymer film obtainable from a polymerizable LC material as described above and below, is in particular useful for multilayer applications due to its improved dewetting characteristics. In this way, stacks of one or more, preferably 2, 3, 4, 5, 6, 7, 8, 9, 10 or more, optical films or preferably polymerized LC films, more preferably polymerized CLC films having different optical characteristics can be prepared.

In summary, the polymerized LC films and polymerizable LC materials according to the present invention are useful in optical elements like polarisers, compensators, alignment layer, circular polarisers or colour filters in liquid crystal displays or projection systems, decorative images, for the preparation of liquid crystal or effect pigments, and especially in reflective films with spatially varying reflection colours, e.g. as multicolour image for decorative, information storage or security uses, such as non-forgeable documents like identity or credit cards, banknotes etc.

The polymerized LC films according to the present invention can be used in displays of the transmissive or reflective type. They can be used in conventional OLED displays or LCDs, in particular LCDs.

The present invention is described above and below with particular reference to the preferred embodiments. It should be understood that various changes and modifications might be made therein without departing from the spirit and scope of the invention.

Many of the compounds or mixtures thereof mentioned above and below are commercially available. All of these compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here.

It will be appreciated that variations to the foregoing embodiments of the invention can be made while still falling within the scope of the invention. Alternative features serving the same, equivalent, or similar purpose may replace each feature disclosed in this specification, unless stated otherwise. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention.

Independent protection may be sought for these features in addition to or alternative to any invention presently claimed.

The invention will now be described in more detail by reference to the following working examples, which are illustrative only and do not limit the scope of the invention.

Example 1

The following formulation is prepared in accordance with the given table:

| Formulation A | % w/w |
|---|---|
| Surfactant of Table C | 0.03% |
| SPI-03 | 2.50% |
| LC756 | 4.21% |
| 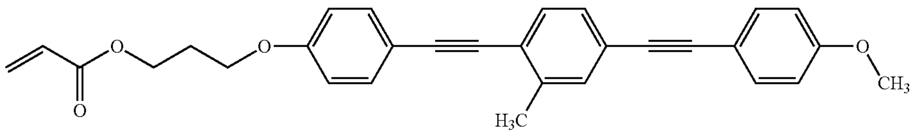 | 20.00% |
| 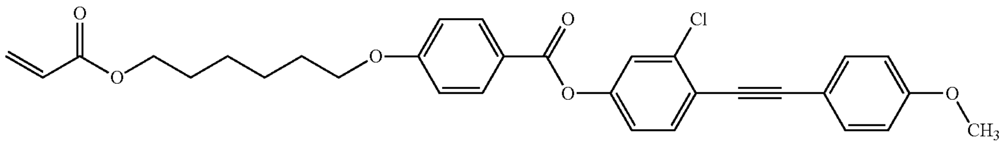 | 21.54% |
| 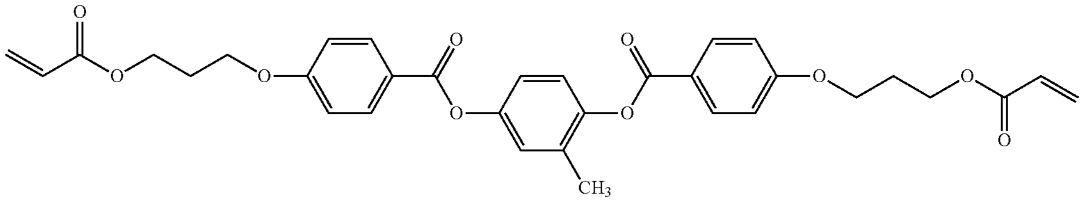 | 45.00% |
| 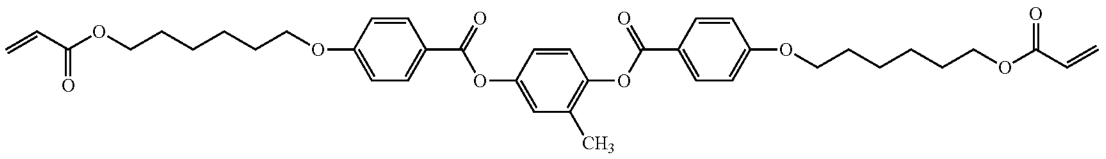 [SMILES: C=CC(=O)OCCCCCCOc1ccc(C(=O)Oc2ccc(OC(=O)c3ccc(OCCCCCCOC(=O)C=C)cc3)c(C)c2)cc1] | 6.72% |

The formulation is dissolved to 40% solids in MIBK (methyl isobutyl ketone) and dived into 15 parts which are doped with the following surfactants to make up 0.03% of the solid formulation, respectively.

| Formulation | Surfactant Doped in Formulation A |
|---|---|
| C | Dynol 980 (comparative) |
| D | BYK 388 (comparative) |
| E | FluorN 561 (comparative) |
| F | FluorN 562 (comparative) |
| G | BYK 310 (comparative) |
| H | Tego Twin 4000 |
| I | Tego Flow 425 (comparative) |
| J | Tego Flow 300 (comparative) |
| K | Tego Flow 375 (comparative) |
| L | Dodecanol (comparative) |
| M | Tego Rad 2500 (comparative) |
| N | Tego Rad 2300 (comparative) |
| O | Polyfox 7002 (comparative) |
| P | Tego Wet 270 (comparative) |
| Q | BYK UV-3550 (comparative) |

The mixtures are spin coated on polyimide rubbed glass at 1000 rpm for 30 s. The wet films are annealed at 60° C. for 60 s and cured in Light Hammer 6 Fusion conveyor belt UV lamp (250 mJ) under N2.

Each resulting film is visually inspected for CLC alignment and visible haze by eye after initial cure. If good CLC alignment is seen with the chosen surfactant, an additional coat of the same formulation was coated on top following the same method as given above. Each film is visually inspected for dewetting after the second annealing step

| Formulation | Alignment and haze in Step 1 | No Dewets in Step 2 |
|---|---|---|
| C | ○ | X |
| D | ○ | X |
| E | ○ | X |
| F | ○ | X |
| G | ○ | X |
| H | ○ | ○ |
| I | ○ | X |
| J | ○ | X |
| K | X | X |
| L | X | X |
| M | ○ | XX |
| N | X | XX |
| O | X | XX |
| P | X | X |
| Q | X | X |

○ = Good (Good alignment or no dewets)
X = Bad (Bad CLC alignment/haze or some dewets)
XX = Very Bad (Extreme dewets)

Example 2

The following formulation is prepared in accordance with the given table:

| Formulation B | % w/w |
|---|---|
| Surfactant | 0.03% |
| SPI-03 | 2.50% |
| LC756 | 6.10% |
| 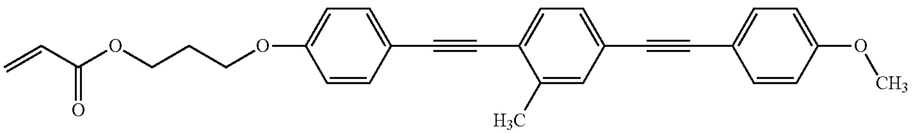 | 20.00% |
| 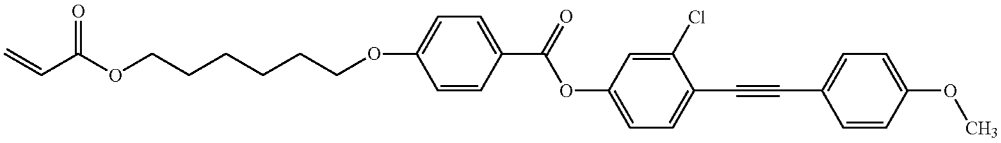 [SMILES: C=CC(=O)OCCCCCCOc1ccc(C(=O)Oc2ccc(C#Cc3ccc(OC)cc3)c(Cl)c2)cc1] | 21.54% |
| 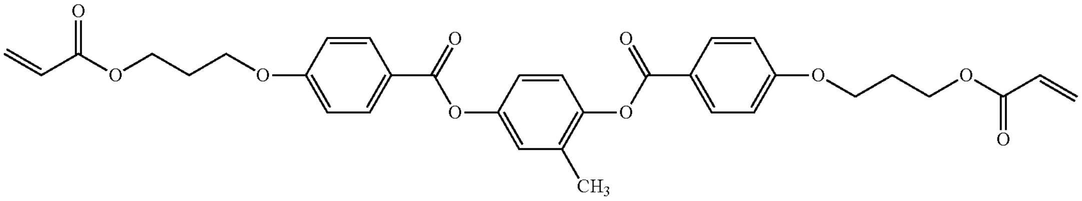 [SMILES: C=CC(=O)OCCCOc1ccc(C(=O)Oc2ccc(OC(=O)c3ccc(OCCCOC(=O)C=C)cc3)c(C)c2)cc1] | 43.11% |
| 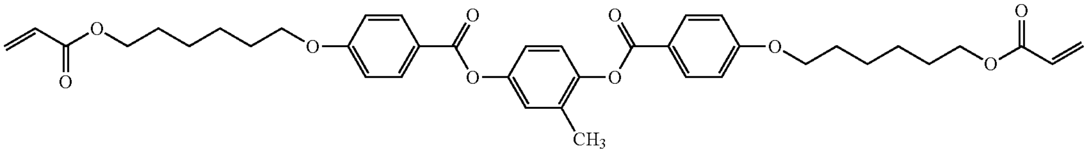 | 6.72% |

The formulation is dissolved to 40% solids in MIBK (methyl isobutyl ketone) and dived into 9 parts which are doped with the following surfactants to make up 0.03% of the solid formulation, respectively.

| Formulation | Surfactant Doped In Formulation B |
|---|---|
| R | Dynol 980 (comparative) |
| S | BYK 388 (comparative) |
| T | FlourN 561 (comparative) |
| U | FluorN 562 (comparative) |
| U | BYK 310 (comparative) |
| W | Tego Twin 4000 |
| X | Tego Flow 425 (comparative) |
| Y | Tego Flow 300 (comparative) |
| Z | Tego Flow 375 (comparative) |

The formulations C to Q of example 1 are spin coated on polyimide rubbed glass at 1000 rpm for 30 s. The films are annealed at 60° C. for 60 s. The films are cured in Light Hammer 6 Fusion conveyor belt UV lamp (250 mJ) under $N_2$.

Each film is visually inspected for CLC alignment and visible haze by eye after initial cure. If good CLC alignment is seen with the chosen surfactant, the corresponding surfactant doped Formulation B (R-Z) with the same surfactant was coated on top following the same method as described above

| Formulation Step 1 | Alignment and haze Step 1 | Formulation Step 2 | Dewets Step 2 | Alignment Step 2 |
|---|---|---|---|---|
| C | ○ | R | X | X |
| D | ○ | S | X | X |
| E | ○ | T | X | X |
| F | ○ | U | X | X |
| G | ○ | V | X | X |
| H | ○ | W | ○ | ○ |
| I | ○ | X | ○ | X |
| J | ○ | Y | ○ | X |
| K | X | Z | X | X |

From these results it is clear that choosing Tego Twin 4000 as the surfactant in the CLC formulation allows for good alignment quality of multiple layers of CLC while not having any dewet problems in the second step.

Example 3—Comparative Example

The following formulation is prepared in accordance with the given table:

| Formulation AA | % w/w |
|---|---|
| Irganox 1076 | 0.08 |
| Tego Twin 4000 | 0.05 |
| Irgacure 907 | 5.00 |
| LC756 | 4.88 |
| 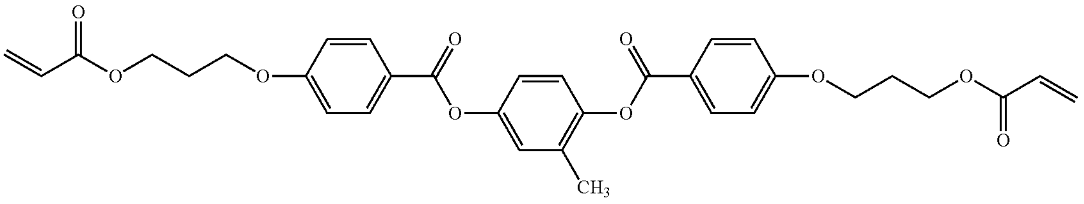 [SMILES: C=CC(=O)OCCCOc1ccc(C(=O)Oc2ccc(OC(=O)c3ccc(OCCCOC(=O)C=C)cc3)c(C)c2)cc1] | 33.37 |
| 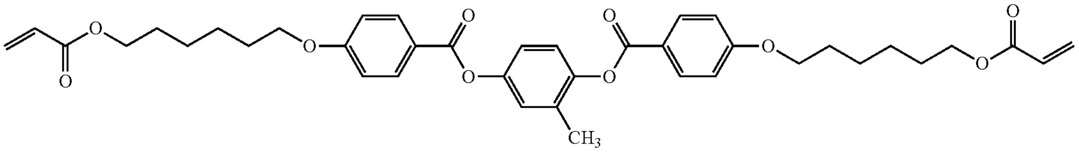 [SMILES: C=CC(=O)OCCCCCCOc1ccc(C(=O)Oc2ccc(OC(=O)c3ccc(OCCCCCCOC(=O)C=C)cc3)c(C)c2)cc1] | 8.45 |
| 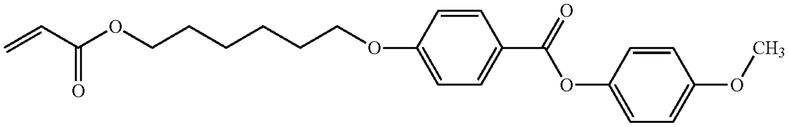 [SMILES: C=CC(=O)OCCCCCCOc1ccc(C(=O)Oc2ccc(OC)cc2)cc1] | 15.00 |
| 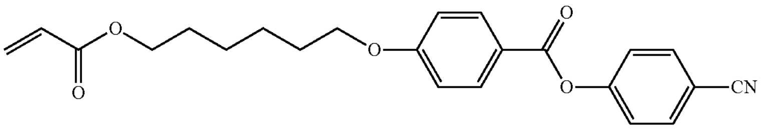 | 15.00 |
| 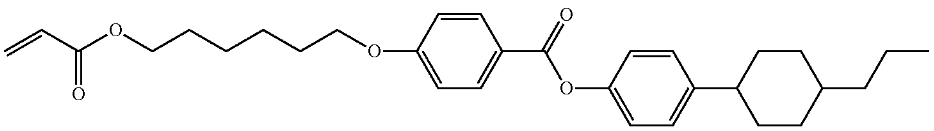 [SMILES: C=CC(=O)OCCCCCCOc1ccc(C(=O)Oc2ccc(C3CCC(CCC)CC3)cc2)cc1] | 20.00 |

The formulation is dissolved to 35% solids in MIBK and the mixture is spin coated on polyimide rubbed glass at 1000 rpm for 30 s. The wet film is annealed at 90° C. for 60 s and cured in Light Hammer 6 Fusion conveyor belt UV lamp (250 mJ) under $N_2$.

The polymer film is visually inspected for CLC alignment by eye after cure. No film crystallization or dewetting is observed for any of the coated films. The film is measured using a Shimadzu 3600 UV-Vis spectrometer to determine the reflective wavelength and bandwidth of reflection. The film thickness is measured using a Dektak Profilometer. The results of these measurements are shown in the table below:

| Central Wavelength/nm | Reflection Bandwidth/nm | Film Thickness/μm |
|---|---|---|
| 612 | 81 | 3.21 |

Example 4

The following formulation is prepared in accordance with the given table:

| Formulation AB | % w/w |
|---|---|
| Irganox 1076 | 0.08 |
| Tego Twin 4000 | 0.05 |
| Irgacure 907 | 5.00 |
| LC756 | 4.88 |
| 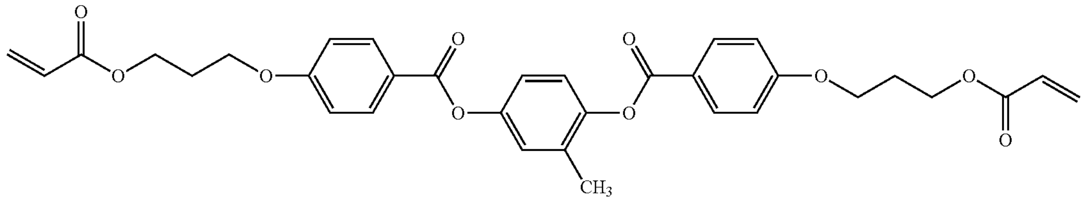 [SMILES: C=CC(=O)OCCCOc1ccc(C(=O)Oc2ccc(OC(=O)c3ccc(OCCCOC(=O)C=C)cc3)c(C)c2)cc1] | 28.42 |
| 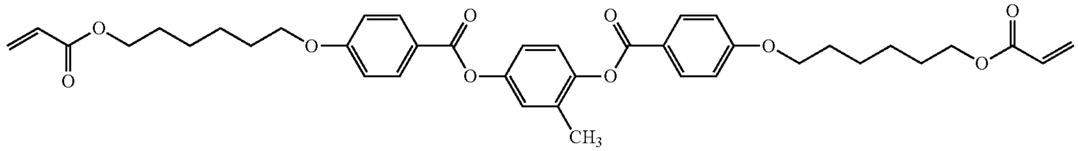 | 3.61 |
| 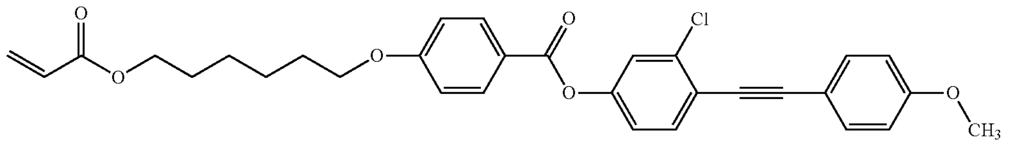 | 37.41 |
| 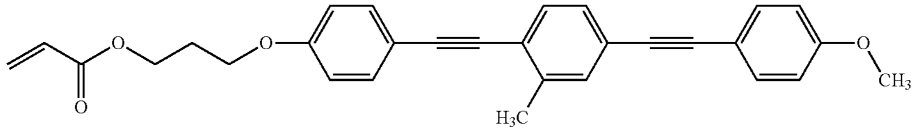 | 20.55 |

The formulation is dissolved to 35% solids in MIBK and the mixture is spin coated on polyimide rubbed glass at 1000 rpm for 30 s. the wet film is annealed at 90° C. for 60 s and cured in Light Hammer 6 Fusion conveyor belt UV lamp (250 mJ) under $N_2$.

The polymer film is visually inspected for CLC alignment by eye after cure. No film crystallization or dewetting is observed for any of the coated films. The film is measured using a Shimadzu 3600 UV-Vis spectrometer to determine the reflective wavelength and bandwidth of reflection. The film thickness is measured using a Dektak Profilometer. The results of these measurements are shown in the table below:

| Central Wavelength/nm | Reflection Bandwidth/nm | % Bandwidth Compared to Ex. 3 | Film Thickness/μm |
|---|---|---|---|
| 622 | 117 | 144% | 5.25 |

Example 5

The following formulation is prepared in accordance with the given table:

| Formulation AC | % w/w |
|---|---|
| Irganox 1076 | 0.08 |
| Tego Twin 4000 | 0.05 |
| Irgacure 907 | 5.00 |
| LC756 | 4.88 |
| 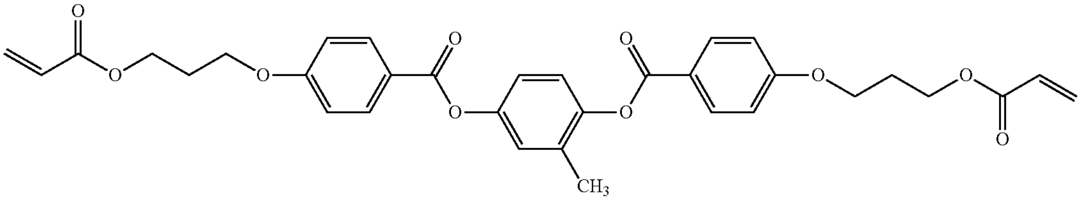 | 3.52 |
| 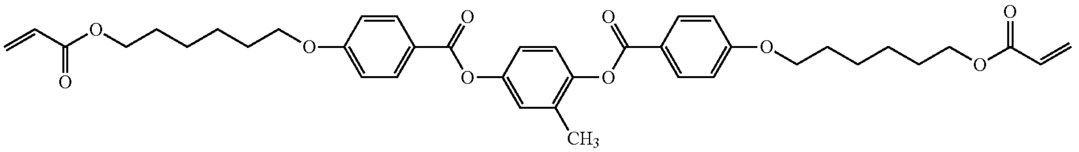 | 1.00 |
| 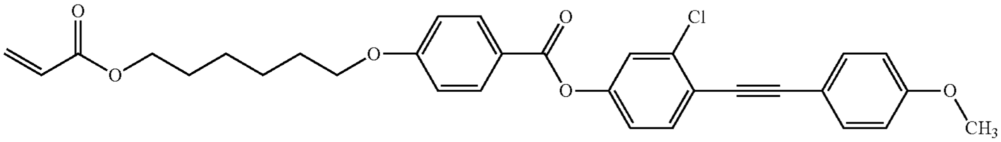 [SMILES: C=CC(=O)OCCCCCCOc1ccc(C(=O)Oc2ccc(C#Cc3ccc(OC)cc3)c(Cl)c2)cc1] | 56.41 |
| 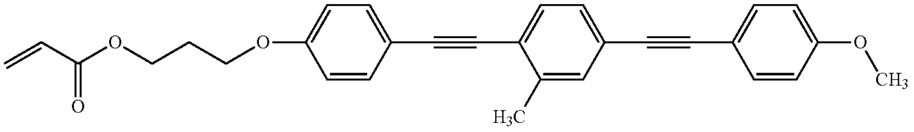 | 29.06 |

The formulation is dissolved to 35% solids in MIBK and the mixture is spin coated on polyimide rubbed glass at 1000 rpm for 30 s. the wet film is annealed at 90° C. for 60 s and cured in Light Hammer 6 Fusion conveyor belt UV lamp (250 mJ) under $N_2$.

The polymer film is visually inspected for CLC alignment by eye after cure. No film crystallization or dewetting is observed for any of the coated films. The film is measured using a Shimadzu 3600 UV-Vis spectrometer to determine the reflective wavelength and bandwidth of reflection. The film thickness is measured using a Dektak Profilometer. The results of these measurements are shown in the table below:

| Central Wavelength/nm | Reflection Bandwidth/nm | % Bandwidth Compared to Ex. 3 | Film Thickness/μm |
|---|---|---|---|
| 628 | 141 | 174% | 5.31 |

Example 6

The following formulation is prepared in accordance with the given table:

| Formulation BA | % w/w |
|---|---|
| Tego Twin 4000 | 0.03 |
| Irganox 1076 | 0.08 |
| SPI-03 | 2.50 |
| LC756 | 4.10 |
| LC242 | 5.00 |
| 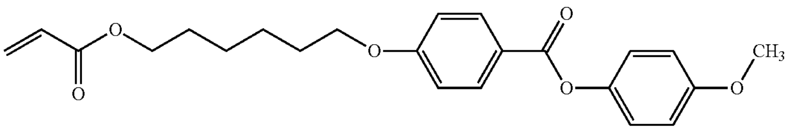 [SMILES: C=CC(=O)OCCCCCCOc1ccc(C(=O)Oc2ccc(OC)cc2)cc1] | 2.00 |

-continued

| Formulation BA | % w/w |
|---|---|
| 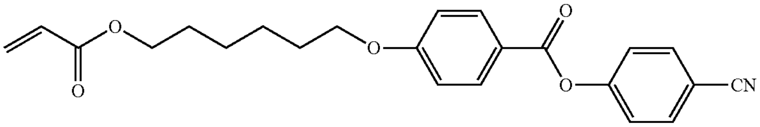 [SMILES: C=CC(=O)OCCCCCCOc1ccc(C(=O)Oc2ccc(C#N)cc2)cc1] | 2.00 |
| 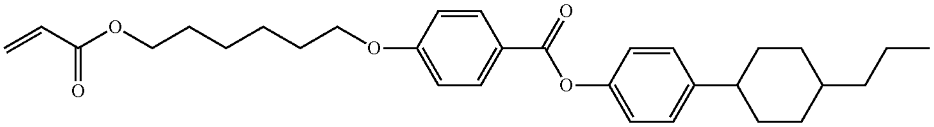 | 2.50 |
| 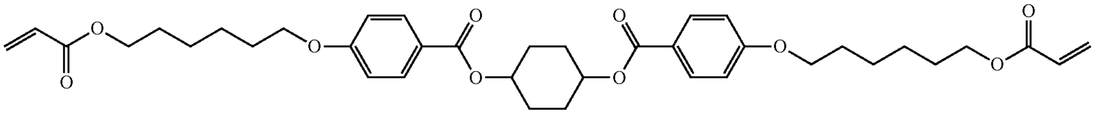 [SMILES: C=CC(=O)OCCCCCCOc1ccc(C(=O)OC2CCC(OC(=O)c3ccc(OCCCCCCOC(=O)C=C)cc3)CC2)cc1] | 3.00 |
| 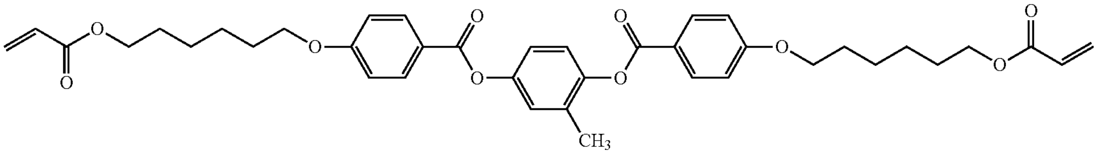 | 5.08 |
| 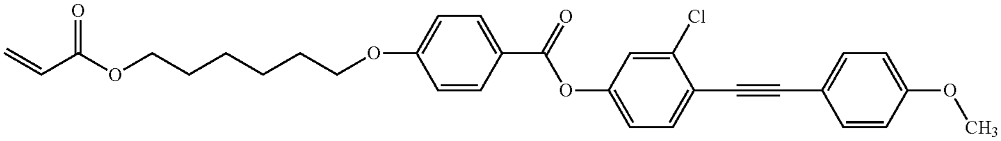 | 8.00 |
| 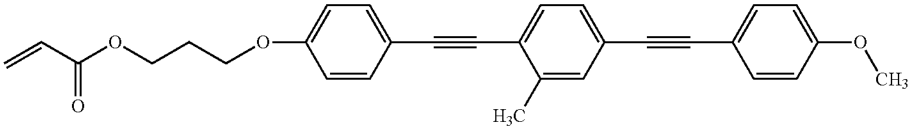 | 15.00 |
| 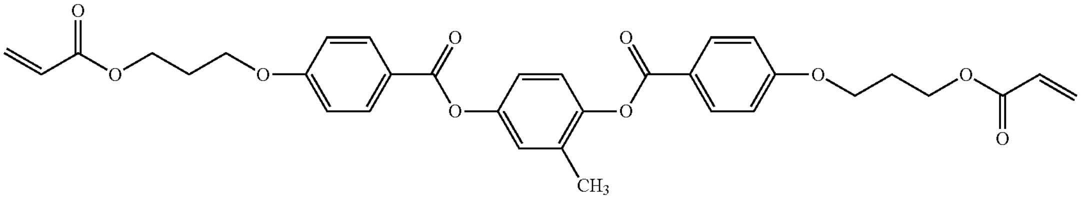 [SMILES: C=CC(=O)OCCCOc1ccc(C(=O)Oc2ccc(OC(=O)c3ccc(OCCCOC(=O)C=C)cc3)c(C)c2)cc1] | 50.71 |

The formulation is dissolved to 35% solids in MIBK and the mixture is spin coated on polyimide rubbed glass at 1000 rpm for 30 s. the wet film is annealed at 100° C. for 60 s and cured in Light Hammer 6 Fusion conveyor belt UV lamp (250 mJ) under $N_2$.

The polymer film is visually inspected for CLC alignment by eye after cure. No film crystallization or dewetting is observed for any of the coated films.

The film is measured using a Shimadzu 3600 UV-Vis spectrometer to determine the reflective wavelength and bandwidth of reflection. The film thickness is measured using a Dektak Profilometer. The results of these measurements are shown in the table below:

| Central Wavelength/nm | Reflection Bandwidth/nm | Film Thickness/μm |
|---|---|---|
| 683 | 96 | 5.25 |

Example 7

The following formulation is prepared in accordance with the given table:

| Compound | % w/w |
|---|---|
| Tego Twin 4000 | 0.03 |
| Irganox 1076 | 0.08 |
| SPI-03 | 2.50 |
| LC756 | 4.58 |
| LC242 | 5.00 |
| 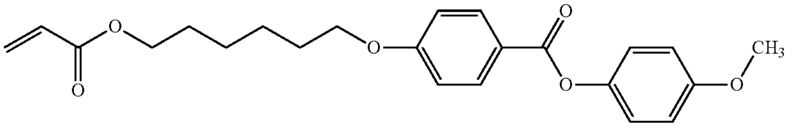 | 2.00 |
| 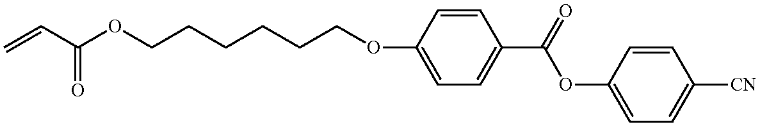 [SMILES: C=CC(=O)OCCCCCCOc1ccc(C(=O)Oc2ccc(C#N)cc2)cc1] | 2.00 |
| 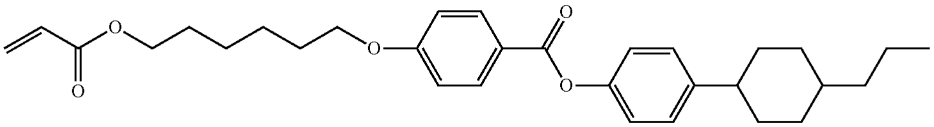 [SMILES: C=CC(=O)OCCCCCCOc1ccc(C(=O)Oc2ccc(C3CCC(CCC)CC3)cc2)cc1] | 2.50 |
| 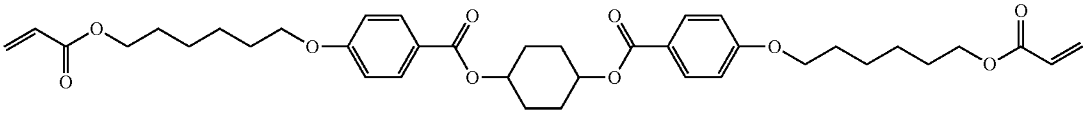 [SMILES: C=CC(=O)OCCCCCCOc1ccc(C(=O)OC2CCC(OC(=O)c3ccc(OCCCCCCOC(=O)C=C)cc3)CC2)cc1] | 3.00 |
| 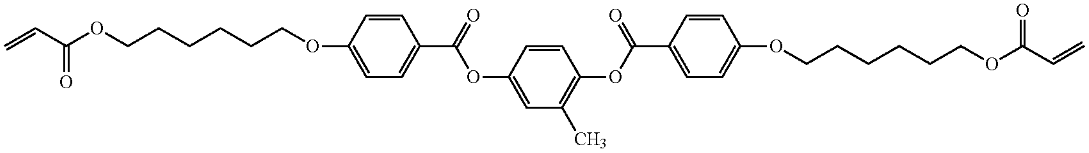 | 5.08 |
| 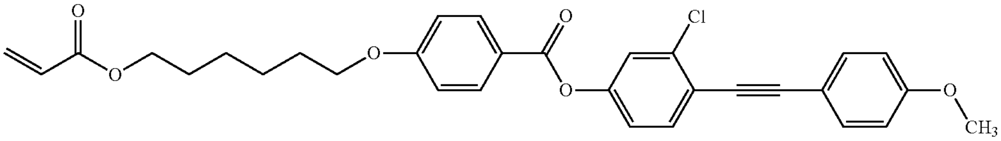 | 8.00 |
| 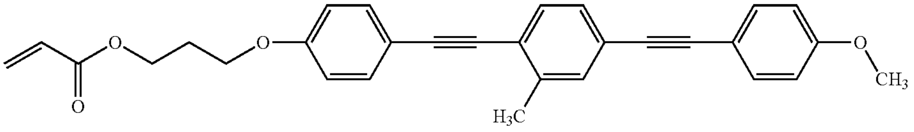 | 15.00 |
| 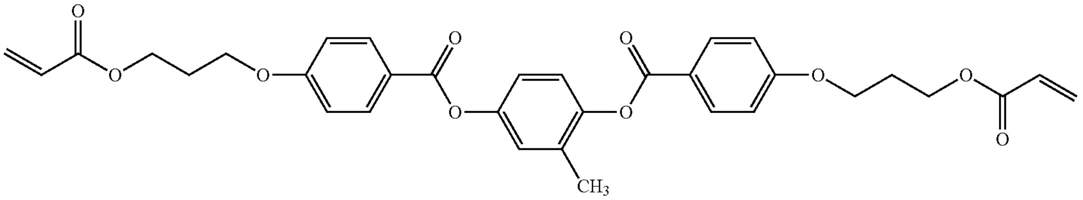 [SMILES: C=CC(=O)OCCCOc1ccc(C(=O)Oc2ccc(OC(=O)c3ccc(OCCCOC(=O)C=C)cc3)c(C)c2)cc1] | 50.23 |

The formulation is dissolved to 35% solids in MIBK and the mixture is spin coated on polyimide rubbed glass at 1000 rpm for 30 s. the wet film is annealed at 90° C. for 60 s and cured in Light Hammer 6 Fusion conveyor belt UV lamp (250 mJ) under $N_2$.

The polymer film is visually inspected for CLC alignment by eye after cure. No film crystallization or dewetting is observed for any of the coated films.

The film is measured using a Shimadzu 3600 UV-Vis spectrometer to determine the reflective wavelength and bandwidth of reflection. The film thickness is measured using a Dektak Profilometer. The results of these measurements are shown in the table below:

| Central Wavelength/nm | Reflection Bandwidth/nm | Film Thickness/μm |
|---|---|---|
| 614 | 83 | 5.64 |

Example 8

The following formulation is prepared in accordance with the given table:

| Compound | % w/w |
|---|---|
| Tego Twin 4000 | 0.03 |
| Irganox 1076 | 0.08 |
| SPI-03 | 2.50 |
| LC756 | 5.06 |
| LC242 | 5.00 |
| 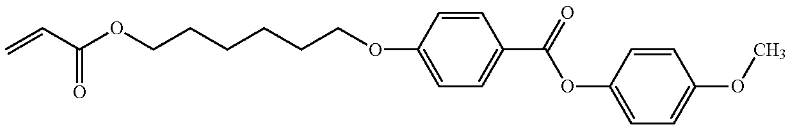 [SMILES: C=CC(=O)OCCCCCCOc1ccc(C(=O)Oc2ccc(OC)cc2)cc1] | 2.00 |
| 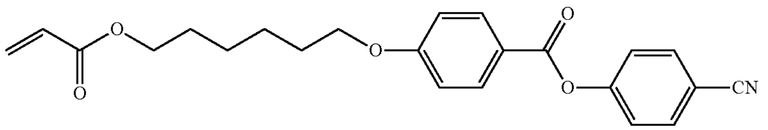 | 2.00 |
| 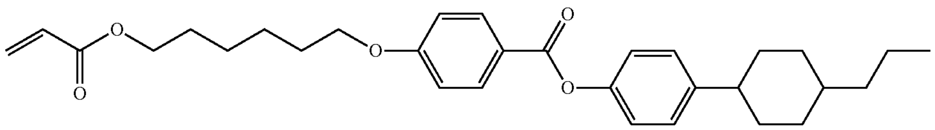 | 2.50 |
| 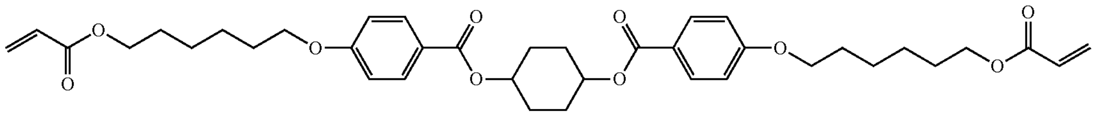 [SMILES: C=CC(=O)OCCCCCCOc1ccc(C(=O)OC2CCC(OC(=O)c3ccc(OCCCCCCOC(=O)C=C)cc3)CC2)cc1] | 3.00 |
| 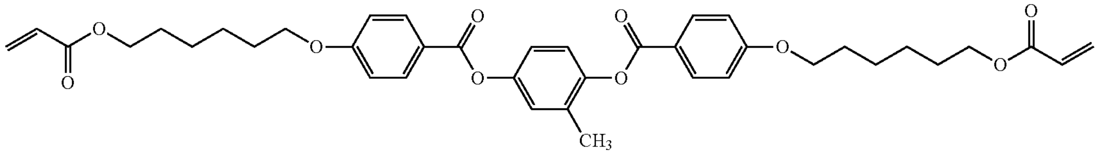 | 5.08 |
| 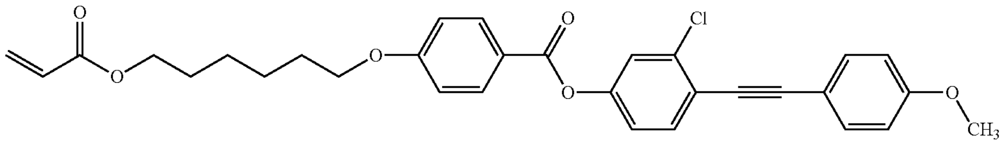 | 8.00 |
| 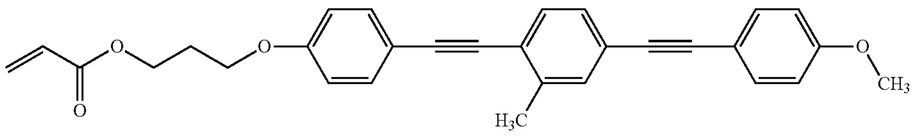 | 15.00 |

-continued

| Compound | % w/w |
| --- | --- |
| 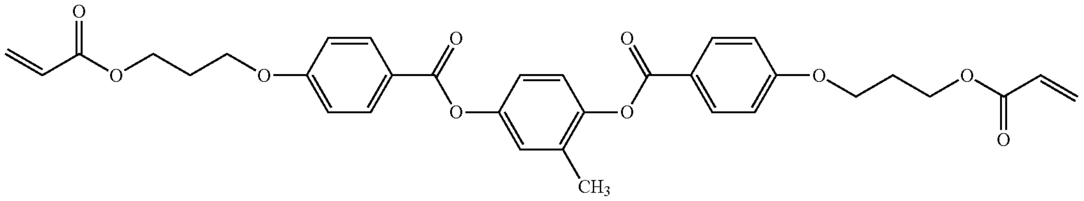 [SMILES: C=CC(=O)OCCCOc1ccc(C(=O)Oc2ccc(OC(=O)c3ccc(OCCCOC(=O)C=C)cc3)c(C)c2)cc1] | 49.75 |

The formulation is dissolved to 35% solids in MIBK and the mixture is spin coated on polyimide rubbed glass at 1000 rpm for 30 s. the wet film is annealed at 90° C. for 60 s and cured in Light Hammer 6 Fusion conveyor belt UV lamp (250 mJ) under $N_2$.

The polymer film is visually inspected for CLC alignment by eye after cure. No film crystallization or dewetting is observed for any of the coated films.

The film is measured using a Shimadzu 3600 UV-Vis spectrometer to determine the reflective wavelength and bandwidth of reflection. The film thickness is measured using a Dektak Profilometer. The results of these measurements are shown in the table below:

| Central Wavelength/nm | Reflection Bandwidth/nm | Film Thickness/μm |
| --- | --- | --- |
| 562 | 75 | 4.98 |

Example 9

The following formulation is prepared in accordance with the given table:

| Compound | % w/w |
| --- | --- |
| Tego Twin 4000 | 0.03 |
| Irganox 1076 | 0.08 |
| SPI-03 | 2.50 |
| LC756 | 5.54 |
| LC242 | 5.00 |
| 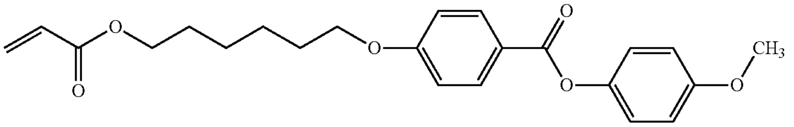 | 2.00 |
| 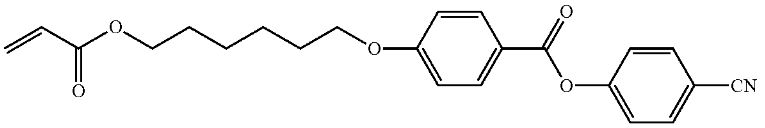 [SMILES: C=CC(=O)OCCCCCCOc1ccc(C(=O)Oc2ccc(C#N)cc2)cc1] | 2.00 |
| 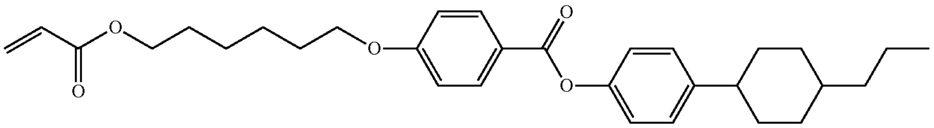 [SMILES: C=CC(=O)OCCCCCCOc1ccc(C(=O)Oc2ccc(C3CCC(CCC)CC3)cc2)cc1] | 2.50 |
| 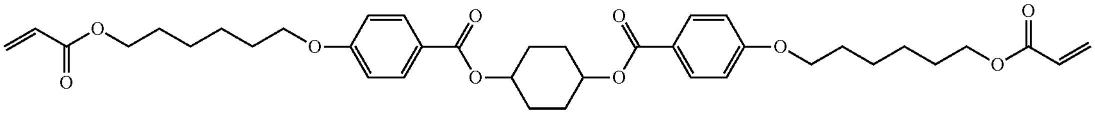 | 3.00 |
| 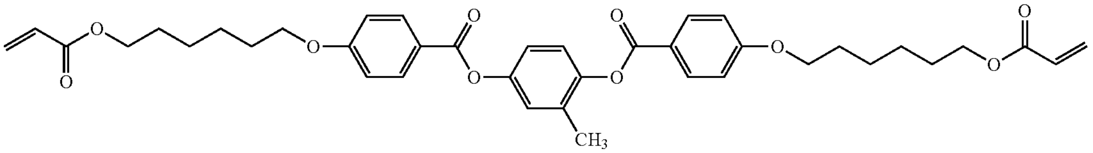 [SMILES: C=CC(=O)OCCCCCCOc1ccc(C(=O)Oc2ccc(OC(=O)c3ccc(OCCCCCCOC(=O)C=C)cc3)c(C)c2)cc1] | 5.08 |

-continued

| Compound | % w/w |
|---|---|
| 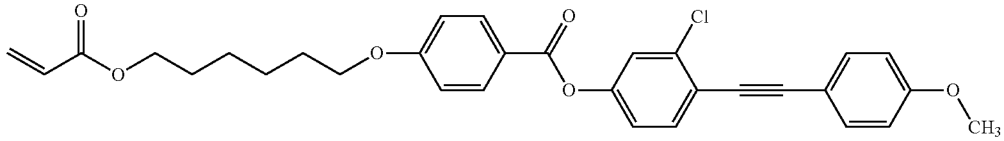 | 8.00 |
| 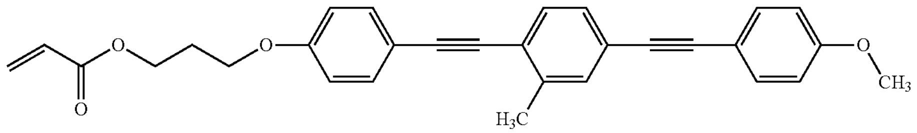 | 15.00 |
| 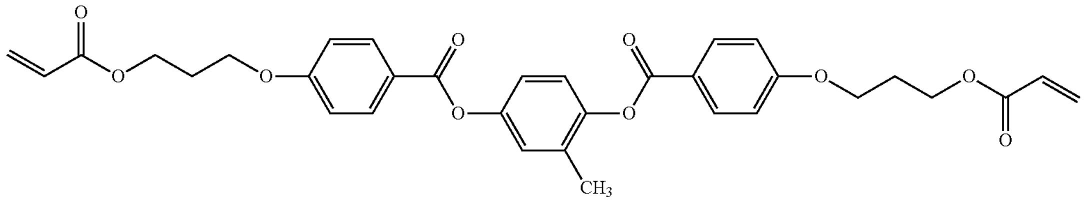 | 49.27 |

The formulation is dissolved to 35% solids in MIBK and the mixture is spin coated on polyimide rubbed glass at 1000 rpm for 30 s. the wet film is annealed at 90° C. for 60 s and cured in Light Hammer 6 Fusion conveyor belt UV lamp (250 mJ) under $N_2$.

The polymer film is visually inspected for CLC alignment by eye after cure. No film crystallization or dewetting is observed for any of the coated films.

The film is measured using a Shimadzu 3600 UV-Vis spectrometer to determine the reflective wavelength and bandwidth of reflection. The film thickness is measured using a Dektak Profilometer. The results of these measurements are shown in the table below:

| Central Wavelength/nm | Reflection Bandwidth/nm | Film Thickness/μm |
|---|---|---|
| 511 | 70 | 5.15 |

Example 10

The following formulation is prepared in accordance with the given table:

| Compound | % w/w |
|---|---|
| Tego Twin 4000 | 0.03 |
| Irganox 1076 | 0.08 |
| SPI-03 | 2.50 |
| LC756 | 5.78 |
| LC242 | 5.00 |
| 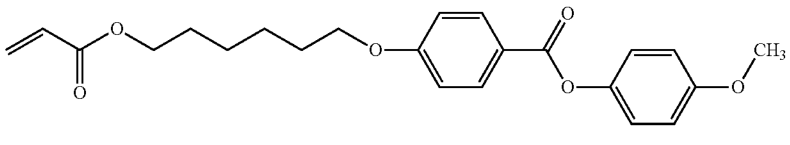 [SMILES: C=CC(=O)OCCCCCCOc1ccc(C(=O)Oc2ccc(OC)cc2)cc1] | 2.00 |
| 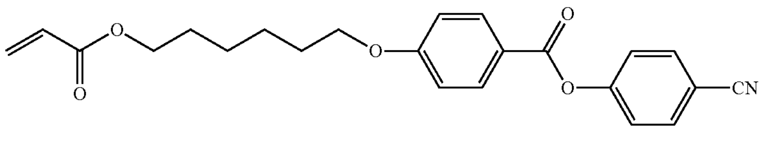 [SMILES: C=CC(=O)OCCCCCCOc1ccc(C(=O)Oc2ccc(C#N)cc2)cc1] | 2.00 |
| 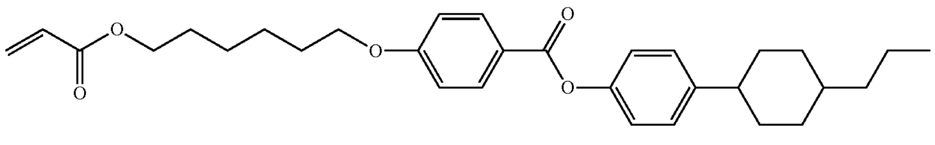 [SMILES: C=CC(=O)OCCCCCCOc1ccc(C(=O)Oc2ccc(C3CCC(CCC)CC3)cc2)cc1] | 2.50 |

-continued

| Compound | % w/w |
|---|---|
| 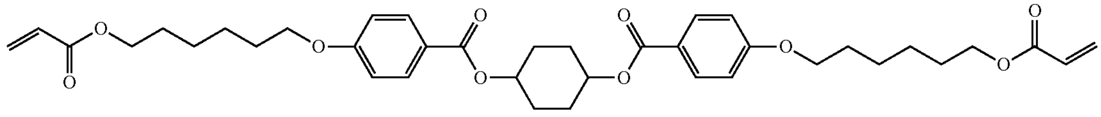 [SMILES: C=CC(=O)OCCCCCCOc1ccc(C(=O)OC2CCC(OC(=O)c3ccc(OCCCCCCOC(=O)C=C)cc3)CC2)cc1] | 3.00 |
| 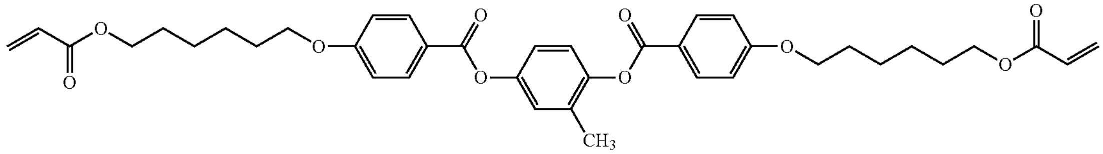 [SMILES: C=CC(=O)OCCCCCCOc1ccc(C(=O)Oc2ccc(OC(=O)c3ccc(OCCCCCCOC(=O)C=C)cc3)c(C)c2)cc1] | 5.08 |
| 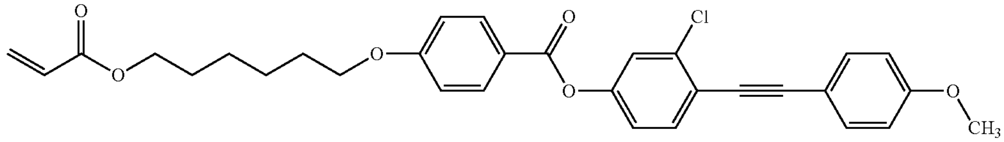 [SMILES: C=CC(=O)OCCCCCCOc1ccc(C(=O)Oc2ccc(C#Cc3ccc(OC)cc3)c(Cl)c2)cc1] | 8.00 |
| 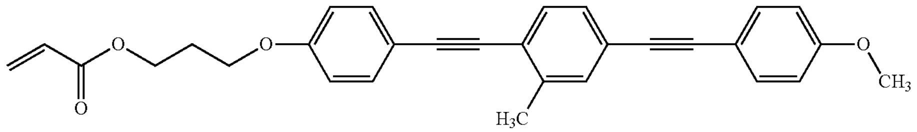 | 15.00 |
| 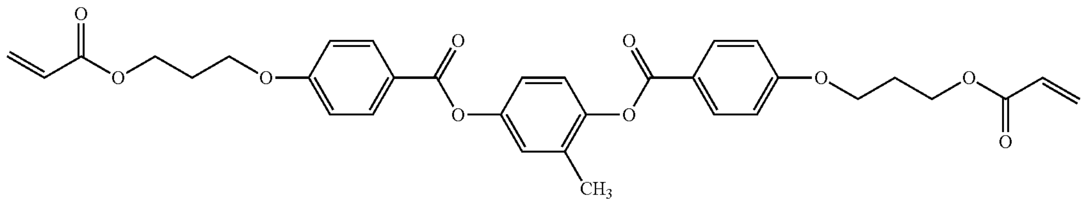 [SMILES: C=CC(=O)OCCCOc1ccc(C(=O)Oc2ccc(OC(=O)c3ccc(OCCCOC(=O)C=C)cc3)c(C)c2)cc1] | 49.03 |

The formulation is dissolved to 35% solids in MIBK and the mixture is spin coated on polyimide rubbed glass at 1000 rpm for 30 s. the wet film is annealed at 90° C. for 60 s and cured in Light Hammer 6 Fusion conveyor belt UV lamp (250 mJ) under $N_2$.

The polymer film is visually inspected for CLC alignment by eye after cure. No film crystallization or dewetting is observed for any of the coated films.

The film is measured using a Shimadzu 3600 UV-Vis spectrometer to determine the reflective wavelength and bandwidth of reflection. The film thickness is measured using a Dektak Profilometer. The results of these measurements are shown in the table below:

| Central Wavelength/nm | Reflection Bandwidth/nm | Film Thickness/μm |
|---|---|---|
| 471 | 67 | 5.01 |

Example 11

The following formulations are prepared in accordance with the given tables:

| Formulation 11-A - Compounds | % w/w |
|---|---|
| Tego Twin 4000 | 0.03 |
| Irganox 1076 | 0.08 |
| SPI-03 | 2.50 |
| LC756 | 4.31 |
| LC242 | 5.00 |
| 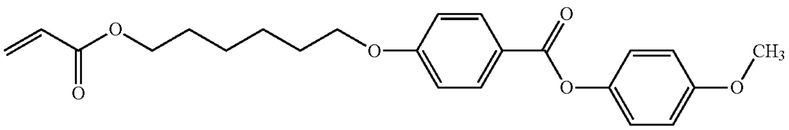 [SMILES: C=CC(=O)OCCCCCCOc1ccc(C(=O)Oc2ccc(OC)cc2)cc1] | 2.00 |

-continued
| Formulation 11-A - Compounds | % w/w |
|---|---|
| 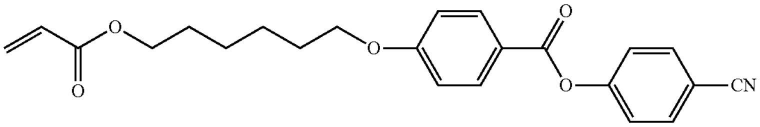 [SMILES: C=CC(=O)OCCCCCCOc1ccc(C(=O)Oc2ccc(C#N)cc2)cc1] | 2.00 |
| 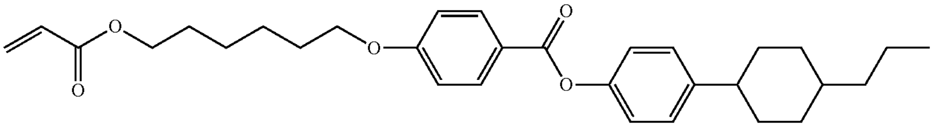 | 2.50 |
| 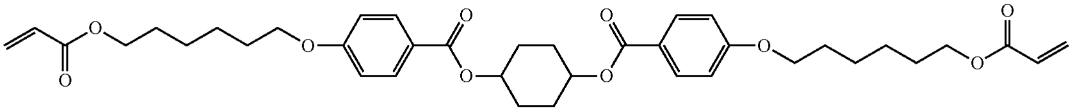 [SMILES: C=CC(=O)OCCCCCCOc1ccc(C(=O)OC2CCC(OC(=O)c3ccc(OCCCCCCOC(=O)C=C)cc3)CC2)cc1] | 3.00 |
| 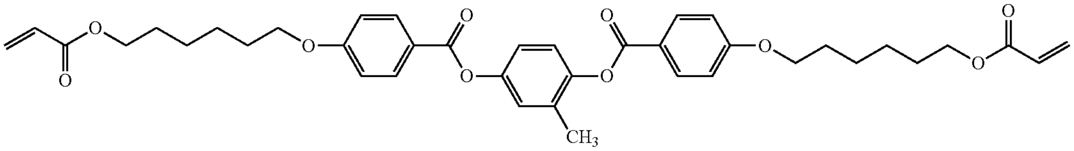 [SMILES: C=CC(=O)OCCCCCCOc1ccc(C(=O)Oc2ccc(OC(=O)c3ccc(OCCCCCCOC(=O)C=C)cc3)c(C)c2)cc1] | 5.08 |
| 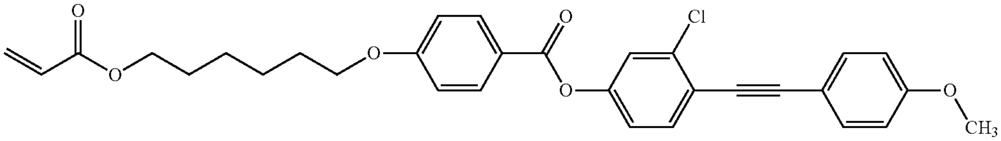 | 8.00 |
| 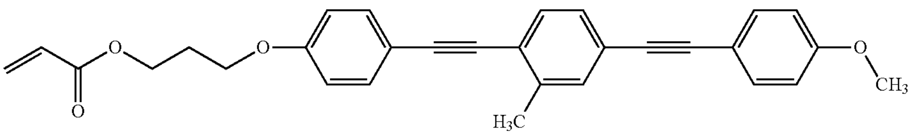 | 15.00 |
| 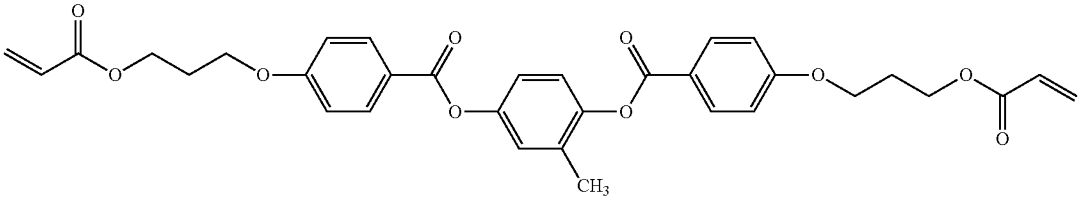 [SMILES: C=CC(=O)OCCCOc1ccc(C(=O)Oc2ccc(OC(=O)c3ccc(OCCCOC(=O)C=C)cc3)c(C)c2)cc1] | 50.50 |
| Formulation 11-B - Compounds | % w/w |
|---|---|
| Tego Twin 4000 | 0.03 |
| Irganox 1076 | 0.08 |
| RM105 | 2.00 |
| SPI-03 | 2.50 |
| LC756 | 5.81 |
| LC242 | 5.00 |
| 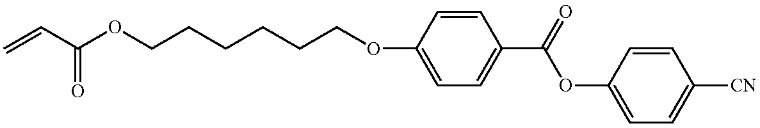 [SMILES: C=CC(=O)OCCCCCCOc1ccc(C(=O)Oc2ccc(C#N)cc2)cc1] | 2.00 |

-continued

| Formulation 11-B - Compounds | % w/w |
| --- | --- |
| 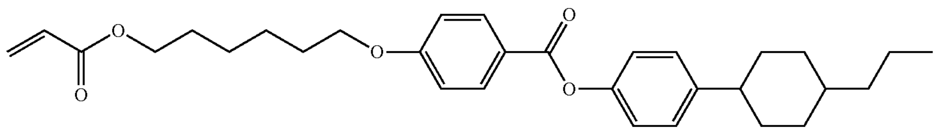 [SMILES: C=CC(=O)OCCCCCCOc1ccc(C(=O)Oc2ccc(C3CCC(CCC)CC3)cc2)cc1] | 2.50 |
| 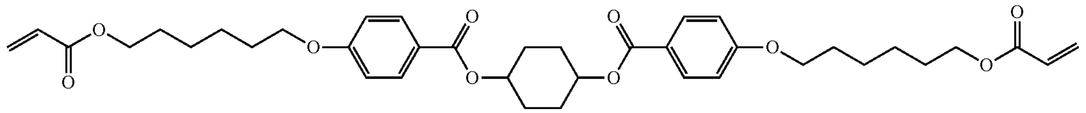 [SMILES: C=CC(=O)OCCCCCCOc1ccc(C(=O)OC2CCC(OC(=O)c3ccc(OCCCCCCOC(=O)C=C)cc3)CC2)cc1] | 3.00 |
| 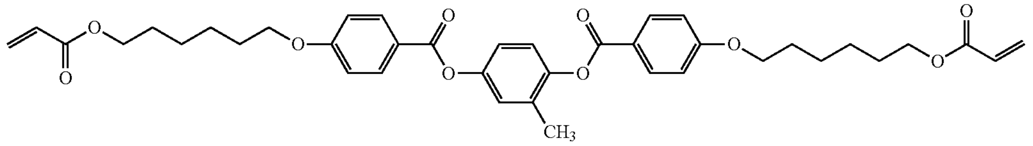 | 5.08 |
| 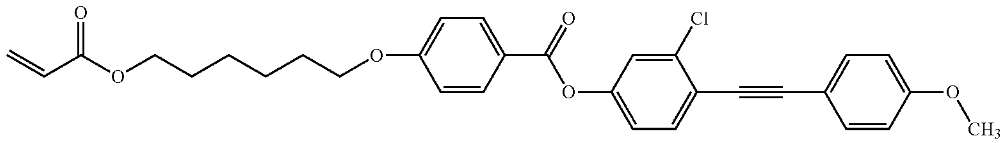 | 8.00 |
| 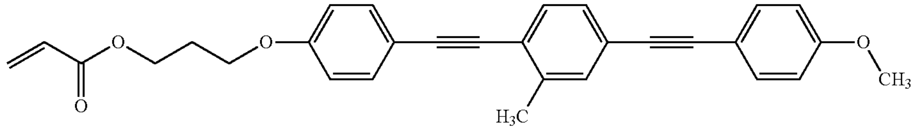 | 15.00 |
| 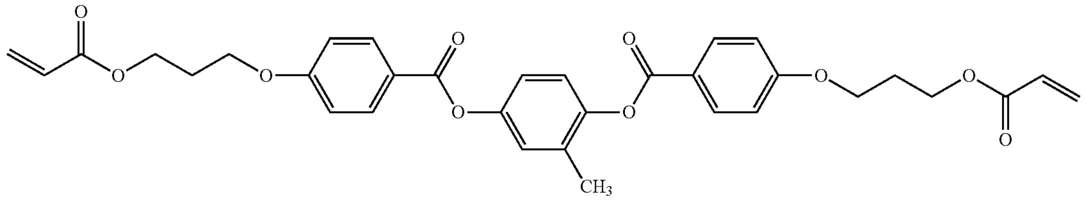 [SMILES: C=CC(=O)OCCCOc1ccc(C(=O)Oc2ccc(OC(=O)c3ccc(OCCCOC(=O)C=C)cc3)c(C)c2)cc1] | 50.50 |

Each formulation is dissolved to 40% solids in MIBK. Each mixture is spin coated on polyimide rubbed glass at 1000 rpm for 30 s. The wet films are annealed at 100° C. for 60 s and cured in Light Hammer 6 Fusion conveyor belt UV lamp (250 mJ) under $N_2$. Each film is visually inspected for CLC alignment and visible haze by eye after initial cure. After inspection the polymer film obtained from formulation 11-A is overcoated by spin coation a mixture of formulation 11-B. The wet film of formulation 11-B is annealed at 100° C. for 60 s and cured in Light Hammer 6 Fusion conveyor belt UV lamp (250 mJ) under $N_2$. The resulting double layer is visually inspected for CLC alignment and visible haze by eye after initial cure. The multilayer film is measured using a Shimadzu 3600 UV-Vis spectrometer to determine the reflective wavelength and bandwidth of reflection.

| | Central Wavelength/nm | Reflection Bandwidth/nm | Film Thickness/μm |
| --- | --- | --- | --- |
| 11-A | 645 | 82 | 5.12 |
| 11-B | 516 | 65 | 5.20 |
| 11-A + 11-B | 645 + 515 | 82 + 63 | 10.39 |

From the analysis of the films, it can be seen that it is possible to coat one CLC film on top of another directly with wide bandwidths for each of the layers. There is also no detrimental effect on reflection properties of each layer as can be seen with the overlapping reflection bands.

The invention claimed is:

1. A polymerizable liquid crystal material comprising:

one or more chiral compounds;

one or more compounds of formula I,

I

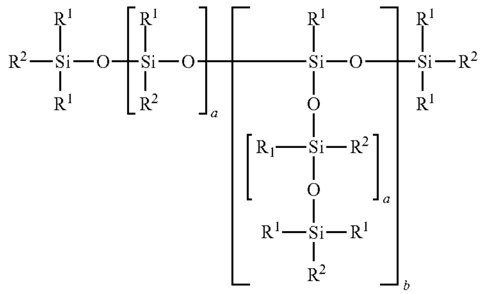

wherein $R^1$ denotes each and independently from another, an alkyl radical, or aryl radicals, but at least 80% of the radicals $R^1$ are methyl radicals, and $R^2$ denotes each and independently from another (a)

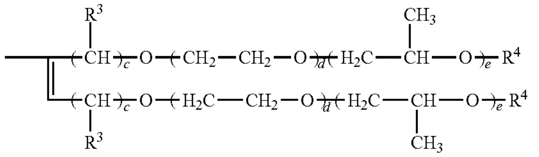

wherein $R^3$ is denotes each and independently from another a hydrogen or alkyl radical, $R^4$ denotes each and independently from another is a hydrogen, alkyl, or carboxyl radical c denotes an integer from 1 to 20, d denotes an integer from 0 to 50, and e is a number from 0 to 50, or $$—(CH_2—)_fOR^5, \qquad (b)$$

in which $R^5$ denotes each and independently from another hydrogen, alkyl, or carboxyl radical or a dimethyl propane radical optionally containing ether groups, and f denotes an integer from 2 to 20, or $$—(CH_2—)_g(OC_2H_4—)_h(OC_3H_8)_i(OCH_2CH(C_6H_5))_kOR_6 \qquad (c)$$

in which $R^6$ is a hydrogen, alkyl, or carboxyl radical, g is a number from 2 to 6, h is a number from 0 to 20, i is a number from 1 to 50, j is a number from 0 to 10, and k is a number from 0 to 10, or (d) an alkyl radical or aryl radical, wherein at least one radical $R^2$ has the definition (a), a is a number from 1 to 500, and b is a number from 0 to 10; and one or more reactive mesogens selected from formula RMTa, one or more reactive mesogens selected from formula RMTb, and optionally one or more reactive mesogens selected from formula RMT which are not mesogens of formula RMTa or formula RMTb, RMTa

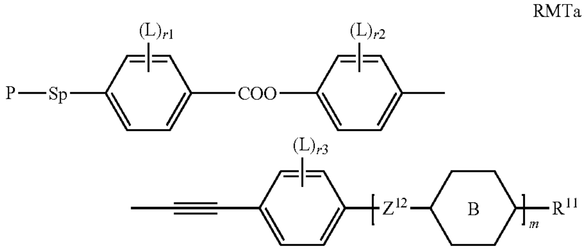

RMTb

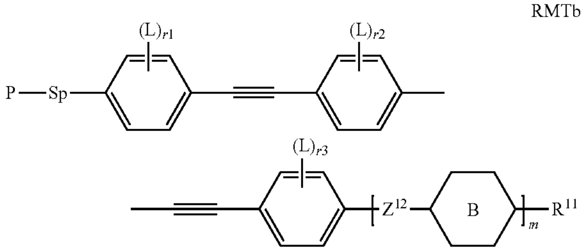

RMT

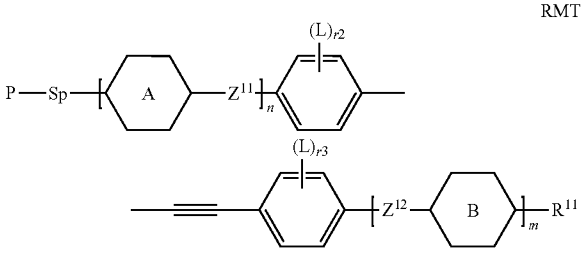

wherein

P is a polymerizable group,

Sp is a spacer group or a single bond, r1, r2 and r3 are independently of each other 0, 1, 2, 3 or 4, $R^{11}$ is P-Sp-, alkyl, alkoxy, thioalkyl, alkylcarbonyl, alkoxycarbonyl, alkylcarbonyloxy or alkoxycarbonyloxy optionally fluorinated, A and B denote, in case of multiple occurrences independently of one another, an aromatic or alicyclic group, which optionally contains one or more heteroatoms selected from N, O and S, and is optionally mono- or polysubstituted by L, L is P-Sp-, F, Cl, Br, I, —CN, —$NO_2$, —NCO, —NCS, —OCN, —SCN, —C(═O)$NR^xR^y$, —C(═O)$OR^x$, —C(═O)$R^x$, —$NR^xR^y$, —OH, —$SF_5$, straight chain alkyl or alkoxy having 1 to 12 C atoms, straight chain alkylcarbonyl, alkoxycarbonyl, alkylcarbonyloxy or alkoxycarbonyloxy having 2 to 12 C atoms, branched alkyl or alkoxy having 3 to 12 C atoms, or branched alkylcarbonyl, alkoxycarbonyl, alkylcarbonyloxy or alkoxycarbonyloxy having 4 to 12 C atoms, wherein one or more H atoms are each optionally replaced by F, Cl, —CN, straight chain alkyl or alkoxy having 1 to 6 C atoms, straight chain alkylcarbonyl, alkoxycarbonyl, alkylcarbonyloxy or alkoxycarbonyloxy having 2 to 6 C atoms, branched alkyl or alkoxy having 3 to 6 C atoms, or branched alkylcarbonyl, alkoxycarbonyl, alkylcarbonyloxy or alkoxycarbonyloxy having 4 to 6 C atoms, $R^x$ and $R^y$ independently of each other denote H or alkyl with 1 to 12 C-atoms, $Z^{11}$ and $Z^{12}$ denotes, in case of multiple occurrence independently of one another, —O—, —S—, —CO—, —COO—, —OCO—, —S—CO—, —CO—S—, —O—COO—, —CO—$NR^{00}$—, —$NR^{00}$—CO—, —$NR^{00}$—CO—$NR^{000}$, —$NR^{00}$—CO—O—, —O—CO—$NR^{00}$—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$(CH_2)_{n1}$, —$CF_2CH_2$—, —$CH_2CF_2$—, —$CF_2CF_2$—, —CH═N—, —N═CH—, —N═N—, —CH═$CR^{00}$—, —$CY^1$═$CY^2$—, —C≡C—, —CH═CH—COO—, —OCO—CH═CH— or a single bond, $Y^1$ and $Y^2$ independently of each other denote H, F, Cl or CN, n is 1, 2, 3 or 4, m is 0, 1, 2, 3 or 4, and n1 is an integer from 1 to 10.

2. The polymerizable liquid crystal material according to claim 1, wherein the concentration of one or more compounds of formula I is from 0.01% to 1% by weight.

3. The polymerizable liquid crystal material according to claim 1, wherein the total concentration of the reactive mesogens of formulae RMTa, RMTb, and RMT is from 40% to 99% by weight.

4. The polymerizable liquid crystal material according to claim 1, further comprising one or more compounds of formula DRM, $P^1$-$Sp^1$-MG-$Sp^2$-$P^2$ DRM wherein $P^1$ and $P^2$ independently of each other denote a polymerizable group, $Sp^1$ and $Sp^2$ independently of each other are a spacer group or a single bond, and MG is a rod-shaped mesogenic group, with the proviso that the reactive mesogens of formulae RMTa, RMTb, and RMT are excluded from the compounds of formula DRM.

5. The polymerizable liquid crystal material according to claim 4, wherein the concentration of the one or more compounds of formula DRM is from 1% to 60% by weight.

6. The polymerizable liquid crystal material according to claim 1, further comprising one or more compounds selected from formula MRM:

$P^1$-$Sp^1$-MG-R MRM wherein $P^1$ denotes a polymerizable group, $Sp^1$ is a spacer group or a single bond, and MG is a rod-shaped mesogenic group, R denotes P-Sp-, F, Cl, Br, I, —CN, —$NO^2$, —NCO, —NCS, —OCN, —SCN, —C(═O)$NR^xR^y$, —C(═O)X, —C(═O)$OR^x$, —C(═O)$R^y$, —$NR^xR^y$, —OH, —$SF^5$, optionally substituted silyl, straight chain alkyl or alkoxy having 1 to 12 C atoms, straight chain alkylcarbonyl, alkoxycarbonyl, alkylcarbonyloxy or alkoxycarbonyloxy having 2 to 12, branched alkyl or alkoxy having 3 to 12 C atoms, or branched alkylcarbonyl, alkoxycarbonyl, alkylcarbonyloxy or alkoxycarbonyloxy having 4 to 12 C atoms, wherein one or more H atoms are each optionally replaced by F or Cl, X is halogen, and $R^x$ and $R^y$ are independently of each other H or alkyl with 1 to 12 C-atoms, with the proviso that the two or more reactive mesogens of formula RMT are excluded from the compound of formula MRM.

7. The polymerizable liquid crystal material according to claim 1, comprising one or more reactive chiral compounds selected from compounds of formula CRMa to CRMc, CRMa

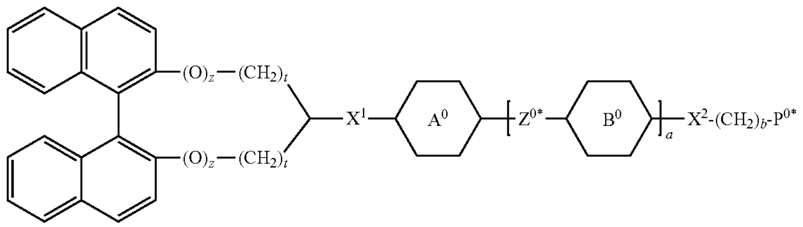

CRMb

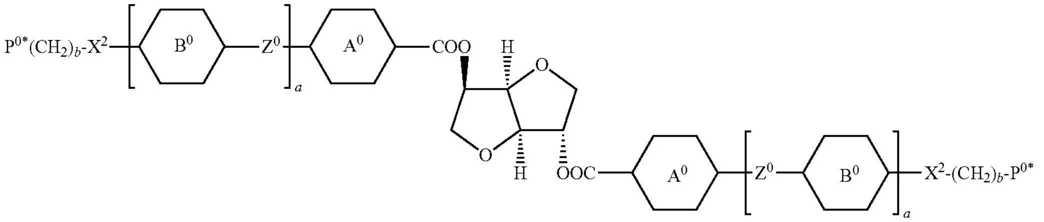

-continued

CRMc

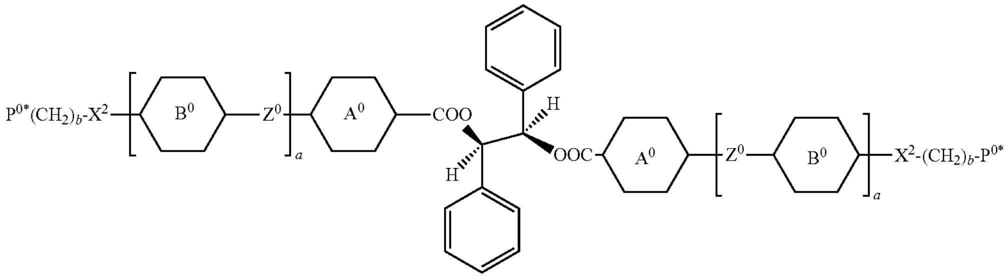

wherein $P^{0*}$ denotes a polymerizable group P, $A^0$ and $B^0$ are, in case of multiple occurrences independently of one another, 1,4-phenylene that is unsubstituted or substituted with 1, 2, 3 or 4 groups L, or trans-1,4-cyclohexylene, $X^1$ and $X^2$ are independently of each other —O—, —COO—, —OCO—, —O—CO—O— or a single bond, $Z^{0*}$ is, in case of multiple occurrences independently of one another, —COO—, —OCO—, —O—CO—O—, $—OCH_2—$, $—CH_2O—$, $—CF_2O—$, $—OCF_2—$, $—CH_2CH_2—$, $—(CH_2)_4—$, $—CF_2CH_2—$, $—CH_2CF_2—$, $—CF_2CF_2—$, —C≡C—, —CH═CH—, —CH═CH—COO—, —OCO—CH═CH— or a single bond, t is, independently of each other 0, 1, 2 or 3, a is 0, 1 or 2, b is 0 or an integer from 1 to 12, Z is 0 or 1, and L is, independently of each other F, Cl, CN, halogenated alkyl, alkoxy, alkylcarbonyl, alkoxycarbonyl, alkylcarbonyloxy or alkoxycarbonyloxy with 1 to 5 C atoms, and wherein the naphthalene rings in formula CRMa can additionally be substituted with one or more identical or different groups L.

8. The polymerizable liquid crystal material according to claim 1, wherein the concentration of said one or more chiral compounds is from 1 to 20% by weight.

9. The polymerizable liquid crystal material according to claim 1, further comprising one or more additives selected from surfactants, photo initiators, stabilizers, catalysts, sensitizers, inhibitors, chain-transfer agents, co-reacting monomers, reactive thinners, surface-active compounds, lubricating agents, wetting agents, dispersing agents, hydrophobing agents, adhesive agents, flow improvers, degassing or defoaming agents, deaerators, diluents, reactive diluents, auxiliaries, colorants, dyes, pigments, and nanoparticles.

10. A process for preparation of the polymerizable liquid crystal material according to claim 1, comprising: mixing one or more compounds of formula I, one or more reactive mesogens selected from formula RMTa, one or more reactive mesogens selected from formula RMTb, optionally one or more reactive mesogens selected from formula RMT, and one or more chiral compounds.

11. A process for preparation of a polymer film by providing a layer of a polymerizable liquid crystal material according to claim 1 onto a substrate, photopolymerizing the polymerizable liquid crystal material, and optionally removing the polymerized liquid crystal material from the substrate and/or optionally providing the polymerized liquid crystal material onto another substrate.

12. A polymer film obtainable from a polymerizable liquid crystal material according to claim 1 by a process comprising:

providing a layer of the polymerizable liquid crystal material onto a substrate, photopolymerizing the liquid crystal material, and optionally, removing the polymerized liquid crystal material from the substrate and/or optionally providing it onto another substrate.

13. An optical component comprising one or more polymer films according to claim 12.

14. An optical component comprising a polymerizable LC material according to claim 1.

15. An electrooptical device comprising an optical component according to claim 14.

16. An electrooptical device comprising an optical component according to claim 13.

17. The polymerizable liquid crystal material according claim 1, wherein A and B denote, in case of multiple occurrence independently of one 1,4-phenylene, pyridine-2,5-diyl, pyrimidine-2,5-diyl, thiophene-2,5-diyl, naphthalene-2,6-diyl, 1,2,3,4-tetrahydro-naphthalene-2,6-diyl, indane-2,5-diyl, bicyclooctylene or 1,4-cyclohexylene wherein one or two non-adjacent $CH_2$ groups are optionally replaced by O and/or S, wherein these groups are unsubstituted or substituted by 1, 2, 3 or 4 groups L.

18. The polymerizable liquid crystal material according claim 4, wherein MG is a rod-shaped mesogenic group of formula MG $$-(A^1-Z^1)_n-A^2- \quad \text{MG}$$

wherein $A^1$ and $A^2$ denote, in case of multiple occurrences independently of one another, an aromatic or alicyclic group, which optionally contains one or more heteroatoms selected from N, O and S, and is optionally mono- or polysubstituted by L, L is P-Sp-, F, Cl, Br, I, —CN, $—NO_2$, —NCO, —NCS, —OCN, —SCN, $—C(═O)NR^xR^y$, $—C(═O)OR^x$, $—C(═O)R^x$, $—NR^xR^y$, —OH, $—SF_5$, optionally substituted silyl, optionally substituted aryl having 6 to 12 C atoms, or optionally substituted heteroaryl having 2 to 12 C atoms, or straight chain alkyl or alkoxy having 1 to 12 C atoms, straight chain alkylcarbonyl, alkoxycarbonyl, alkylcarbonyloxy or alkoxycarbonyloxy having 2 to 12 C atoms, branched alkyl or alkoxy having 3 to 12 C atoms, or branched alkylcarbonyl, alkoxycarbonyl, alkylcarbonyloxy or alkoxycarbonyloxy having 4 to 12 C atoms, wherein one or more H atoms are each optionally replaced by F or Cl, $R^x$ and $R^y$ independently of each other denote H or alkyl with 1 to 12 C-atoms, $Z^1$ denotes, in case of multiple occurrence independently of one another, —O—, —S—, —CO—, —COO—, —OCO—, —S—CO—, —CO—S—, —O—COO—, —CO—$NR^x$—, —$NR^x$—CO—, —$NR^x$—CO—$NR^y$, —$NR^x$—CO—O—, —O—CO—$NR^x$—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)$ $n_1$, —$CF_2CH_2$—, —$CH_2CF_2$—, —$CF_2CF_2$—, —CH═N—, —N═CH—, —N═N—, —CH═$CR^x$—, —$CY_1$═$CY_2$—, —C≡C—, —CH═CH—COO—, —OCO—CH═CH— or a single bond, $Y^1$ and $Y^2$ independently of each other denote H, F, Cl or CN, n is 1, 2, 3 or 4, and n1 is an integer from 1 to 10.

19. The polymerizable liquid crystal material according claim 18, wherein L is P-Sp-, F, Cl, Br, I, —CN, —$NO_2$, —NCO, —NCS, —OCN, —SCN, —C(═O)$NR^xR^y$, —C(═O)$OR^x$, —C(═O)$R^x$, —$NR^xR^y$, —OH, —$SF_5$, optionally substituted silyl, optionally substituted aryl having 6 atoms, or optionally substituted heteroaryl having 2 to 6 C atoms, or straight chain alkyl or alkoxy having 1 to 6 C atoms, straight chain alkylcarbonyl, alkoxycarbonyl, alkylcarbonyloxy or alkoxycarbonyloxy having 2 to 6 C atoms, branched alkyl or alkoxy having 3 to 6 C atoms, or branched alkylcarbonyl, alkoxycarbonyl, alkylcarbonyloxy or alkoxycarbonyloxy having 4 to 16 C atoms, wherein one or more H atoms are each optionally replaced by F or $C_1$, and n1 is 1, 2, 3 or 4.

20. The polymer film according to claim 12, wherein said polymer film has a birefringence in the range from 0.01 to 0.4.

21. The polymerizable liquid crystal material according to claim 1, wherein the concentration of the one or more compounds of formula I in the polymerizable liquid crystal material is from 0.03% to 1% by weight.

22. The polymerizable liquid crystal material according to claim 1, wherein the concentration of the one or more compounds of formula I in the polymerizable liquid crystal material is from 0.05% to 1% by weight.

23. The polymerizable liquid crystal material according to claim 1, wherein the concentration of the reactive mesogens of formulae RMTa, RMTb, and RMT is 50 to 99% by weight.

24. The polymerizable liquid crystal material according to claim 1, wherein the compound of formula RMTa is represented by a compound of formula RMTa2-A4 and a compound of formula RMTb2-A3

RMTa2-A4

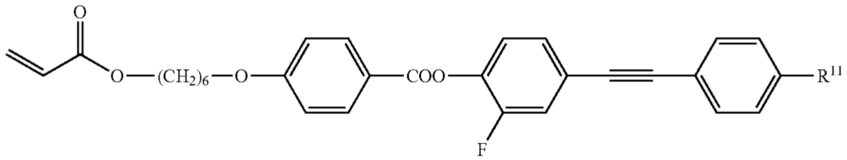

RMTb2-A3

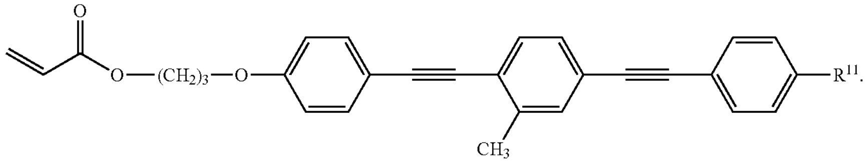

wherein $R^{11}$ is P-Sp-, alkyl, alkoxy, thioalkyl, alkylcarbonyl, alkoxycarbonyl, alkylcarbonyloxy or alkoxycarbonyloxy optionally fluorinated.

25. The polymerizable liquid crystal material according to claim 1, wherein the compound of formula RMTa is represented by a compound of formula RMTa2-A5 and a compound of formula RMTb2-A3

RMTa2-A5

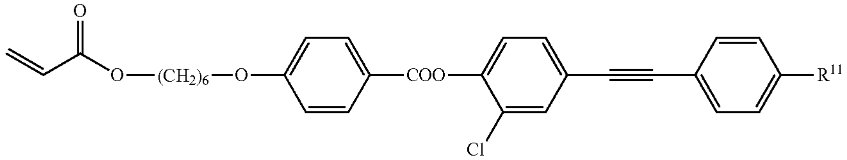

RMTb2-A3

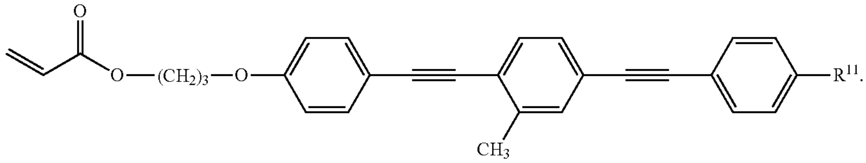

wherein $R^{11}$ is P-Sp-, alkyl, alkoxy, thioalkyl, alkylcarbonyl, alkoxycarbonyl, alkylcarbonyloxy or alkoxycarbonyloxy optionally fluorinated.

26. The polymerizable liquid crystal material according to claim 1, wherein the concentration of the one or more compounds of formula I in the polymerizable liquid crystal material is from 0.05% to 1% by weight, and the total concentration of reactive mesogens of formulae RMTa, RMTb, and RMT is 50 to 99% by weight.

27. The polymerizable liquid crystal material according to claim 7, wherein said one or more reactive chiral compounds are selected from compounds of formula CRMb.

28. The polymerizable liquid crystal material according to claim 27, wherein the compounds of formula CRMb are selected from compounds of formulae CRMb-1 to CRMb-3, CRMb-1

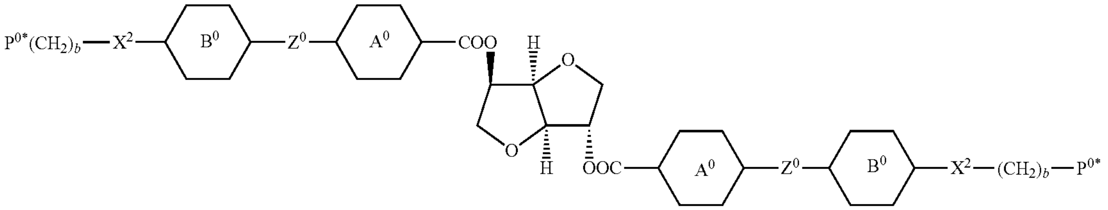

CRMb-2

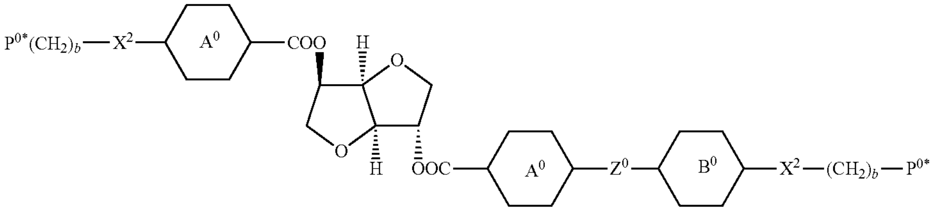

CRMb-3

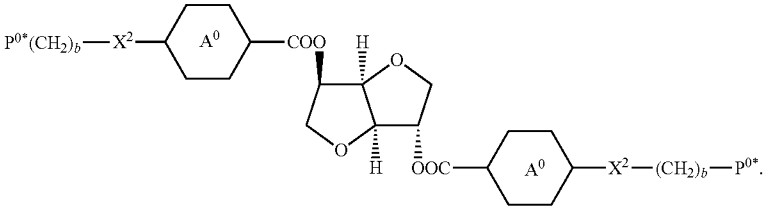

29. The polymerizable liquid crystal material according to claim 27, wherein the compounds of formula CRMb are selected from compounds of formulae CRMb-1a and CRMb-1b, CRMb-1a

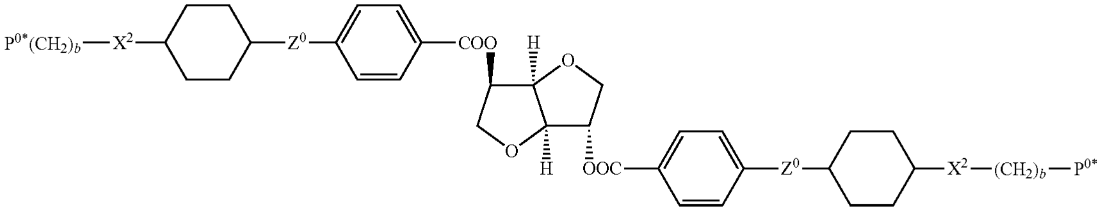

CRMb-1b

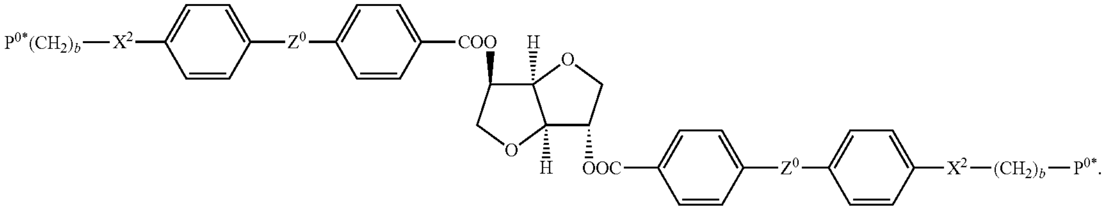

30. The polymerizable liquid crystal material according to claim 29, wherein, in formulae CRMb-1a and CRMb-1b, $Z^0$ denotes OCOO, COO, OCO or a single bond, and $X^2$ denotes OCOO, OCO, COO or a single bond.

* * * * *